United States Patent
Liu et al.

(10) Patent No.: US 11,899,222 B2
(45) Date of Patent: Feb. 13, 2024

(54) ANTI-SHAKE CAMERA MODULE, ANTI-SHAKE PHOTOSENSITIVE ASSEMBLY, AND MANUFACTURING METHOD THEREOF AND ELECTRONIC DEVICE

(71) Applicant: Ningbo Sunny Opotech Co., Ltd., Zhejiang (CN)

(72) Inventors: Xuhui Liu, Zhejiang (CN); Wangzhen Zhang, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 87 days.

(21) Appl. No.: 17/268,335

(22) PCT Filed: Jul. 29, 2019

(86) PCT No.: PCT/CN2019/098077
§ 371 (c)(1),
(2) Date: Feb. 12, 2021

(87) PCT Pub. No.: WO2020/034826
PCT Pub. Date: Feb. 20, 2020

(65) Prior Publication Data
US 2021/0208418 A1    Jul. 8, 2021

(30) Foreign Application Priority Data

Aug. 15, 2018 (CN) .......................... 201810927129.5
Aug. 15, 2018 (CN) .......................... 201810927206.7
(Continued)

(51) Int. Cl.
*G02B 27/64* (2006.01)
*H04N 23/68* (2023.01)

(52) U.S. Cl.
CPC .......... *G02B 27/646* (2013.01); *H04N 23/68* (2023.01)

(58) Field of Classification Search
CPC ..... G02B 27/646; H04N 5/23248; G03B 5/02
See application file for complete search history.

(56) References Cited

U.S. PATENT DOCUMENTS

2008/0017942 A1    1/2008  Kosaka et al.
2008/0224248 A1    9/2008  Yang et al.
(Continued)

FOREIGN PATENT DOCUMENTS

CN    101636693    1/2010
CN    101964871    2/2011
(Continued)

OTHER PUBLICATIONS

The Extended European Search Report dated Jul. 31, 2021 in corresponding European Application No. 19849128.4.
(Continued)

*Primary Examiner* — Minh Q Phan
(74) *Attorney, Agent, or Firm* — Wenderoth, Lind & Ponack, L.L.P.

(57) ABSTRACT

The invention discloses an anti-shake camera module, an anti-shake photosensitive assembly, and manufacturing method thereof and an electronic device. The anti-shake photosensitive assembly includes a circuit board assembly, at least one driver, and at least one photosensitive element. The circuit board assembly provides at least one attachment surface. Each driver is correspondingly attached to each attachment surface of the circuit board assembly. Each photosensitive element is correspondingly arranged on each driver, and the driver is located between the photosensitive element and an attachment surface of the circuit board assembly, so that the corresponding photosensitive element
(Continued)

is moved by the driver, thereby achieving the anti-shake function for the anti-shake photosensitive assembly.

16 Claims, 35 Drawing Sheets

(30) Foreign Application Priority Data

Aug. 15, 2018 (CN) .......................... 201821320091.7
Aug. 15, 2018 (CN) .......................... 201821320123.3

(56) References Cited

U.S. PATENT DOCUMENTS

| 2009/0109318 | A1* | 4/2009 | Chang | ................. H04N 5/2257 |
| | | | | 348/340 |
| 2009/0213236 | A1* | 8/2009 | Chiou | ................ H04N 5/23248 |
| | | | | 348/208.11 |
| 2010/0091122 | A1 | 4/2010 | Irisawa et al. | |
| 2011/0019075 | A1 | 1/2011 | Chiang | |
| 2012/0146171 | A1* | 6/2012 | Kosaka | ................ H04N 5/2257 |
| | | | | 257/E31.127 |
| 2015/0229843 | A1 | 8/2015 | Shimizu | |
| 2015/0350500 | A1 | 12/2015 | Gutierrez et al. | |
| 2017/0133951 | A1* | 5/2017 | Liu | ....................... B81B 7/0006 |

FOREIGN PATENT DOCUMENTS

| CN | 105022204 | | 11/2015 |
| CN | 105575918 A | * | 5/2016 |
| CN | 106791289 | | 5/2017 |
| CN | 106303220 | | 10/2017 |
| CN | 108234831 | | 6/2018 |
| CN | 208572247 | | 3/2019 |
| CN | 208987021 | | 6/2019 |
| JP | 2007083376 A | * | 4/2007 |
| WO | 2014/069251 | | 5/2014 |

OTHER PUBLICATIONS

International Search Report dated Oct. 23, 2019 in International (PCT) Application No. PCT/CN2019/098077 with English translation.

* cited by examiner

| Arranging a first supporting element 924 between a non-movable portion 9222 of a driver 922 and an upper surface 92121 of an attachment substrate 9212, so that a first safety gap 925 is formed between the upper surface 92121 of the attachment substrate 9212 and the a movable portion 9221 of the driver 922 | S91 |

↓

| Arranging a second supporting element 926 between a bottom surface 9232 of a photosensitive element 923 and a frame 92213 of the movable portion 9221 of the driver 922, so that a second safety gap 927 is formed between the bottom surface 9232 of the photosensitive element 923 and the actuator 92211 of the movable portion 9221 of the driver 922 | S92 |

↓

| Mounting the attachment substrate 9212 on a circuit board 9211 | S93 |

↓

| Respectively and conductively connecting the driver 922 and the photosensitive element 923 to the circuit board 9211, so as to form the anti-shake photosensitive assembly 920. | S94 |

Fig.29

ANTI-SHAKE CAMERA MODULE, ANTI-SHAKE PHOTOSENSITIVE ASSEMBLY, AND MANUFACTURING METHOD THEREOF AND ELECTRONIC DEVICE

TECHNICAL FIELD

The invention relates to the field of optical imaging technology, in particular to an anti-shake camera module, an anti-shake photosensitive assembly and manufacturing method thereof, and an electronic device.

BACKGROUND ART

In recent years, electronic products and smart devices have increasingly been developed toward miniaturization and high performance. This development trend of electronic products and smart devices has put forward more stringent requirements on the size and imaging capabilities of camera modules, which are one of the standard configurations of electronic products and smart devices. This has also caused the industries of electronic products and smart equipment to constantly pursue the compactness and functional integration of a camera module, and an anti-shake function is integrated into the camera module in this development wave, thereby achieving the anti-shake function of the camera module.

In the prior art, a conventional anti-shake motor is usually used to correct an offset of the camera module in X and Y directions and a rotation in XY plane, thereby realizing the anti-shake function of the camera module. However, on one hand, the traditional anti-shake motor has a poor correction effect on the offset of the camera module in the X and Y directions and the rotation in the XY plane; on the other hand, the traditional anti-shake motor also has several defects such as complicated structure, high cost, low yield, high power consumption, and large size, and it has gradually failed to meet the increasingly stringent requirements of camera modules.

CONTENTS OF THE INVENTION

An object of the invention is to provide an anti-shake camera module, an anti-shake photosensitive assembly, and manufacturing method thereof and an electronic device, which can use a driver to realize an anti-shake function, thereby meeting increasingly stringent requirements of camera module for anti-shake performance.

Another object of the invention is to provide an anti-shake camera module, an anti-shake photosensitive assembly, and manufacturing method thereof and an electronic device, which can provide a flat attachment surface for the driver, thereby avoiding problem of low yield caused by failing to meet required accuracy and flatness for the attachment of the driver.

Another object of the invention is to provide an anti-shake camera module, an anti-shake photosensitive assembly, and manufacturing method thereof and an electronic device, which can improve the yield, reliability and economic benefits of the production of the anti-shake camera module.

Another object of the invention is to provide an anti-shake camera module, an anti-shake photosensitive assembly, and manufacturing method thereof and an electronic device, and in an embodiment of the invention, the driver is implemented as a micro-electro-mechanical system (abbreviated as MEMS), so as to move photosensitive elements attached to the MEMS through the MEMS, thereby realizing the anti-shake function of the anti-shake camera module.

Another object of the invention is to provide an anti-shake camera module, an anti-shake photosensitive assembly, and manufacturing method thereof and an electronic device, and in an embodiment of the invention, an attachment substrate of the anti-shake photosensitive assembly provides the flat attachment surface, so that the MEMS is indirectly attached to a circuit board via the attachment substrate, thereby preventing normal operation of the MEMS being affected by a poor flatness of the circuit board.

Another object of the invention is to provide an anti-shake camera module, an anti-shake photosensitive assembly, and manufacturing method thereof and an electronic device, and in an embodiment of the invention, the attachment substrate has high strength, so that deformation of the attachment substrate is prevented, thereby ensuring that the attachment surface may maintain a good flatness.

Another object of the invention is to provide an anti-shake camera module, an anti-shake photosensitive assembly, and manufacturing method thereof and an electronic device, and in an embodiment of the invention, the attachment substrate is implemented as a steel plate made of steel, so that the attachment substrate may not only provide high resistance to deformation thereby maintaining the flatness of the attachment surface, but also enhance heat dissipation capability of the anti-shake camera module.

Another object of the invention is to provide an anti-shake camera module, an anti-shake photosensitive assembly, and manufacturing method thereof and an electronic device, and in an embodiment of the invention, the attachment substrate is implemented as a plate with high flatness, which is made of ceramic, alloy, metal material, polymer material and other materials with certain strength, thereby ensuring that the attachment substrate may provide an attachment surface with high flatness.

Another object of the invention is to provide an anti-shake camera module, an anti-shake photosensitive assembly, and manufacturing method thereof and an electronic device, and in an embodiment of the invention, the attachment substrate is attached to an accommodation space of the circuit board, so that a distance between a photosensitive element of the anti-shake photosensitive assembly and the circuit board is reduced, thereby reducing an overall height of the anti-shake camera module.

Another object of the invention is to provide an anti-shake camera module, an anti-shake photosensitive assembly, and manufacturing method thereof and an electronic device, and in an embodiment of the invention, the attachment substrate is arranged with at least one vacuum tank, so that when the MEMS is attached to the attachment substrate, a vacuum is sucked through the vacuum tank to maintain the flatness of the MEMS, thereby preventing the MEMS from shifting or warping before curing a glue.

Another object of the invention is to provide an anti-shake camera module, an anti-shake photosensitive assembly, and manufacturing method thereof and an electronic device, and in an embodiment of the invention, the anti-shake photosensitive assembly does not use the attachment substrate, but use a RDL process or a grinding process to process the circuit board, so that the circuit board can provide an attachment surface with high flatness. In other words, the MEMS is directly attached to a circuit board with high flatness, thereby preventing normal operation of the MEMS from being affected by unevenness of the circuit board.

An object of the invention is to provide an anti-shake camera module, an anti-shake photosensitive assembly, and manufacturing method thereof and an electronic device, which can meet high flatness and high precision required by attaching a driver, thereby improving the yield, reliability or economic benefits of the production of the anti-shake camera module.

Another object of the invention is to provide an anti-shake camera module, an anti-shake photosensitive assembly, and manufacturing method thereof and an electronic device, which can provide a flat attachment surface for the driver, thereby avoiding problem of low yield due to the accuracy and flatness required to attach the driver is not up to standard.

Another object of the invention is to provide an anti-shake camera module, an anti-shake photosensitive assembly, and manufacturing method thereof and an electronic device, and in an embodiment of the invention, the driver is implemented as a micro-electro-mechanical system (abbreviated as MEMS), so as to move photosensitive elements attached to the MEMS through the MEMS, thereby realizing the anti-shake function of the anti-shake camera module.

Another object of the invention is to provide an anti-shake camera module, an anti-shake photosensitive assembly, and manufacturing method thereof and an electronic device, and in an embodiment of the invention, an attachment substrate of the anti-shake photosensitive assembly provides the flat attachment surface, so that the MEMS is indirectly attached to a circuit board via the attachment substrate, thereby preventing the normal operation of the MEMS from being affected by a poor flatness of the circuit board.

Another object of the invention is to provide an anti-shake camera module, an anti-shake photosensitive assembly, and manufacturing method thereof and an electronic device, and in an embodiment of the invention, the MEMS is firmly bonded to the attachment substrate by a first glue, and a first safety gap is formed between the MEMS and the attachment substrate, thereby preventing the normal operation of the MEMS from being affected by the attachment substrate.

Another object of the invention is to provide an anti-shake camera module, an anti-shake photosensitive assembly, and manufacturing method thereof and an electronic device, and in an embodiment of the invention, the first glue is arranged between the MEMS and the attachment substrate in a unique painting glue pattern, thereby ensuring that the first safety gap remains stable.

Another object of the invention is to provide an anti-shake camera module, an anti-shake photosensitive assembly, and manufacturing method thereof and an electronic device, and in an embodiment of the invention, the painting glue pattern of the first glue is a painting glue pattern of a combination of a square-shaped glue line and a cross-shaped glue line, wherein the cross-shaped glue line is located inside the square-shaped glue line, thereby ensuring the stability of the first safety gap.

Another object of the invention is to provide an anti-shake camera module, an anti-shake photosensitive assembly, and manufacturing method thereof and an electronic device, and in an embodiment of the invention, the photosensitive element is firmly bonded to the MEMS by a second glue, and a second safety gap is formed between the MEMS and the photosensitive element, thereby preventing the normal operation of the MEMS from being affected by the photosensitive element.

Another object of the invention is to provide an anti-shake camera module, an anti-shake photosensitive assembly, and manufacturing method thereof and an electronic device, and in an embodiment of the invention, the second glue is arranged between the MEMS and the photosensitive element in a painting glue pattern with specific glue line structure, thereby ensuring that the second safety gap remains stable.

Another object of the invention is to provide an anti-shake camera module, an anti-shake photosensitive assembly, and manufacturing method thereof and an electronic device, and in an embodiment of the invention, the painting glue pattern of the second glue is a painting glue pattern of a combination of a lying II-shaped glue line and a square-shaped glue line, thereby ensuring that the second safety gap remains stable.

Another object of the invention is to provide an anti-shake camera module, an anti-shake photosensitive assembly, and manufacturing method thereof and an electronic device, and in an embodiment of the invention, both the first glue and the second glue are implemented as a particle glue, so as to ensure that the gap between the MEMS and the photosensitive element or the attachment substrate is respectively equal to a diameter of the largest particle in the particle glue to form a stable first and second security gaps, thereby preventing the normal operation of the MEMS from being affected by interference.

Another object of the invention is to provide an anti-shake camera module, an anti-shake photosensitive assembly, and manufacturing method thereof and an electronic device, and in an embodiment of the invention, the attachment substrate is firmly bonded to the circuit board by a third glue, so that the attachment substrate may be firmly attached to the circuit board.

Another object of the invention is to provide an anti-shake camera module, an anti-shake photosensitive assembly, and manufacturing method thereof and an electronic device, and in an embodiment of the invention, the third glue is arranged between the attachment substrate and the circuit board in a painting glue pattern of symmetrical glue lines such as a square-shaped structure, a double square-shaped structure, a big square combining with an inside small square shaped structure, a cross-shaped structure, a cross combining with X-shaped structure, so as to provide strong and stable adhesion to the attachment substrate and the circuit board.

Another object of the invention is to provide an anti-shake camera module, an anti-shake photosensitive assembly, and manufacturing method thereof and an electronic device, and in an embodiment of the invention, the attachment substrate has high strength so as to prevent the deformation of the attachment substrate, thereby ensuring that the attachment surface may maintain a good flatness.

In order to achieve at least one of the above objects or other objects and advantages, the invention provides an anti-shake photosensitive assembly including:

a circuit board assembly, wherein the circuit board assembly provides at least one attachment surface;

at least one driver, wherein each driver is correspondingly attached to each attachment surface of the circuit board assembly; and at least one photosensitive element, wherein each photosensitive element is correspondingly arranged on each driver, and the driver is located between the photosensitive element and the attachment surface of the circuit board assembly, so that the corresponding photosensitive element is moved by the driver.

In some embodiments of the invention, the circuit board assembly includes a circuit board and an attachment substrate, wherein a lower surface of the attachment substrate is mounted on the circuit board so that an upper surface of the attachment substrate is used as the attachment surface of the circuit board assembly.

In some embodiments of the invention, the attachment substrate is a steel plate.

In some embodiments of the invention, the attachment substrate is made of a material selected from a group consisting of: a ceramics, an alloy, a metal, and a polymer material.

In some embodiments of the invention, the attachment substrate has at least one vacuum tank, wherein each vacuum tank extends from the upper surface of the attachment substrate to the lower surface of the attachment substrate, so as to form a through-hole on the attachment substrate.

In some embodiments of the invention, the attachment substrate has a plurality of vacuum tanks, wherein the plurality of vacuum tanks are evenly distributed on the attachment substrate.

In some embodiments of the invention, the circuit board has an accommodation space, wherein the attachment substrate mounted on the circuit board is accommodated in the accommodation space.

In some embodiments of the invention, the accommodation space is a groove.

In some embodiments of the invention, the accommodation space is a through-hole.

In some embodiments of the invention, the circuit board has a through-hole type accommodation space, wherein the attachment substrate is mounted on the bottom side of the circuit board, and the driver attached to the attachment substrate is accommodated in the accommodation space.

In some embodiments of the invention, the circuit board assembly includes a circuit board processed by a grinding process, wherein the circuit board includes a mounting region and an edge region located around the mounting region, and the mounting region of the circuit board is used as the attachment surface of the circuit board assembly.

In some embodiments of the invention, the circuit board assembly includes a circuit board made by a redistribution layer process, wherein the circuit board includes a mounting region and an edge region located around the mounting region, and the mounting region of the circuit board is used as the attachment surface of the circuit board assembly.

In some embodiments of the invention, the circuit board assembly further includes a strengthening element, wherein the strengthening element is arranged on the bottom side of the circuit board to strengthen the strength of the circuit board.

In some embodiments of the invention, the strengthening element is a steel plate.

In some embodiments of the invention, a flatness of the attachment surface of the circuit board assembly is within 15 um.

In some embodiments of the invention, the photosensitive element is attached to the driver by particle glue bonding, and the driver is attached to the attachment surface of the circuit board assembly by particle glue bonding.

In some embodiments of the invention, the attachment substrate is mounted on the circuit board by the particle glue bonding.

In some embodiments of the invention, the driver is a micro-electro-mechanical system.

In some embodiments of the invention, the driver includes a movable portion and a non-movable portion, wherein the non-movable portion of the driver is fixedly attached to the attachment surface of the circuit board assembly, and the photosensitive element is correspondingly attached to the movable portion of the driver.

In some embodiments of the invention, the driver further includes at least one group of first connectors, at least one group of second connectors, and at least one group of elastic wires, wherein each group of the first connectors are arranged on the movable portion of the driver, each group of the second connectors are arranged on the non-movable portion of the driver, and each group of the first connectors and each group of the second connectors are conductively connected by each group of the elastic wires, and wherein the circuit board is conductively connected to each group of the second connectors of the driver, and the photosensitive element is conductively connected to each group of the first connectors of the driver.

In some embodiments of the invention, the anti-shake photosensitive assembly further includes at least one filter element, wherein each filter element is directly mounted on the top surface of each photosensitive element.

According to another aspect of the invention, the invention also provides an anti-shake camera module including:
at least one optical lenses; and
the above anti-shake photosensitive assembly, wherein each optical lenses is correspondingly arranged on a photosensitive path of each photosensitive element of the anti-shake photosensitive assembly, thereby assembling into the anti-shake camera module.

According to another aspect of the invention, the invention also provides an electronic device including:
an electronic device body; and
the above anti-shake camera module, wherein the anti-shake camera module is assembled to the electronic device body, thereby assembling into the electronic device.

According to another aspect of the invention, the invention also provides a method for manufacturing an anti-shake photosensitive assembly, including the following steps:
correspondingly attaching a driver to an upper surface of an attachment substrate;
correspondingly attaching a photosensitive element to the driver;
mounting the attachment substrate on a circuit board; and
respectively and conductively connecting the driver and the photosensitive element to the circuit board, so as to form the anti-shake photosensitive assembly.

In some embodiments of the invention, the step of connecting the driver and the photosensitive element respectively and conductively to the circuit board, so as to form the anti-shake photosensitive assembly includes the following steps:
conductively connecting the photosensitive element to at least one group of first connectors of the driver by wire bonding; and
conductively connecting the at least one group of second connectors of the driver to at least one group of circuit board connectors of the circuit board by wire bonding, wherein each group of the first connectors are conductively connected to each group of the second connectors by a group of elastic wires.

According to another aspect of the invention, the invention also provides a method for manufacturing an anti-shake photosensitive assembly including the following steps:
correspondingly attaching a driver to a mounting region of a circuit board, wherein the circuit board is made by a redistribution layer process;
correspondingly attaching a photosensitive element to the driver; and
respectively and conductively connecting the driver and the photosensitive element to the circuit board, so as to form the anti-shake photosensitive assembly.

In some embodiments of the invention, the method for manufacturing an anti-shake photosensitive assembly further includes the step of:

arranging a strengthening element on a bottom side of the circuit board so as to increase strength of the circuit board.

According to another aspect of the invention, the invention also provides a method for manufacturing an anti-shake camera module including the following steps:

manufacturing an anti-shake photosensitive assembly according to the aforementioned method for manufacturing an anti-shake photosensitive assembly; and correspondingly arranging at least one optical lenses in the photosensitive path of the at least one photosensitive element of the anti-shake photosensitive assembly, so as to form an anti-shake camera module.

In some embodiments of the invention, each driver includes a movable portion and a non-movable portion connected to the movable portion, wherein each driver is conductively connected to the circuit board assembly, the anti-shake photosensitive assembly further includes at least one first supporting element, each first supporting element is arranged between the non-movable portion of each driver and the attachment surface of the circuit board assembly, thereby attaching each driver to the attachment surface of the circuit board assembly, and forming a first safety gap between the movable portion of each driver and the attachment surface of the circuit board assembly, and wherein each photosensitive element is correspondingly arranged on the movable portion of each driver, and each photosensitive element is conductively connected to the circuit board assembly.

In some embodiments of the invention, each first supporting element is formed by curing a first glue.

In some embodiments of the invention, each first supporting element includes an inner supporting body and an outer supporting body located around the inner supporting body, wherein the non-movable portion of each driver includes an inner non-movable portion and an outer non-movable portion located around the inner non-movable portion, wherein the inner supporting body of each first supporting element is located between the inner non-movable portion of the non-movable portion of the driver and the attachment surface of the circuit board assembly, and the outer supporting body of each first supporting element is located between the outer non-movable portion of the non-movable portion of the driver and the attachment surface of the circuit board assembly.

In some embodiments of the invention, the inner supporting body of each first supporting element has a cross-shaped structure, and the outer supporting body of each first supporting element has a square-shaped structure, so as to form the first supporting element with a grid-shaped structure by combining the inner supporting body and the outer supporting body.

In some embodiments of the invention, the first glue is a particle glue.

In some embodiments of the invention, the anti-shake photosensitive assembly further includes at least one second supporting element, wherein each second supporting element is arranged between a bottom surface of the photosensitive element and the movable portion of the driver, and a second safety gap is formed between the bottom surface of the photosensitive element and the movable portion of the driver.

In some embodiments of the invention, each second supporting element is formed by curing a second glue.

In some embodiments of the invention, the second glue is a particle glue.

In some embodiments of the invention, the movable portion of each driver includes at least one actuator, at least one connecting arm and a frame, wherein both ends of each connecting arm are connected to each actuator and the frame, wherein each second supporting element includes at least a pair of second supporting bodies, each pair of the second supporting bodies are symmetrically arranged between a bottom surface of each photosensitive element and the frame of the movable portion of each driver, so that the bottom surface of each photosensitive element is correspondingly attached to the frame of the movable portion of each driver, and the second safety gap is formed between the bottom surface of each photosensitive element and the actuator of the movable portion of each driver.

In some embodiments of the invention, each second supporting element includes a pair of the second supporting bodies having a linear shaped structure, wherein the two second supporting bodies are respectively and symmetrically arranged at left and right sides of the frame of the movable portion of the driver, so as to form the second supporting body having an II-shaped structure.

In some embodiments of the invention, each second supporting element includes a pair of second supporting bodies having a linear shaped structure, wherein the two second supporting bodies are respectively and symmetrically arranged at front and back sides of the frame of the movable portion of the driver, so as to form the second supporting body having a lying II-shaped structure.

In some embodiments of the invention, each second supporting element includes two pairs of second supporting bodies having a linear shaped structure, wherein the two pairs of second supporting bodies are respectively and symmetrically arranged at the front and back sides, and the left and right sides of the frame of the movable portion of the driver, the two pairs of second supporting bodies are connected end-to-end so as to form the second supporting body having a square-shaped structure.

In some embodiments of the invention, the circuit board assembly includes a circuit board and an attachment substrate, wherein the attachment substrate is mounted on the circuit board so that an upper surface of the attachment substrate is used as the attachment surface of the circuit board assembly, wherein each photosensitive element is conductively connected to each driver, and each driver is conductively connected to the circuit board.

In some embodiments of the invention, the anti-shake photosensitive assembly further includes an adhesive element, wherein the adhesive element is arranged between a lower surface of the attachment substrate and the circuit board, so that the lower surface of the attachment substrate and the circuit board are bonded together.

In some embodiments of the invention, the adhesive element is formed by curing a third glue.

In some embodiments of the invention, the adhesive element includes at least one adhesive body with a specific structure, wherein the specific structure of each adhesive body is selected from a group consisting of: a square-shaped structure, a lying II-shaped structure, a cross-shaped structure, a cross combining with X-shaped structure, a grid-shaped structure and a ring-shaped structure.

In some embodiments of the invention, the adhesive element includes two adhesive bodies having a square-shaped structure, wherein the two adhesive bodies are arranged side by side so as to form the adhesive element with two square-shaped structures.

In some embodiments of the invention, the adhesive element includes two adhesive bodies with a square-shaped structure, wherein the two adhesive bodies have different sizes, and the adhesive body with small size is located inside the adhesive body with large size so as to form the adhesive element with a larger square containing a smaller square shaped structure.

In some embodiments of the invention, the circuit board has an accommodation space, wherein the attachment substrate mounted on the circuit board is accommodated in the accommodation space.

In some embodiments of the invention, the anti-shake photosensitive assembly further includes an adhesive element, wherein the adhesive element is arranged between the upper surface of the attachment substrate and the circuit board, so that the upper surface of the attachment substrate and the circuit board are bonded together, the circuit board has a through-hole type accommodation space, and when the attachment substrate is mounted on the circuit board, the driver attached to the upper surface of the attachment substrate is accommodated in the accommodation space.

In some embodiments of the invention, the circuit board assembly includes a circuit board made by a redistribution layer process, wherein the circuit board includes a mounting region and an edge region located around the mounting region, and the mounting region of the circuit board is used as the attachment surface of the circuit board assembly.

In some embodiments of the invention, the circuit board assembly includes a circuit board processed by a grinding process, wherein the circuit board includes a mounting region and an edge region located around the mounting region, and the mounting region of the circuit board is used as the attachment surface of the circuit board assembly.

In some embodiments of the invention, a flatness of the attachment surface of the circuit board assembly is within 15 um.

According to another aspect of the invention, the invention also provides an anti-shake camera module including:
at least one optical lenses; and
the above anti-shake photosensitive assembly, wherein each optical lenses is correspondingly arranged on a photosensitive path of each photosensitive element of the anti-shake photosensitive assembly, thereby assembling into the anti-shake camera module.

According to another aspect of the invention, the invention also provides an electronic device including:
an electronic device body; and
the above anti-shake camera module, wherein the anti-shake camera module is assembled to the electronic device body, thereby assembling into the electronic device.

According to another aspect of the invention, the invention also provides a method for manufacturing an anti-shake photosensitive assembly, including the following steps:
arranging a first supporting element between a non-movable portion of a driver and an upper surface of an attachment substrate, so as to form a first safety gap between the upper surface of the attachment substrate and a movable portion of the driver;
arranging a second supporting element between a bottom surface of a photosensitive element and a frame of the movable portion of the driver, so as to form a second safety gap between the bottom surface of the photosensitive element and an actuator of the movable portion of the driver;
mounting the attachment substrate on a circuit board; and respectively and conductively connecting the driver and the photosensitive element to the circuit board, so as to form the anti-shake photosensitive assembly.

In some embodiments of the invention, the step of arranging a first supporting element between a non-movable portion of a driver and an upper surface of an attachment substrate, so as to form a first safety gap between the upper surface of the attachment substrate and a movable portion of the driver, includes the following steps:
applying a first glue to the upper surface of the attachment substrate; and
correspondingly arranging the driver on the upper surface of the attachment substrate, so as to form the first supporting element between the non-movable portion of the driver and the upper surface of the attachment substrate after curing the first glue.

In some embodiments of the invention, the step of: applying a first glue to the upper surface of the attachment substrate, includes the following steps:
applying the first glue to the upper surface of the attachment substrate in a cross-shaped painting glue pattern, so as to form an inner supporting body with a cross-shaped structure of the first supporting element after curing the first glue; and
applying the first glue to the upper surface of the attachment substrate in a square-shaped painting glue pattern, so as to form an outer supporting body with a square-shaped structure of the first supporting element after curing the first glue; wherein the inner supporting body is located inside the outer supporting body to form the first supporting element with a grid-shaped structure.

In some embodiments of the invention, the step of arranging a second supporting element between a bottom surface of a photosensitive element and a frame of the movable portion of the driver, so as to form a second safety gap between the bottom surface of the photosensitive element and an actuator of the movable portion of the driver, includes the steps of:
applying a second glue to the frame of the movable portion of the driver; and
correspondingly arranging the photosensitive element on the movable portion of the driver, so as to form the second supporting element between the frame of the movable portion of the driver and the bottom surface of the photosensitive element after curing the second glue.

In some embodiments of the invention, the step of applying a second glue to the frame of the movable portion of the driver, includes the step of:
respectively and symmetrically applying the second glue to the frame of the movable portion of the driver in a linear shaped painting glue pattern, so as to form at least one pair of the second supporting bodies with a linear shaped structure of the second supporting element after curing the second glue, wherein each pair of the second supporting bodies are symmetrically arranged on the frame to form the second supporting element with a symmetrical structure.

In some embodiments of the invention, the step of mounting the attachment substrate to a circuit board, includes the following step:
arranging an adhesive element between a lower surface of the attachment substrate and the circuit board, so as to bond the attachment substrate and the circuit board together.

In some embodiments of the invention, the step of arranging an adhesive element between a lower surface of the attachment substrate and the circuit board so as to bond the attachment substrate and the circuit board together, includes the following steps:

applying a third glue to a mounting region of the circuit board; and correspondingly arranging the lower surface of the attachment substrate to the mounting region of the circuit board, so as to form an adhesive body with a specific structure of the adhesive element after curing the third glue, wherein the specific structure is any one selected from a group consisting of: a square-shaped structure, a lying II-shaped structure, a cross-shaped structure, a cross combining with X-shaped structure, a grid-shaped structure and a ring-shaped structure.

According to another aspect of the invention, the invention also provides a method for manufacturing an anti-shake photosensitive assembly, including the steps of:

arranging a first supporting element between a non-movable portion of a driver and a circuit board, so as to form a first safety gap between the circuit board and a movable portion of the driver;

arranging a second supporting element between a bottom surface of a photosensitive element and a frame of the movable portion of the driver, so as to from a second safety gap between the bottom surface of the photosensitive element and an actuator of the movable portion of the driver; and respectively and conductively connecting the driver and the photosensitive element to the circuit board, so as to form the anti-shake photosensitive assembly.

In some embodiments of the invention, the method for manufacturing the anti-shake photosensitive assembly further includes the step of:

arranging a strengthening element on the bottom side of the circuit board so as to increase strength of the circuit board.

According to another aspect of the invention, the invention also provides a method for manufacturing an anti-shake camera module, which includes the following steps:

manufacturing an anti-shake photosensitive assembly according to the above method for manufacturing an anti-shake photosensitive assembly; and correspondingly arranging at least one optical lenses in a photosensitive path of the at least one photosensitive element of the anti-shake photosensitive assembly, so as to form an anti-shake camera module.

With the understanding of the following description and drawings, the further objectives and advantages of the invention will be fully embodied.

These and other objectives, features and advantages of the invention are fully embodied by the following detailed description, drawings and claims.

BRIEF DESCRIPTION OF THE DRAWINGS

FIG. 29 is a schematic flowchart of a method for manufacturing the anti-shake photosensitive assembly according to the above fourth preferred embodiment of the invention.

SPECIFIC EMBODIMENTS

Figure 1:
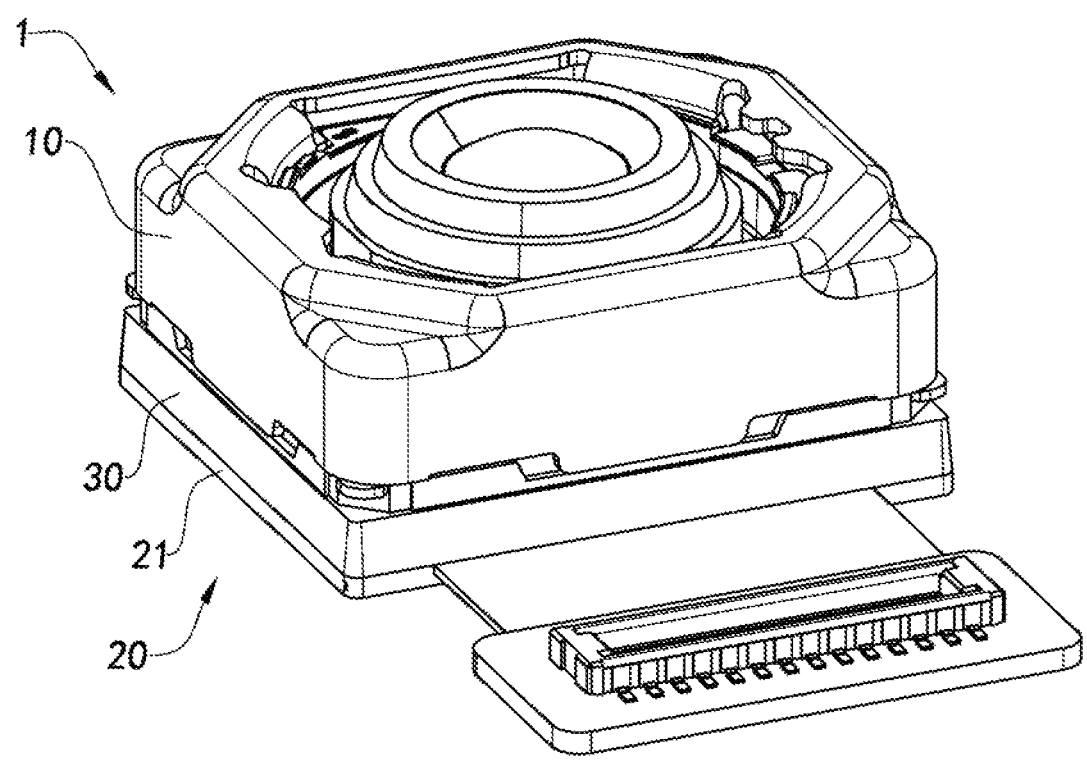
FIG. 1 is a schematic perspective view of an anti-shake camera module according to a first preferred embodiment of the invention.

The following description is used to disclose the invention so that those skilled in the art may implement the invention. The preferred embodiments in the following description are only examples, and those skilled in the art may think of other obvious variations. The basic principles of the invention defined in the following description may be applied to other embodiments, modifications, improvements, equivalents, and other technical solutions that do not depart from the spirit and scope of the invention.

Those skilled in the art should understand that, in the disclosure of the invention, the orientation or positional relationship indicated by the terms such as "longitudinal", "lateral", "upper", "lower", "front", "back/rear", "left", "right", "vertical", "horizontal", "top", "bottom", "inner", "outer", are based on the orientation or positional relationship shown in the drawings, which is only for the convenience of describing the invention and simplifying the description, rather than indicating or implying that the referred device or element must have a specific orientation, be constructed and operated in a specific orientation, therefore the above terms should not be understood as limiting the invention.

In the invention, the term "a/an" in the claims and specification should be understood as "at least one" or "one or more", i.e., in one embodiment, the number of an element may be one, while in other embodiments, the number may be more than one. Unless it is clearly stated in the disclosure of the invention that the number of the element is only one, the term "a/an" cannot be understood as unique or singular, therefore the term "a/an" cannot be understood as a restriction on the number.

In the description of the invention, it should be understood that terms such as "first", "second" are only used for descriptive purposes, and cannot be understood as indicating or implying relative importance. In the description of the invention, it should be noted that, unless otherwise definitely stated and defined, terms "connected" and "joined" should be understood in a broad sense, for example, it may be a fixed connection, a detachable connection, or an integral connection; it may be a mechanical connection, or an electrical connection; it may be a direct connection, or an indirect connection through a medium. For those of ordinary skill in the art, the specific meanings of the above terms in the invention may be understood according to specific circumstances.

In the description of this specification, descriptions with reference to the terms such as "one embodiment", "some embodiments", "examples", "specific example(s)", or "some examples", mean the specific features, structures, materials or characteristics described in conjunction with the embodiment or example, are included in at least one embodiment or example of the invention. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art may integrate and combine the different embodiments or examples and the features of the different embodiments or examples described in this specification without mutual contradiction.

With the development of science and technology, the requirements for miniaturization and high performance of electronic devices and smart terminals have also been increased. As one of the standard configurations of electronic products and smart devices, camera modules have increasingly stringent requirements for size and performance, especially for the anti-shake function of the camera modules. A traditional anti-shake motor not only has poor anti-shake performance due to being unable to better correct an offset of the camera module in X and Y directions and a rotation in XY plane, but also gradually cannot meet the increasingly stringent requirements of camera modules due to a complex structure, high cost, low yield, high power consumption, and large volume.

However, with the emergence of Micro-Electro-Mechanic System (MEMS), there is a new technical route to realize the anti-shake function, i.e., after the MEMS is directly attached to a circuit board, a photosensitive chip is attached to the MEMS so as to move the photosensitive chip through the MEMS and compensate for the offset of the photosensitive chip due to shake, thereby realizing the anti-shake function of the camera module. However, flatness of the circuit board is difficult to control, and the flatness and accuracy required for attaching MEMS are very high, so that it is difficult to reconcile contradiction between the two. Therefore, the problem of low yield is usually caused by failing to meet the required accuracy and flatness for attaching, and this seriously affects the mass production and economic benefits of the camera modules.

Referring to FIGS. 1-7 of the accompanying drawings of the specification of the invention, in order to solve the above problems, a first preferred embodiment of the invention provides an anti-shake camera module 1, wherein the anti-shake camera module 1 includes at least one optical lenses 10 and an anti-shake photosensitive assembly 20, wherein the anti-shake photosensitive assembly 20 further includes a circuit board assembly 21, at least one driver 22 and at least one photosensitive element 23, wherein the circuit board assembly 21 provides at least one flat attachment surface 210, wherein each driver 22 is respectively attached to each attachment surface 210 of the circuit board assembly 21, and each photosensitive element 23 is respectively and correspondingly arranged on the driver 22, and the driver 22 is located between the photosensitive element 23 and an attachment surface 210 of the circuit board assembly 21, so as to move the corresponding photosensitive element 23 through each driver 22, wherein each optical lenses 10 is respectively and correspondingly arranged on a photosensitive path of the photosensitive element 23 so as to form the anti-shake camera module 1.

Preferably, the driver 22 is implemented as a micro-electro-mechanical system (i.e., MEMS, also known as a micro-motor), so as to move the photosensitive element 23 through the MEMS and compensate for the offset or rotation due to shake of the photosensitive element 23, thereby realizing the anti-shake function of the anti-shake camera module 1. It should be understood that, in order to ensure the normal operation of the driver 22, the flatness of each attachment surface 210 of the circuit board assembly 21 is preferably controlled within 15 um.

It is worth mentioning that, although in FIGS. 1-7 and the following description, the anti-shake camera module 1 including only one optical lenses 10 and one driver 22 is taken as an example to describe the features and advantages of the anti-shake camera module 1 according to the invention. Those skilled in the art should understand that, the anti-shake camera module 1 disclosed in FIGS. 1-7 and the following description is only an example, and it does not constitute a limitation to the content and scope of the invention. For example, in other examples of the anti-shake camera module 1, the number of the optical lenses 10 may also be more than one, so as to form an array of anti-shake camera modules.

Figure 2:
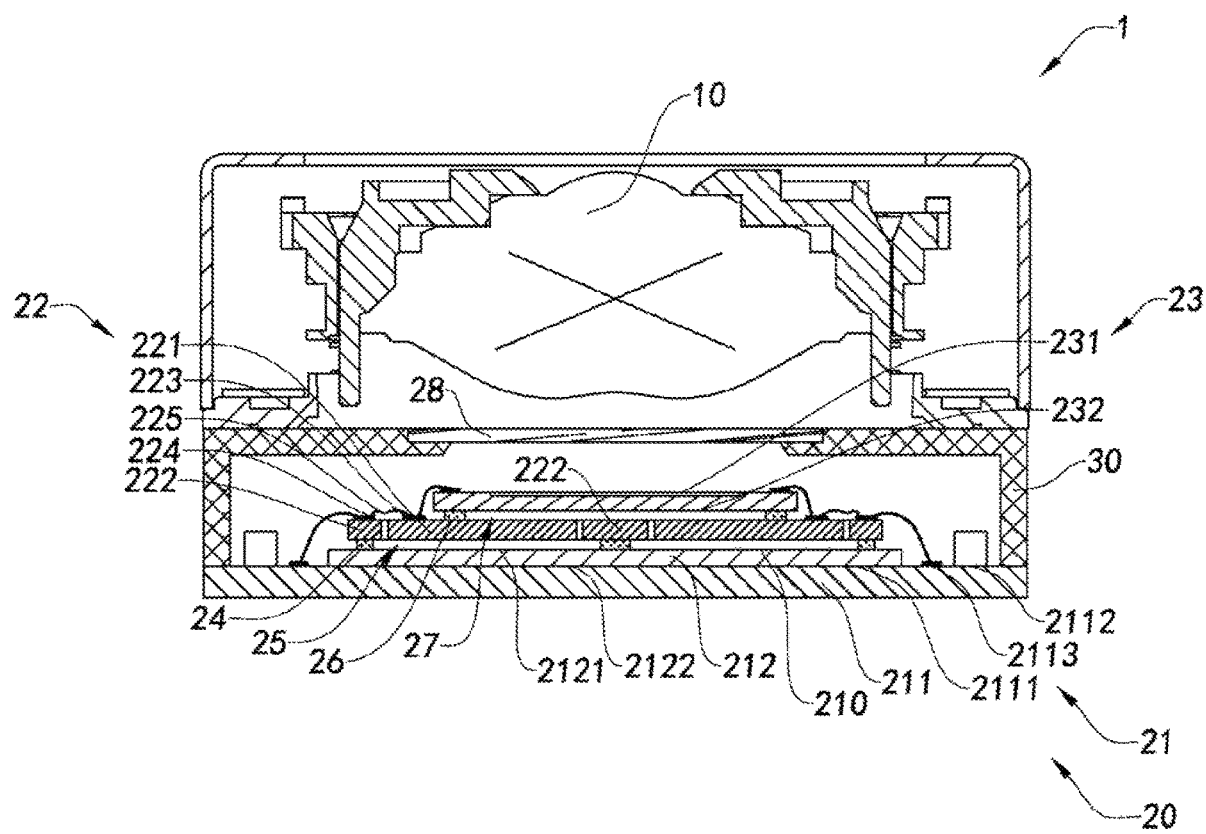
FIG. 2 is a schematic cross-section view of the anti-shake camera module according to the above first preferred embodiment of the invention.

Particularly, as shown in FIG. 2, the circuit board assembly 21 includes a circuit board 211 and an attachment substrate 212 arranged on the circuit board 211, wherein the attachment substrate 212 is made of a material with certain strength and flatness, so as to provide the attachment surface 210 with high flatness through the attachment substrate 212, so that the driver 22 is directly attached to the attachment substrate 212, thereby preventing the normal operation of the driver 22 from being affected by unevenness of the circuit board.

Figure 3:
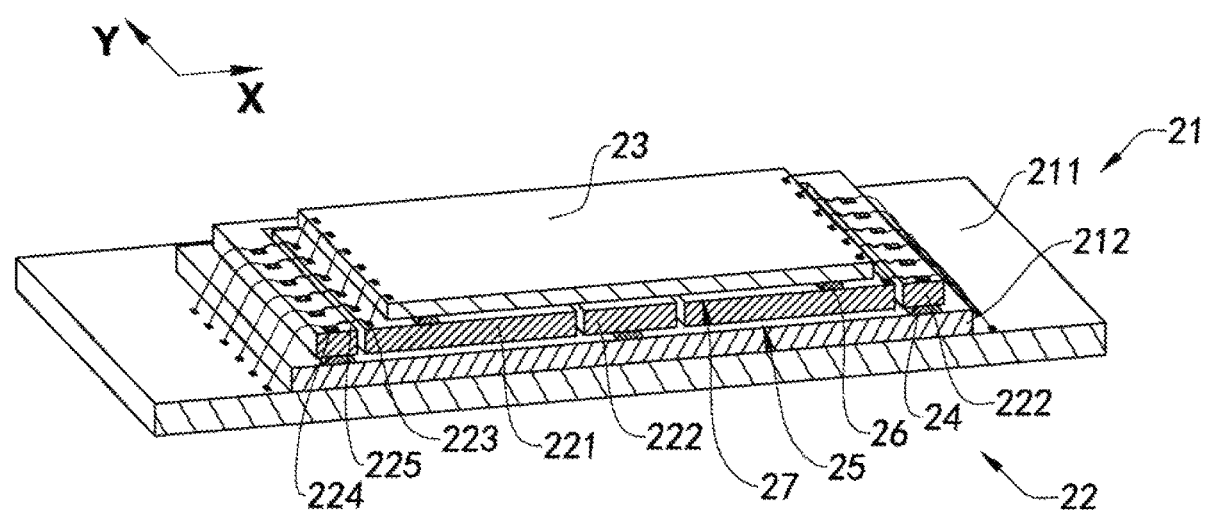
FIG. 3 is a schematic perspective view of an anti-shake photosensitive assembly of the anti-shake camera module according to the above first preferred embodiment of the invention.

Preferably, as shown in FIGS. 2 and 3, the attachment substrate 212 has a flat-plate structure, and the attachment substrate 212 has a flat upper surface 2121 and a lower surface 2122 parallel to the upper surface 2121, so that when the lower surface 2122 of the attachment substrate 212 is mounted on the circuit board 211, the upper surface 2121 of the attachment substrate 212 is used as the attachment surface 210 of the circuit board assembly 21. It should be understood that, in some other embodiments of the invention, the upper surface 2121 of the attachment substrate 212 is a flat surface, and the lower surface 2122 of the attachment substrate 212 is an uneven curved surface; alternatively, the lower surface 2122 of the attachment substrate 212 may also be arranged with a plurality of legs, so that the attachment substrate 212 may be fixedly installed on the circuit board 211 through the legs.

More preferably, the attachment substrate 212 is fixedly arranged on a top side of the circuit board 211 by means of glue bonding. It should be understood that, the glue may, but is not limited to, be implemented as a particle glue. Since the particles with the largest diameter in the particle glue are evenly distributed, it may ensure that the thickness of the particle glue remains consistent after curing. Of course, in some other embodiments of the invention, the glue may also be thermosetting glue or other types of glue; alternatively, the attachment substrate 212 may also be fixedly arranged on the circuit by ways of inlaying, and welding, etc.

It is worth mentioning that, the attachment substrate 212 is made of steel, so that the attachment substrate 212 is implemented as a steel plate 212 with higher strength and flatness, and when the lower surface 2122 of the steel plate 212 and the circuit board 211 are mounted together, the upper surface 2121 of the steel plate 212 is used as the attachment surface 210, so as to provide the driver 22 with the attachment surface 210 having high flatness. In other words, after the steel plate 212 is specially processed and treated, the upper surface 2121 of the steel plate 212 may have a high flatness so as to be used as the attachment surface 210 of the circuit board assembly 21; and the steel plate 212 has high strength and is not easily deformed, so that the steel plate 212 may stably provide the attachment surface 210 with high flatness for a long time, thereby preventing the flatness of the attachment surface 210 from being influenced by external force, temperature change, long-term use and other factors. In addition, since the steel has a large thermal conductivity, the steel plate 212 has good thermal conduction and heat dissipation capabilities. Therefore, the steel plate 212 also helps to improve the heat dissipation performance of the anti-shake camera module 1.

It should be understood that, in some other embodiments of the invention, the attachment substrate 212 may also be made of materials with certain strength and flatness, such as a polymer material, an alloy, a metal, a ceramics, etc., so that the attachment surface 210 with a stable and high flatness is provided by the attachment substrate 212, thereby avoiding the influence of the circuit board 211 on the driver 22.

In the first preferred embodiment of the invention, as shown in FIG. 2, the circuit board 211 includes a mounting region 2111, an edge region 2112, and at least one group of circuit board connectors 2113, wherein the mounting region 2111 and the edge region 2112 are integrally formed, and the edge region 2112 is located around the mounting region 2111, i.e., the mounting region 2111 is located in the middle of the circuit board 211, and the edge region 2112 is located outside the circuit board 211. Each group of the circuit board connectors 2113 are respectively arranged on the edge region 2112 of the circuit board 211.

The attachment substrate 212 is mounted on the mounting region 2111 of the circuit board 211, and the attachment surface 210 of the attachment substrate 212 corresponds to the mounting region 2111 of the circuit board 211, so that the driver 22 attached to the attachment surface 210 corresponds to the mounting region 2111 of the circuit board 211, and each group of the circuit board connectors 2113 are located around the driver 22, thereby facilitating the driver 22 to be conductively connected to the circuit board 211.

Exemplarily, as shown in FIGS. 2 and 3, the driver 22 generally includes a movable portion 221 and a non-movable portion 222, wherein the non-movable portion 222 of the driver 22 is fixedly attached to the attachment surface 210 of the attachment substrate 212, the photosensitive element 23 is correspondingly attached to the movable portion 221 of the driver 22 so as to move the photosensitive element 23 by the movable portion 221 of the driver 22, thereby realizing the anti-shake function of the anti-shake camera module 1. It should be understood that, when the attachment surface 210 is used to establish a plane coordinate system XY, the movable portion 221 of the driver 22 which is attached to the attachment surface 210 can move in the X-axis direction and the Y-axis direction and rotate in the XY plane, thereby realizing the anti-shake function by moving in the X-axis direction and the Y-axis direction and rotating in the XY plane through the driver 22.

Particularly, as shown in FIG. 3, the driver 22 further includes at least one group of first connectors 223, at least one group of second connectors 224, and at least one group of elastic wires 225, wherein each group of the first connectors 223 are arranged on the movable portion 221 of the driver 22, each group of the second connectors 224 are arranged on the non-movable portion 222 of the driver 22, wherein each group of the first connectors 223 and each group of the second connectors 224 are conductively connected by each group of the elastic wires 225. It should be understood that, the elastic wire 225 of the driver 22 can be made of a conductive material with certain elasticity, such as aluminum wire, thereby utilizing the elastic deformation of the elastic wire 225 to avoid the influence of the non-movable portion 222 of the driver 22 on the movement of the movable portion 221 of the driver 22.

It is worth noting that the first and second connectors 223, 224 of the drive 22 may be connection disks, respectively, i.e., the first and second connectors 223, 224 of the driver 22 may be in a shape of a disk respectively, so that the two ends of the elastic wire 225 are respectively conductively connected to the first and second connectors 223, 224 of the driver 22. It should be understood that, in other embodiments of the invention, the first and second connectors 223, 224 of the driver 22 may also be spherical or other shapes respectively, which are not limited in the invention.

In addition, as shown in FIG. 3, each group of the second connectors 224 of the driver 22 are conductively connected to the circuit board connector 2113 of the circuit board 211 by wire bonding through a group of lead wires; correspondingly, each group of the first connectors 223 of the driver 22 may also be conductively connected to the photosensitive element 23 by wire bonding through another group of lead wires, so that the photosensitive element 23 and the circuit board 211 are conductively connected through the first connector 223, the second connector 224, and the elastic wire 225 of the driver 22. It should be understood that, the invention does not further limit the type of the lead wire. For example, the lead wire may be implemented as a gold wire, a silver wire, a copper wire, etc., and it is only necessary to ensure that the lead wire can conductively connect the circuit board 211 and the driver 22, or conductively connect the driver 22 and the photosensitive element 23.

According to the first preferred embodiment of the invention, as shown in FIGS. 2 and 3, the anti-shake photosensitive assembly 20 further includes a first supporting element 24, wherein the first supporting element 24 is arranged between the upper surface 2121 of the attachment substrate 212 and the non-movable portion 222 of the driver 22, so that the driver 22 is firmly attached to the upper surface 2121 of the attachment substrate 212 through the first supporting element 24. Since the first supporting element 24 has a certain thickness, a first safety gap 25 is formed for the anti-shake photosensitive assembly 20 between the upper surface 2121 of the attachment substrate 212 and the movable portion 221 of the driver 22 through the first supporting element 24, thereby preventing the normal operation of the driver 22 from being affected by the attachment substrate 212, and improving the production yield of the anti-shake camera module 1.

Preferably, the first supporting element 24 is formed by curing a first glue, wherein not only the driver 22 and the attachment substrate 212 are firmly bonded together by the viscosity of the first glue, but also the first supporting element 24 with a certain strength is formed after curing the first glue, so that the first safety gap 25 between the driver 22 and the attachment substrate 212 may be kept stable, thereby preventing the normal operation of the driver 22 from being affected by the attachment substrate 212.

It is worth mentioning that, the first glue used to form the first supporting element 24 may be particle glue, thermosetting glue, or other types of glue.

Correspondingly, in the first preferred embodiment of the invention, as shown in FIGS. 2 and 3, the anti-shake photosensitive assembly 20 further includes a second supporting element 26, wherein the second supporting element 26 is arranged between a bottom surface 232 of the photosensitive element 23 and the movable portion 221 of the driver 22, so that the photosensitive element 23 is firmly attached to the movable portion 221 of the driver 22 through the second supporting element 26. Since the second supporting element 26 has a certain thickness, a second safety gap 27 is formed for the anti-shake photosensitive assembly 20 between the bottom surface 232 of the photosensitive element 23 and the movable portion 221 of the driver 22 through the second supporting element 26, thereby preventing the normal operation of the driver 22 from being affected by the photosensitive element 23, and improving the production yield of the anti-shake camera module 1.

It should be understood that, when the bottom surface 232 of the photosensitive element 23 is attached to the movable portion 221 of the driver 22, a top surface 231 of the photosensitive element 23 faces toward the optical lenses 10, i.e., the top surface 231 of the photosensitive element 23 is implemented as a photosensitive surface of the photosensitive element 23.

Preferably, the second supporting element 26 is formed by curing a second glue, wherein not only the photosensitive element 23 and the driver 22 are firmly bonded together by the viscosity of the second glue, but also the second supporting element 26 with a certain strength is formed after curing the second glue, so that the second safety gap 27 between the driver 22 and the photosensitive element 23 may be kept stable, thereby preventing the normal operation of the driver 22 from being affected by the photosensitive element 23.

It is worth mentioning that, the second glue used to form the second supporting element 26 may be particle glue, thermosetting glue, or other types of glue.

Referring to FIGS. 1-2, the anti-shake camera module 1 further includes a base 30, wherein the base 30 is arranged on the edge region 2112 of the circuit board 211 of the circuit board assembly 21 of the anti-shake photosensitive assembly 20, and the optical lenses 10 is mounted on a top surface of the base 30, so that the optical lenses 10 is held on a photosensitive path of the photosensitive element 23 of the anti-shake photosensitive assembly 20.

In addition, in the first preferred embodiment of the invention, as shown in FIG. 2, the anti-shake photosensitive assembly 20 further includes a filter element 28, wherein the filter element 28 is assembled on the base 30, so that the filter element 28 is held on the photosensitive path of the photosensitive element 23, and the filter element 28 is located between the optical lenses 10 and the photosensitive element 23, consequently the light entering the interior of the anti-shake camera module 1 from the optical lenses 10 may be received by the photosensitive surface of the photosensitive element 23 for photoelectric conversion after being filtered by the filter element 28, thereby improving the imaging quality of the anti-shake camera module 1. For example, the filter element 28 may filter the infrared part of the light entering the interior of the anti-shake camera module 1 from the optical lenses 10. It should be understood that, in different examples of the anti-shake camera module 1, the filter element 28 may be implemented in different types. For example, the filter element 28 may be implemented as an infrared cut-off filter, a full-transmitting filter, and other filters or a combination of multiple filters, etc., and it is not limited in the invention.

Referring to FIGS. 4-7, they are schematic diagrams of manufacturing process of the anti-shake photosensitive assembly 20 and manufacturing process of the anti-shake camera module 1 according to the invention. Those skilled in the art should understand that, the manufacturing process of the anti-shake photosensitive assembly 20 and the manufacturing process of the anti-shake camera module 1 as shown in FIGS. 4-7 are only examples to illustrate the features and advantages of the invention, and they do not constitute an restrictions on the content and scope of the invention.

Figure 4:
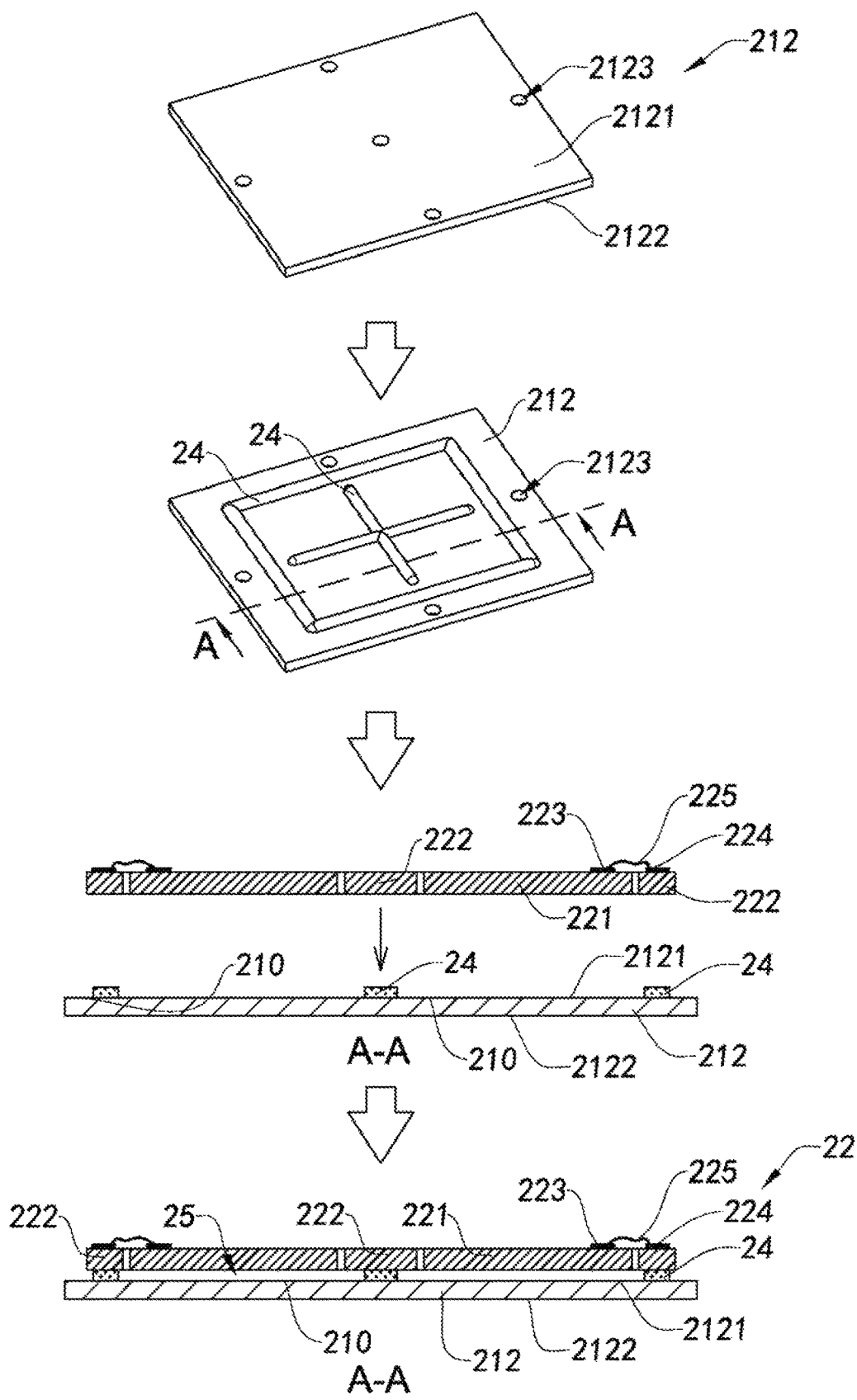
FIG. 4 is a schematic diagram of a first manufacturing step of the anti-shake camera module according to the above first preferred embodiment of the invention.

Particularly, FIG. 4 shows an example process of attaching the driver 22 to the attachment substrate 212, wherein a first glue is applied on the upper surface 2121 of the attachment substrate 212, and then the driver 22 is correspondingly arranged on the upper surface 2121 of the attachment substrate 212, and wherein the first glue applied to the upper surface 2121 of the attachment substrate 212 corresponds to the non-movable portion 222 of the driver 22, so that after the first glue is cured, the supporting element 24 is formed between the upper surface 2121 of the attachment substrate 212 and the non-movable portion 222 of the driver 22, and the first safety gap 25 is formed between the upper surface 2121 of the attachment substrate 212 and the movable portion 221 of the driver 22, thereby preventing the normal operation of the driver 22 from being affected by the attachment substrate 212.

It is worth noting that, in some other embodiments of the invention, the first glue may also be applied to the non-movable portion 222 of the driver 22, and then the driver 22 is correspondingly arranged on the upper surface 2121 of the attachment substrate 212, so that after the first glue is cured, the supporting element 24 is formed between the upper surface 2121 of the attachment substrate 212 and the non-movable portion 222 of the driver 22, and the first safety gap 25 is formed between the upper surface 2121 of the attachment substrate 212 and the movable portion 221 of the driver 22.

It is worth mentioning that, since the first glue has a certain fluidity before curing, it makes the driver 22 be prone to offset or tilt on the upper surface 2121 of the attachment substrate 212, resulting in that the first safety gap 25 is unstable, so it is necessary to apply external force to stably hold the driver 22 on the attachment substrate 212.

Therefore, in the first preferred embodiment of the invention, as shown in FIG. 4, the attachment substrate 212 is further arranged with at least one vacuum tank 2123, wherein each vacuum tank 2123 extends to the lower surface 2122 of the attachment substrate 212 from the upper surface 2121 of the attachment substrate 212, so as to form a through-hole penetrating from up to down on the attachment substrate 212; so that during the process of attaching the driver 22 to the attachment surface 210 of the attachment substrate 212, a vacuum is sucked from the lower surface 2122 of the attachment substrate 212 through the vacuum tank 2123, then the driver 22 and the attachment substrate 212 are firmly held together to prevent the driver 22 from offsetting or falling off, thereby ensuring the flatness of the driver 22. It should be understood that in the invention, since the vacuum tank originally opened on the circuit board is arranged on the attachment substrate 212, this avoids the process of refilling the vacuum tank on the circuit board in the later packaging process, and also avoids the risk of contaminating the module by dirt passing through the vacuum tank of the circuit board.

Exemplarily, as shown in FIG. 4, the attachment substrate 212 is provided with five vacuum tanks 2123, wherein one of the vacuum tanks 2123 is located at the center of the attachment substrate 212, and the remaining four vacuum tanks 2123 are evenly distributed on the peripheral edge of the attachment substrate 212, so that when a vacuum is sucked through the vacuum tanks 2123, uniform suction is applied to each position of the driver 22 so as to ensure that the driver 22 has a high flatness. It should be understood that, in some other embodiments of the invention, the attachment substrate 212 may also be provided with other numbers of the vacuum tanks 2123, and the vacuum tanks 2123 may also be arranged on the attachment substrate 212 in any arrangement selecting from the consisting of: a matrix arrangement, a ring arrangement, and a random arrangement etc., and it is not further limited in the invention.

Figure 5:
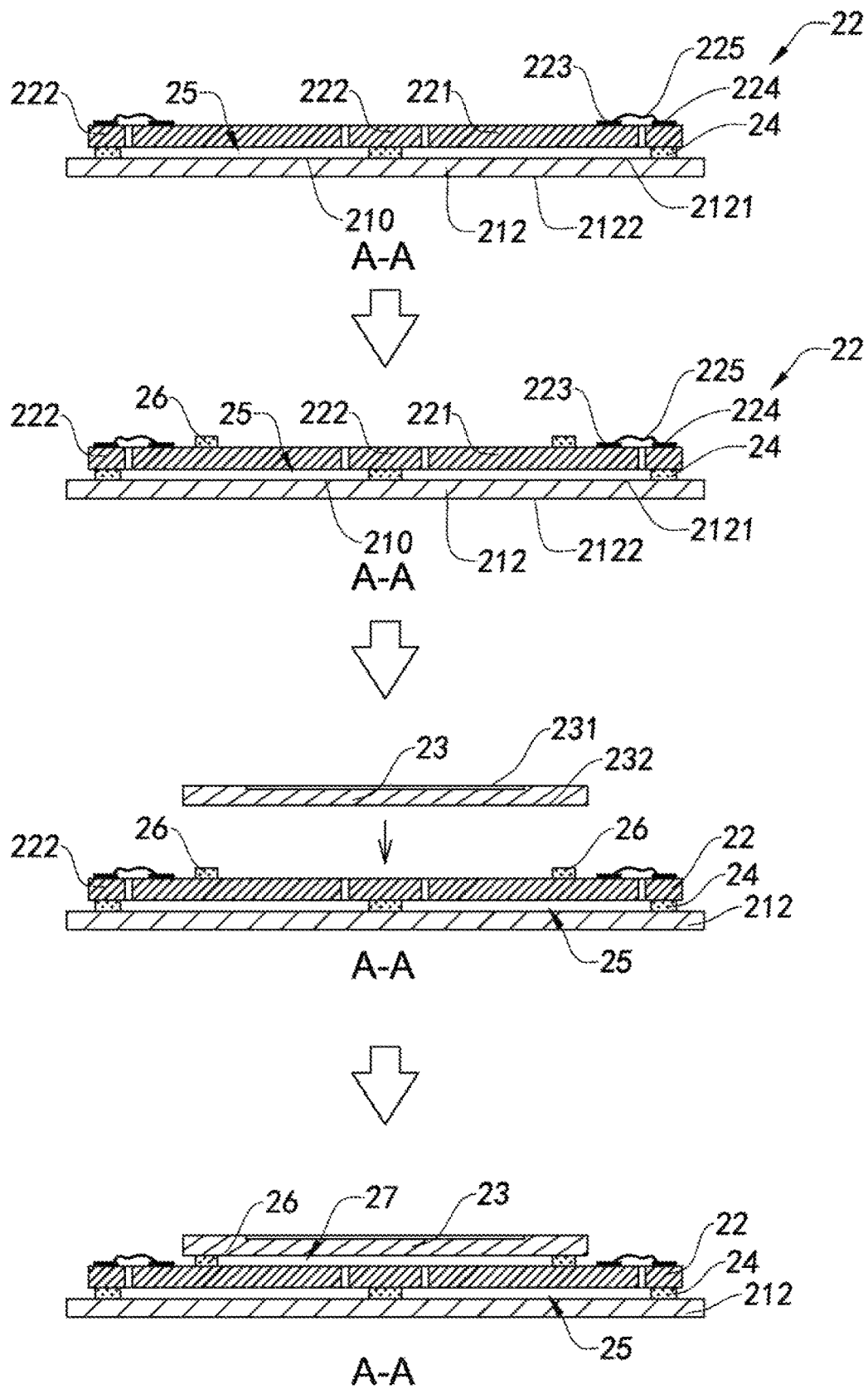
FIG. 5 is a schematic diagram of a second manufacturing step of the anti-shake camera module according to the above first preferred embodiment of the invention.

FIG. 5 shows an example process of attaching the photosensitive element 23 to the driver 22, wherein a second glue is firstly applied to a part of the movable portion 221 of the driver 22, then the photosensitive element 23 is correspondingly arranged on the movable portion 221 of the driver 22, so that after the second glue is cured, the second supporting member 26 is formed between the bottom surface 232 of the photosensitive element 23 and the movable portion 221 of the driver 22, and the second safety gap 27 is formed between the bottom surface 232 of the photosensitive element 23 and another part of the movable portion 221 of the driver 22, thereby preventing the normal operation of the driver 22 from being affected by the photosensitive element 23.

Of course, in some other embodiments of the invention, firstly the second glue may also be applied to the bottom surface 232 of the photosensitive element 23, then the photosensitive element 23 is correspondingly arranged on the movable portion 221 of the driver 22, so that after the second glue is cured, the second supporting member 26 is formed between the bottom surface 232 of the photosensitive element 23 and the movable portion 221 of the driver 22, and the second safety gap 27 is formed between the bottom surface 232 of the photosensitive element 23 and another part of the movable portion 221 of the driver 22, thereby preventing the normal operation of the driver 22 from being affected by the photosensitive element 23.

Figure 6:
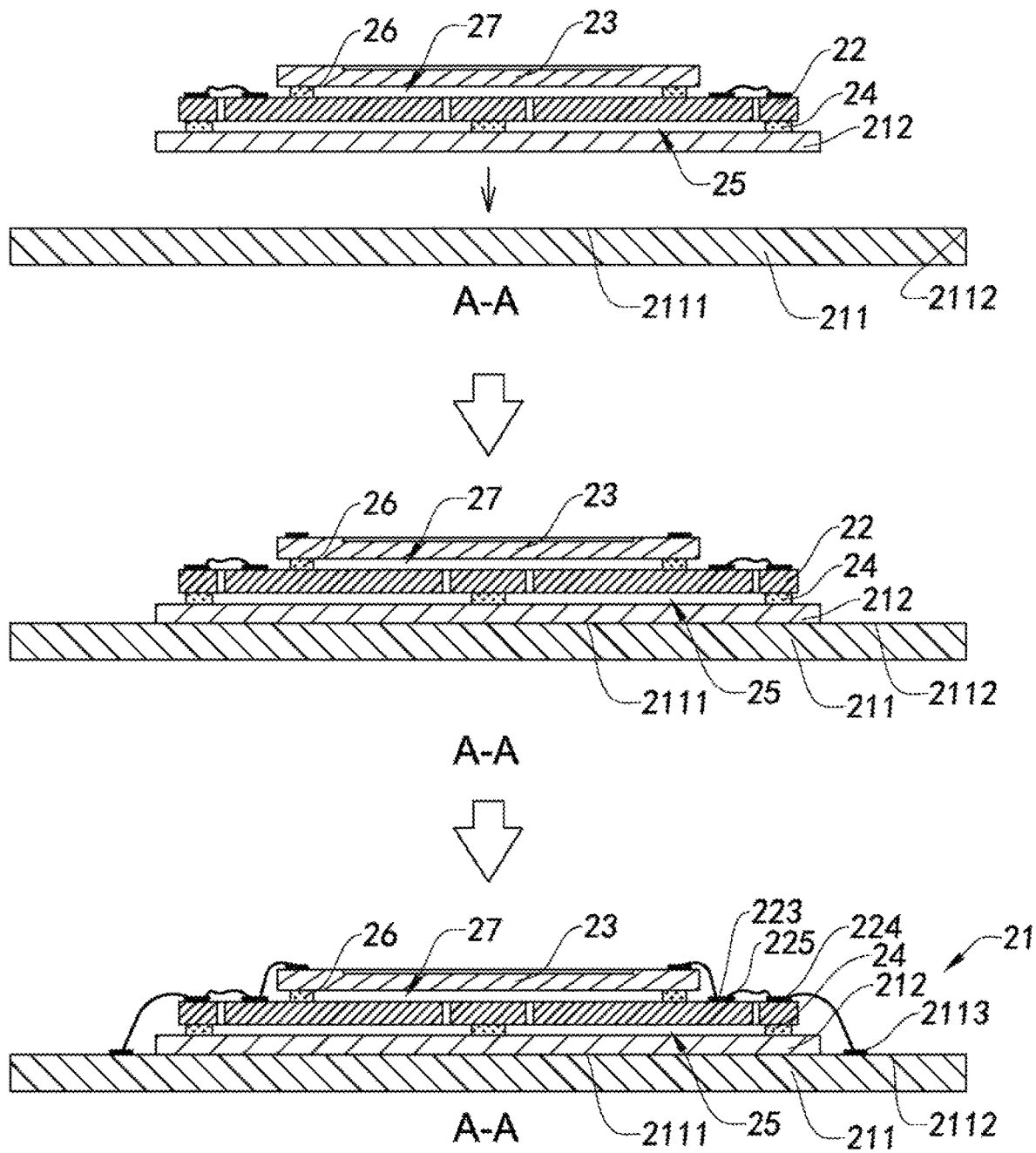
FIG. 6 is a schematic diagram of a third manufacturing step of the anti-shake camera module according to the above first preferred embodiment of the invention.

In FIG. 6, firstly the attachment substrate 212 is mounted on the circuit board 211, then the circuit board connector 2113 of the circuit board 211 and the second connector 224 of the driver 22 are conductively connected by wire bonding, and the first connector 223 of the driver 22 and the photosensitive element 23 are conductively connected by wire bonding, so that the photosensitive element 23 and the circuit board 211 are conductively connected by the elastic wire 225 of the driver 22, thereby forming the anti-shake photosensitive assembly 20. In other words, after the attachment substrate 212 is mounted on the circuit board 211, the driver 22 and the circuit board 211, as well as the driver 22 and the photosensitive element 23 are respectively and conductively connected by wire bonding.

It is worth noting that, in some other embodiments of the invention, before the attachment substrate 212 is attached to the circuit board 211, firstly the first connector 223 of the driver 22 and the photosensitive element 23 may be conductively connected by wire bonding; then after the attachment substrate 212 is mounted on the circuit board 211, the driver 22 and the circuit board 211 are conductively connected by wire bonding. Of course, in other embodiments of the invention, after the attachment substrate 212 is mounted to the circuit board 211, the photosensitive element 23 and the circuit board 211 may also be directly conductively connected through elastic lead wires.

It is worth mentioning that, although the order of the steps of manufacturing the anti-shake photosensitive assembly 20 in the first preferred embodiment as shown in FIGS. 4-6 is as follows: firstly attaching the driver 22 on the attachment substrate 212, then attaching the photosensitive element 23 to the driver 22, finally mounting the attachment substrate 212 to the circuit board 211, and conductively connecting the photosensitive element 23 and the driver 22, as well as the driver 22 and the circuit board 211. However, those skilled in the art may understand that, the order of the steps of manufacturing the anti-shake photosensitive assembly 20 in the first preferred embodiment as shown in FIGS. 4-6 is only an example for illustrating the features and advantages of the anti-shake photosensitive assembly 20 according to the invention, and it does not constitute a limitation to the content and scope of the invention. For example, in other examples of manufacturing the anti-shake photosensitive assembly 20, firstly the attachment substrate 212 may also be mounted on the circuit board 211, then attaching the driver 22 to the attachment substrate 212, and finally attaching the photosensitive element 23 to the driver 22 to form the anti-shake photosensitive assembly 20; alternatively, the photosensitive element 23 may firstly attached to the driver 22, then attaching the driver 22 to the attachment substrate 212, and finally mounting the attachment substrate 212 on the circuit board 211 to form the anti-shake photosensitive assembly 20.

Figure 7:
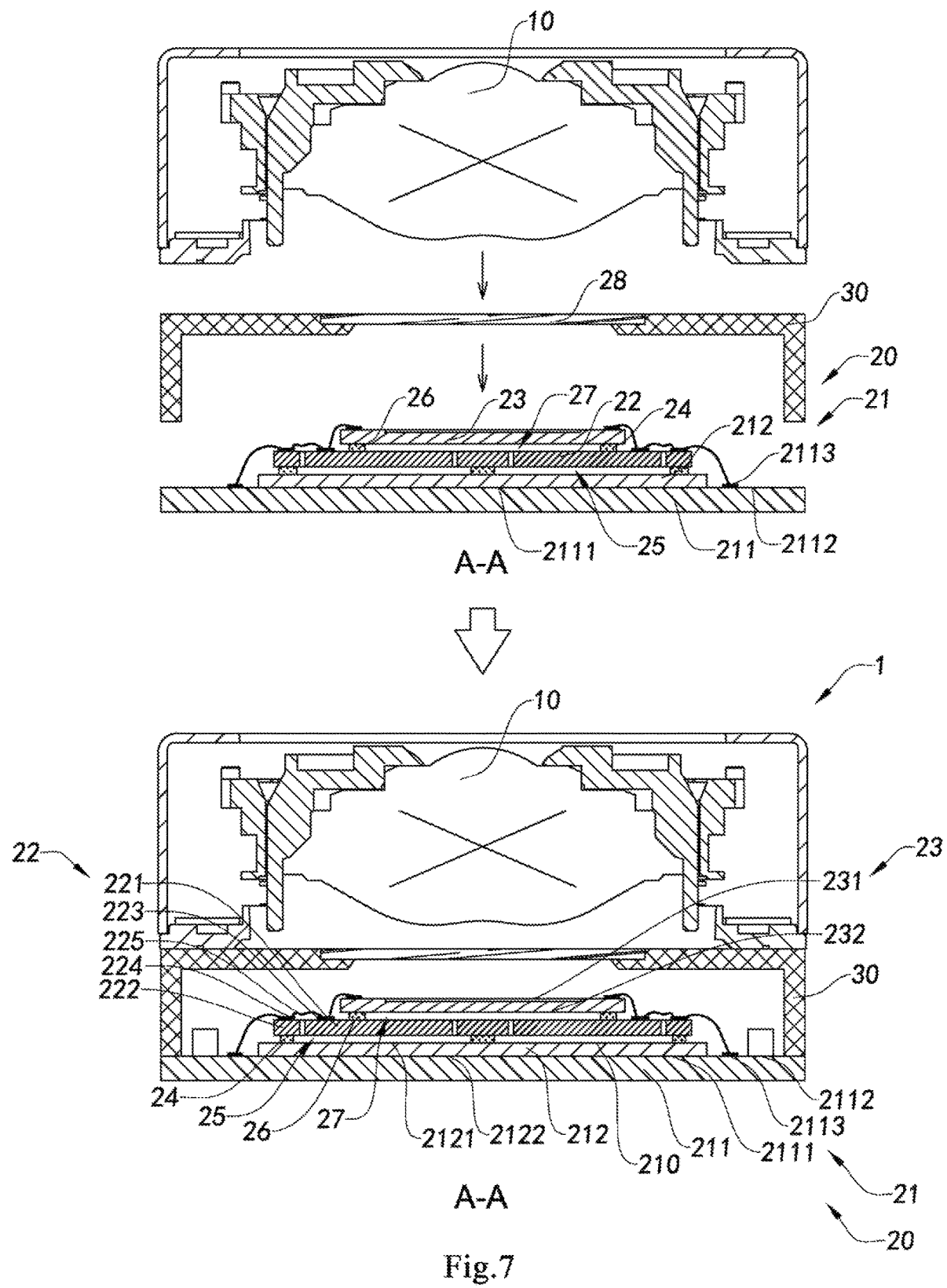
FIG. 7 is a schematic diagram of a fourth step of manufacturing the anti-shake camera module according to the above first preferred embodiment of the invention.

In FIG. 7, the base 30 is assembled on the edge region 2112 of the circuit board 211, and the filter element 28 and the optical lenses 10 are respectively assembled on the base 30, so that both the filter element 28 and the optical lenses 10 are maintained on the photosensitive path of the photosensitive element 23, thereby forming the anti-shake camera module 1. It should be understood that, the base 30 may be manufactured by, but not limited to, manufacturing processes such as injection molding, die-casting molding, and molding.

It is worth noting that, in some other embodiments of the invention, before the attachment substrate 212 is mounted on the mounting region 2111 of the circuit board 211, the base 30 may be formed by a molding process, so as to form a molded base (not shown in the figure) embedding the edge region 2112 of the circuit board 211; then, after the attachment substrate 212 is mounted on the mounting region 2111 of the circuit board 211, the filter element 28 and the optical lenses 10 are respectively assembled on the base 30. In other words, the base 30 may be assembled on the circuit board 211 before attaching the attachment substrate 212, or it may be assembled on the circuit board 211 after attaching the attachment substrate 212, and it is not further limited in the invention.

Figure 8A:
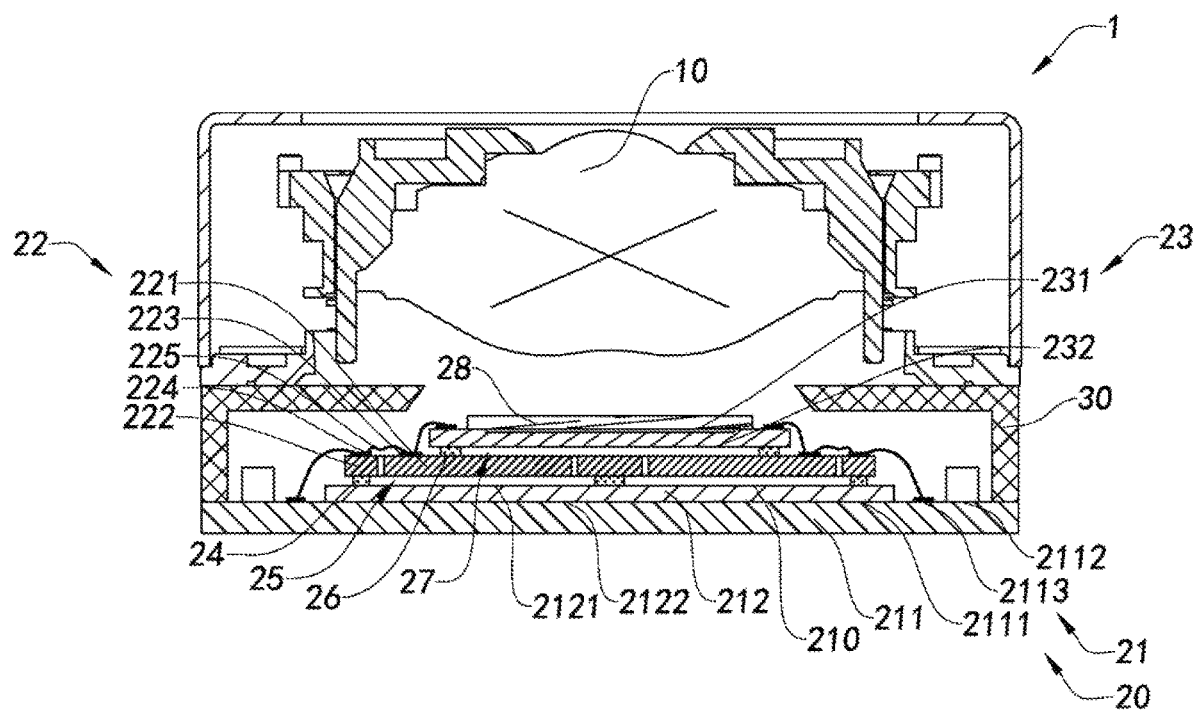
FIG. 8A shows a first modified implementation of the anti-shake camera module according to the above first preferred embodiment of the invention.

FIG. 8A shows a first modified implementation of the anti-shake camera module 1, wherein the filter element 28 of the anti-shake photosensitive assembly 20 of the anti-shake camera module 1 is directly mounted on the top surface 231 of the photosensitive element 23, so as to reduce a distance between the filter element 28 and the photosensitive element 23, and reduce a height of the base 30, thereby reducing an overall height of the camera module 1.

Figure 8B:
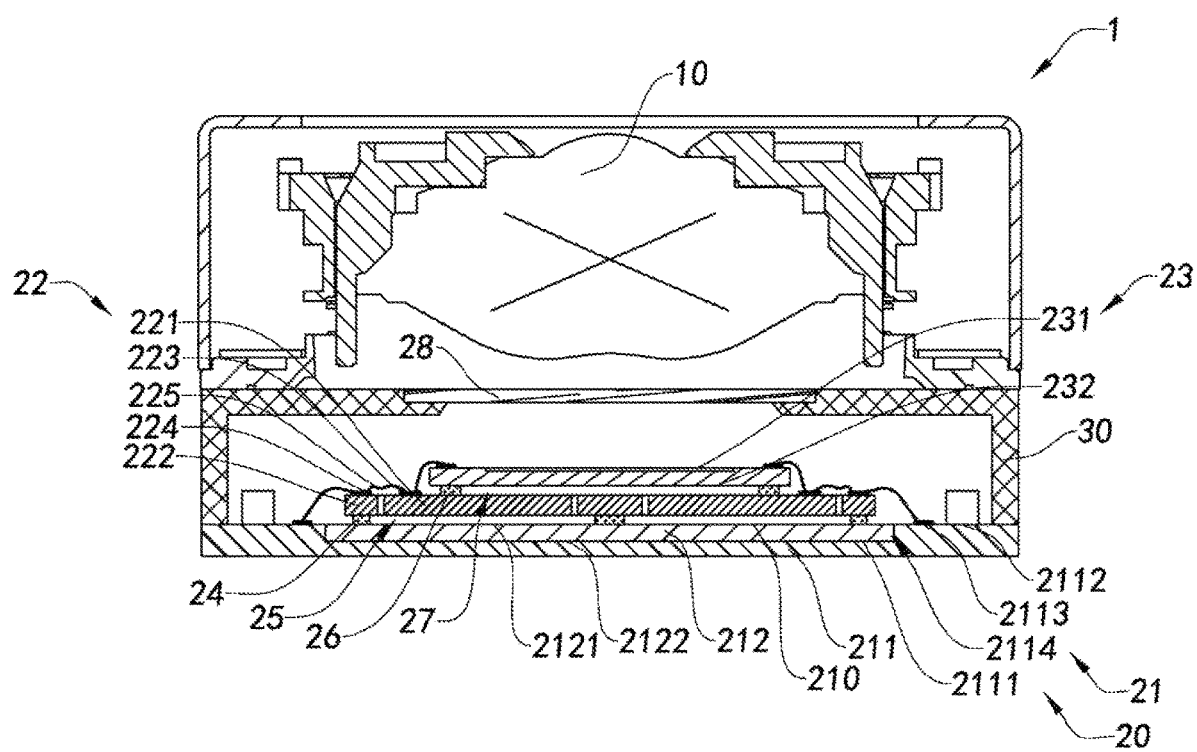
FIG. 8B shows a second modified implementation of the anti-shake camera module according to the above first preferred embodiment of the invention.

FIG. 8B shows a second modified implementation of the anti-shake camera module 1, wherein the circuit board 211 of the circuit board assembly 21 for the anti-shake photosensitive assembly 20 of the anti-shake camera module 1 has at least one accommodation space 2114, wherein the mounting region 2111 of the circuit board 211 is formed in each accommodation space 2114 of the circuit board 211, and the attachment substrate 212 mounted on the mounting region 2111 is accommodated in the accommodation space 2114 of the circuit board 211, so as to reduce the height of the anti-shake photosensitive assembly 20, thereby avoiding the height of the anti-shake camera module 1 to be increased by the addition of the attachment substrate to the attachment substrate 212, and meeting the miniaturization requirements of camera modules for electronic devices and smart products.

Figure 8C:
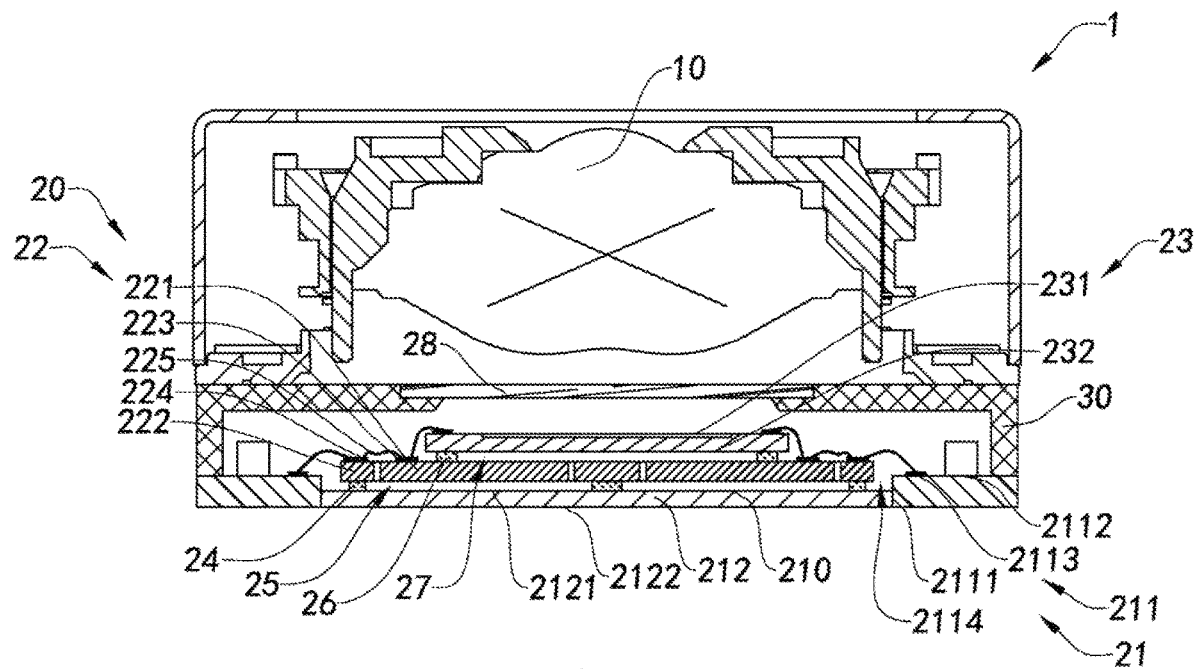
FIG. 8C shows a third modified implementation of the anti-shake camera module according to the above first preferred embodiment of the invention.

It is worth noting that, in the example of the anti-shake camera module 1 as shown in FIG. 8B, the accommodation space 2114 may be a groove; and in the third modified implementation of the anti-shake camera module 1 as shown in FIG. 8C, the accommodation space 2114 may be a through-hole, i.e., the type of the accommodation space 2114 may not be limited, as long as it can accommodate the attachment substrate 212.

It is worth mentioning that, a size of the accommodation space 2114 may be greater than a size of an outer edge of the attachment substrate 212, or may be equal to the size of the outer edge of the attachment substrate 212, and in this respect it may not be limited in the invention.

Figure 8D:
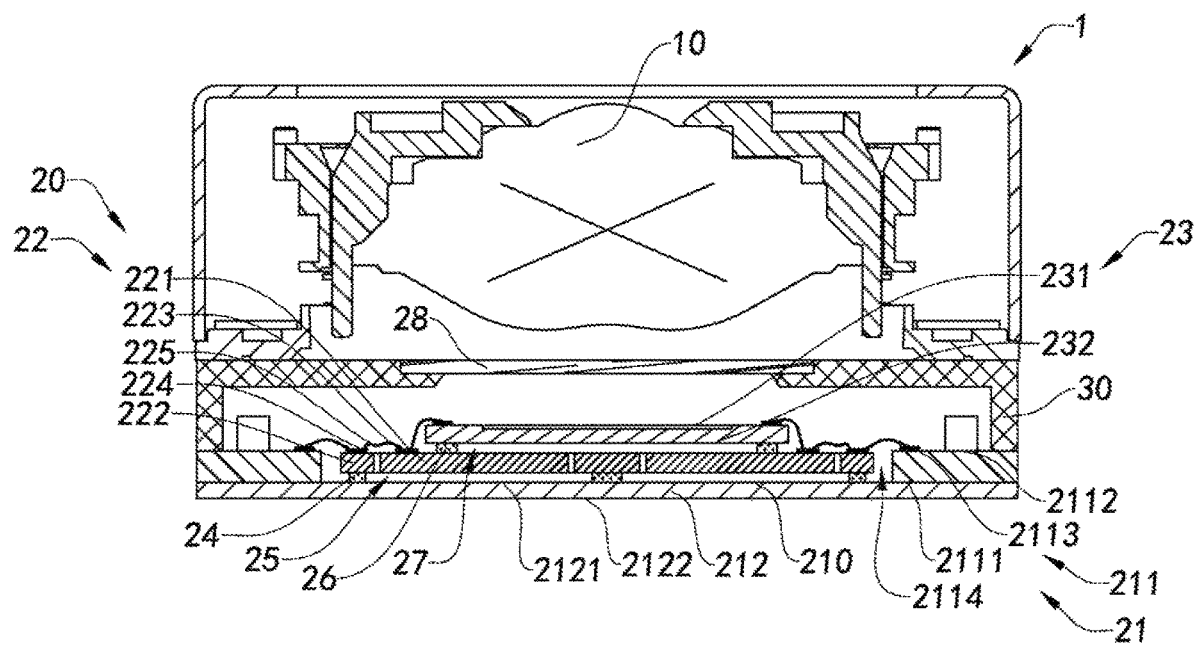
FIG. 8D shows a fourth modified implementation of the anti-shake camera module according to the above first preferred embodiment of the invention.

FIG. 8D shows a fourth modified implementation of the anti-shake camera module 1, wherein the accommodation space 2114 is implemented as a through-hole, and the attachment substrate 212 is mounted on the bottom side of circuit board 211, and the driver 22 attached to the upper surface 2121 of the attachment substrate 212 is accommodated in the accommodation space 2114 of the circuit board 211. It should be understood that, in the example of the anti-shake camera module 1 as shown in FIG. 8D, the size of the accommodation space 2114 is smaller than the size of the outer edge of the attachment substrate 212, and the size of the outer edge of the driver 22 is not greater than the size of the accommodation space 2114.

Figure 9:
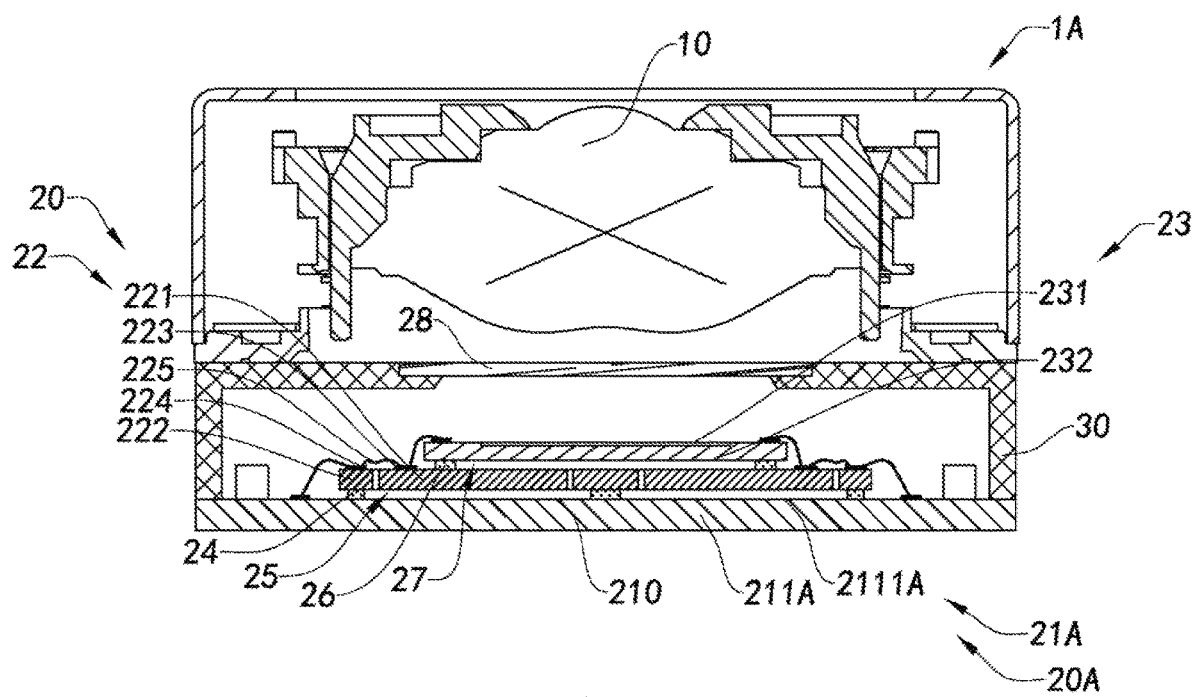
FIG. 9 is a schematic cross-section view of an anti-shake camera module according to a second preferred embodiment of the invention.

Referring to FIG. 9 of the accompanying drawings, an anti-shake camera module 1A according to a second preferred embodiment of the invention is illustrated. Compared with the above first preferred embodiment according to the invention, the difference of the anti-shake camera module 1A according to the second preferred embodiment of the invention is: a circuit board assembly 21A of an anti-shake photosensitive assembly 20A of the anti-shake camera module 1A includes a circuit board 211A, but does not include the attachment substrate 212, wherein the circuit board 211A has a flat mounting region 2111A and the edge region 2112, so that the flat attachment surface 210 is provided by the mounting region 2111A of the circuit board 211A, i.e., the driver 22 is directly attached to the mounting region 2111A of the circuit board 211A, instead of attaching the driver 22 to the circuit board 211A indirectly through the attachment substrate 212, so as to further reduce the height of the anti-shake photosensitive assembly 20A, thereby reducing the overall height of the anti-shake camera module 1A.

Preferably, the circuit board 211A is processed through a grinding process, so as to provide the attachment 210 with high flatness. For example, the circuit board 211A is implemented as a ceramic substrate processed by the grinding process, so that the mounting region 2111A of the circuit board 211A may have a higher flatness, so as to satisfy the strict requirements on the flatness of the attachment surface 210 for the driver 22, thereby effectively preventing the normal operation of the driver 22 from being affected by the circuit board 211A. It should be understood that, the ceramic substrate 211A may form the mounting region 2111A with high flatness on the circuit board 211A through the grinding process, so that the mounting region 2111A of the circuit board 211A can be used as the attachment surface 210 of the circuit board assembly 21A. In addition, the ceramic substrate 211A may also prevent the flatness of the attachment surface 210 from being affected by the deformation of the circuit board 211A, thereby preventing the normal operation of the driver 22 from being affected by the attachment surface 210.

Figure 10:
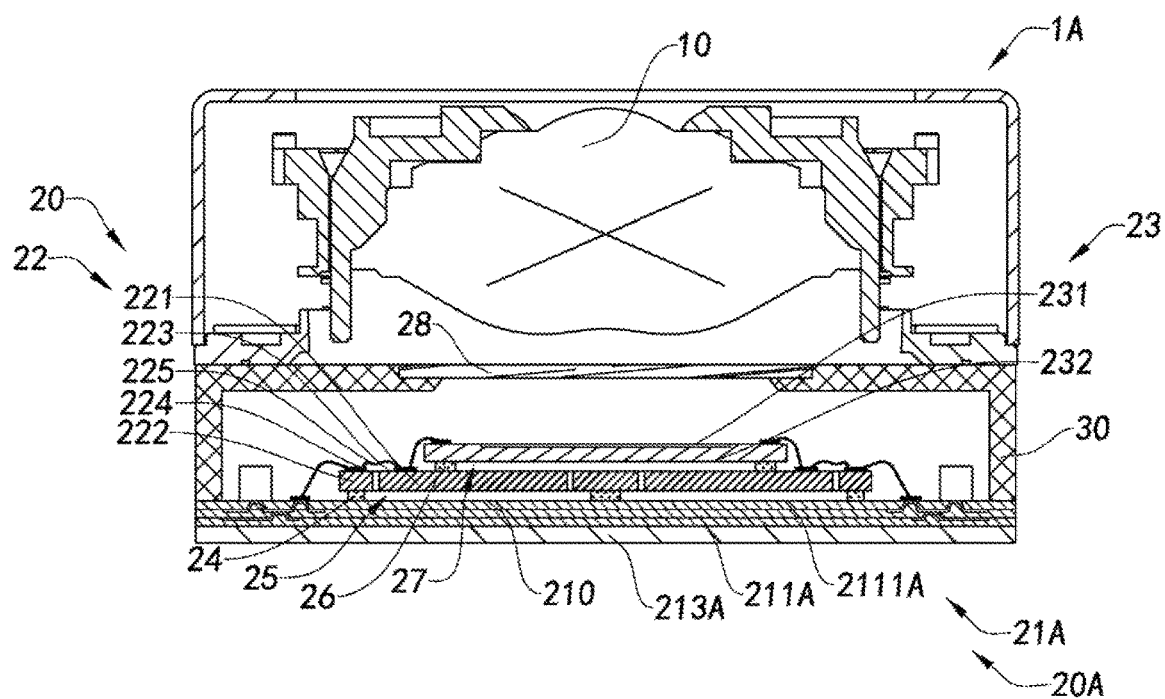
FIG. 10 shows a modified implementation of the anti-shake camera module according to the above second preferred embodiment of the invention.

FIG. 10 shows a modified implementation of the anti-shake camera module 1A according to the second preferred embodiment of the invention, wherein the circuit board 211A is made through a redistribution layer process, so as to provide the attachment surface 210 with high flatness. In other words, the circuit board 211A is implemented as a redistribution layer circuit board (i.e., an RDL circuit board), so that the mounting region 2111A of the circuit board 211A can have a higher flatness, so as to meet the strict requirements on the flatness of the attachment surface 210 for the driver 22, thereby effectively preventing the normal operation of the driver 22 from being affected by the circuit board 211A.

Further, as shown in FIG. 10, the circuit board assembly 21A further includes a strengthening element 213A, wherein the strengthening element 213A is arranged on the bottom side of the circuit board 211A, so as to strengthen strength of the circuit board 211A, prevent the circuit board 211A from being deformed, and avoid damage on the flatness of the attachment surface 210 due to deformation of the circuit board 211A, thereby ensuring the normal operation of the driver 22.

Preferably, the strengthening element 213A is implemented as a steel plate, wherein the steel plate is mounted on the bottom side of the circuit board 211A, so as to strengthen the circuit board 211A and also increase the heat dissipation of the circuit board 211A, thereby enhancing the heat dissipation performance of the anti-shake camera module 1A.

It is worth noting that, in the second preferred embodiment of the invention, in addition to the above differences of the structure, other structures of the anti-shake camera module 1A are the same as those of the anti-shake camera module 1 according to the first preferred embodiment of the invention. In addition, the anti-shake camera module 1A also has modified implementations the same as or similar to various modified implementations of the anti-shake camera module 1 according to the first preferred embodiment, and they will not be repeated herein.

Figure 11:
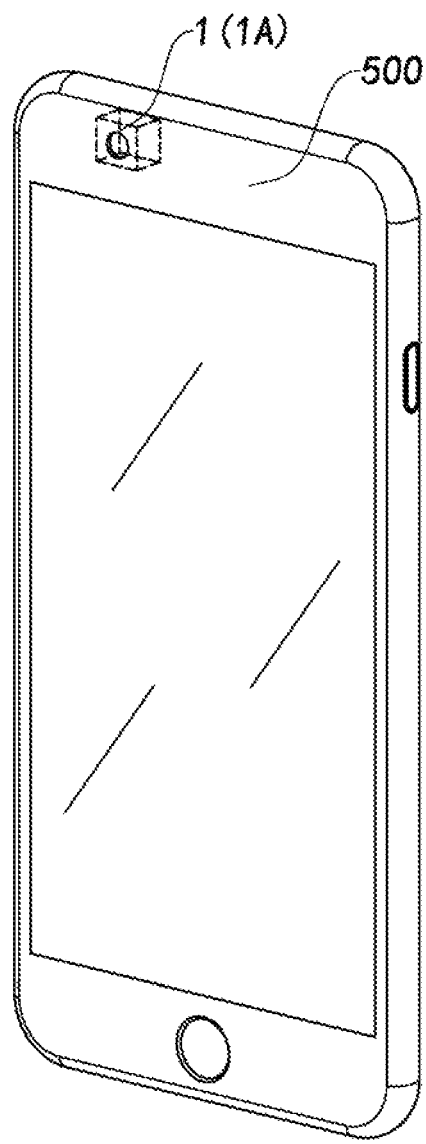
FIG. 11 is a schematic diagram of an electronic device with the anti-shake camera module according to the first or second preferred embodiment of the invention.

Referring to FIG. 11, according to another aspect of the invention, the invention further provides an electronic device, wherein the electronic device includes an electronic device body 500 and at least one anti-shake camera module 1 or 1A, wherein each anti-shake camera module 1 or 1A is respectively arranged in the electronic device body 500 for acquiring images. It is worth mentioning that, the type of the electronic device body 500 is not limited. For example, the electronic device body 500 may be any electronic device capable of being equipped with the anti-shake camera module, such as a smart phone, a tablet computer, a notebook computer, an e-book, a personal digital assistant, a camera, etc. Those skilled in the art may understand that, although in FIG. 11 the electronic device body 500 implemented as a smart phone is taken as an example, it does not constitute a limitation to the content and scope of the invention.

Figure 12:
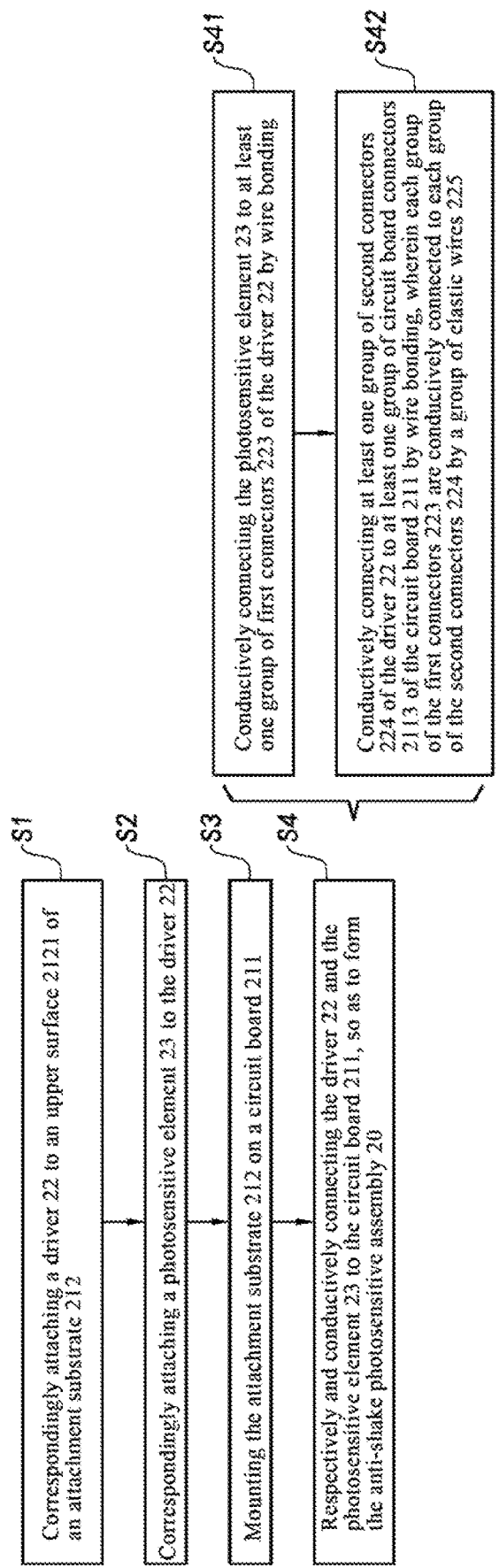
FIG. 12 is a schematic flowchart of a method for manufacturing the anti-shake photosensitive assembly according to the above first preferred embodiment of the invention.

According to another aspect of the invention, the invention further provides a method for manufacturing the anti-shake photosensitive assembly 20. Particularly, as shown in FIG. 12, the method for manufacturing the anti-shake photosensitive assembly 20 includes the following steps:

S1: correspondingly attaching a driver 22 to an upper surface 2121 of an attachment substrate 212;

S2: correspondingly attaching a photosensitive element 23 to the driver 22;

S3: mounting the attachment substrate 212 on a circuit board 211; and

S4: respectively and conductively connecting the driver 22 and the photosensitive element 23 to the circuit board 211, so as to form the anti-shake photosensitive assembly 20.

Particularly, the step S4 includes the following steps:

S41: conductively connecting the photosensitive element 23 to at least one group of first connectors 223 of the driver 22 by wire bonding; and S42: conductively connecting the at least one group of second connectors 224 of the driver 22 to at least one group of circuit board connectors 2113 of the circuit board 211 by wire bonding, wherein each group of the first connectors 223 are conductively connected to each group of the second connectors 224 by a group of elastic wires 225.

It is worth noting that, in the method for manufacturing the anti-shake photosensitive assembly 20, the order of the step S1, the step S2, and the step S3 is only an example. In some other embodiments of the invention, the step S2, the step S1, and the step S3 may be performed in sequence; alternatively, the step S3, the step S1, and the step S2 may also be performed in sequence; the order of performing the step S1, the step S2, and the step S3 is not further limited in the invention.

Figure 13:
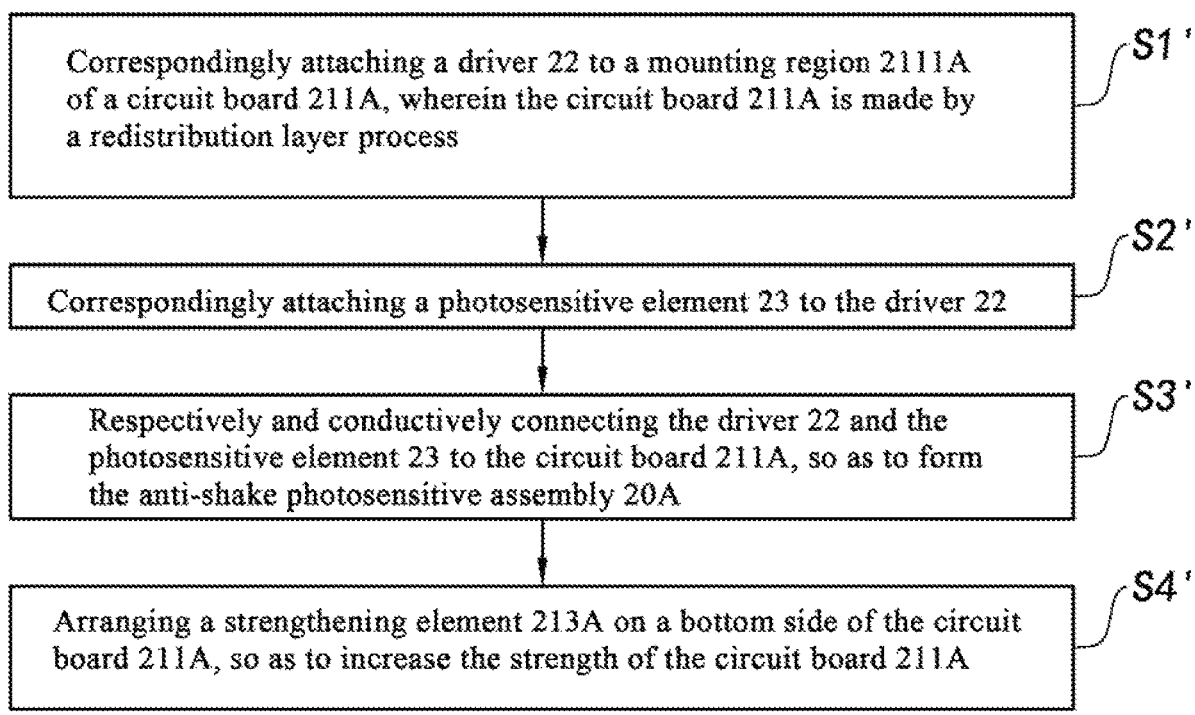
FIG. 13 is a schematic flowchart of a method for manufacturing an anti-shake photosensitive assembly of the anti-shake camera module according to the above second preferred embodiment of the invention.

According to another aspect of the invention, the invention further provides a method for manufacturing the anti-shake photosensitive assembly 20A. Particularly, as shown in FIG. 13, the method for manufacturing the anti-shake photosensitive assembly 20A includes the following steps:

S1': correspondingly attaching a driver 22 to a mounting region 2111A of a circuit board 211A, wherein the circuit board 211A is made by a redistribution layer process;

S2': correspondingly attaching a photosensitive element 23 to the driver 22; and S3': respectively and conductively connecting the driver 22 and the photosensitive element 23 to the circuit board 211A, so as to form the anti-shake photosensitive assembly 20A.

Further, the method for manufacturing the anti-shake photosensitive assembly 20A further includes the following step:

S4': arranging a strengthening element 213A on a bottom side of the circuit board 211A, so as to increase the strength of the circuit board 211A.

It is worth noting that, as shown in FIG. 13, in the method for manufacturing the anti-shake photosensitive assembly 20A, the step S1' and the step S2' are respectively similar to the step S1 and the step S2 in the method for manufacturing the anti-shake photosensitive assembly 20, and the first glue and the second glue are respectively used for bonding, so as to implement the corresponding attaching step.

According to another aspect of the invention, the invention further provides a method for manufacturing an anti-shake camera module 1 or 1A, including the following steps:

manufacturing the anti-shake photosensitive assembly 20 or 20A according to the above method for manufacturing the anti-shake photosensitive assembly 20 or 20A; and correspondingly arranging an optical lenses 10 on the photosensitive path of the photosensitive element 23 of the anti-shake photosensitive assembly 20 or 20A, so as to form the anti-shake camera module 1 or 1A.

Referring to FIGS. 14-23 of the accompanying drawings of the specification of the invention, in order to solve the above problems, a third preferred embodiment of the invention provides an anti-shake camera module 91, wherein the anti-shake camera module 91 includes at least one optical lenses 910 and an anti-shake photosensitive assembly 920, wherein the anti-shake photosensitive assembly 920 further includes a circuit board assembly 921, at least one driver 922, and at least one photosensitive element 923; the circuit board assembly 921 provides at least one flat attachment surface 9210; each driver 922 is respectively attached to each attachment surface 9210 of the circuit board assembly 921; each photosensitive element 923 is respectively and correspondingly arranged on the driver 922, and the driver 922 is located between the photosensitive element 923 and the attachment surface 9210 of the circuit board assembly 921, so as to move the corresponding photosensitive element 923 through each driver 922; and wherein each optical lenses 910 are respectively and correspondingly arranged on a photosensitive path of the photosensitive element 923, so as to form the anti-shake camera module 91.

It should be understood that, in order to ensure normal operation of the driver 922, the flatness of each attachment surface 9210 of the circuit board assembly 921 is preferably controlled within 15 um.

It is worth mentioning that, although in FIGS. 14-23 and the following description, the anti-shake camera module 91 including only one optical lens 910 and one driver 922 is taken as an example to illustrate the features and advantages of the anti-shake camera module 91 according to the invention. Those skilled in the art should understand that the anti-shake camera module 91 disclosed in FIGS. 14-23 and the following description is only used as an example, and it does not constitute a limitation to the content and scope of the invention. For example, in other examples of the anti-shake camera module 91, the number of the optical lenses 910 may also be more than one, so as to form an array of anti-shake camera modules.

Preferably, the driver 922 is implemented as a MEMS (micro-electro-mechanical system, also known as a micromotor) to move the photosensitive element 923 through the MEMS, so as to compensate for the offset or rotation of the photosensitive chip due to shake, thereby realizing the anti-shake function of the anti-shake camera module 91. It should be understood that, the movement of the photosensitive element 923 by the MEMS includes both translation of the photosensitive element 923 and rotation of the photosensitive element 923, so as to compensate for the offset or rotation of the photosensitive element 923.

Figure 16:
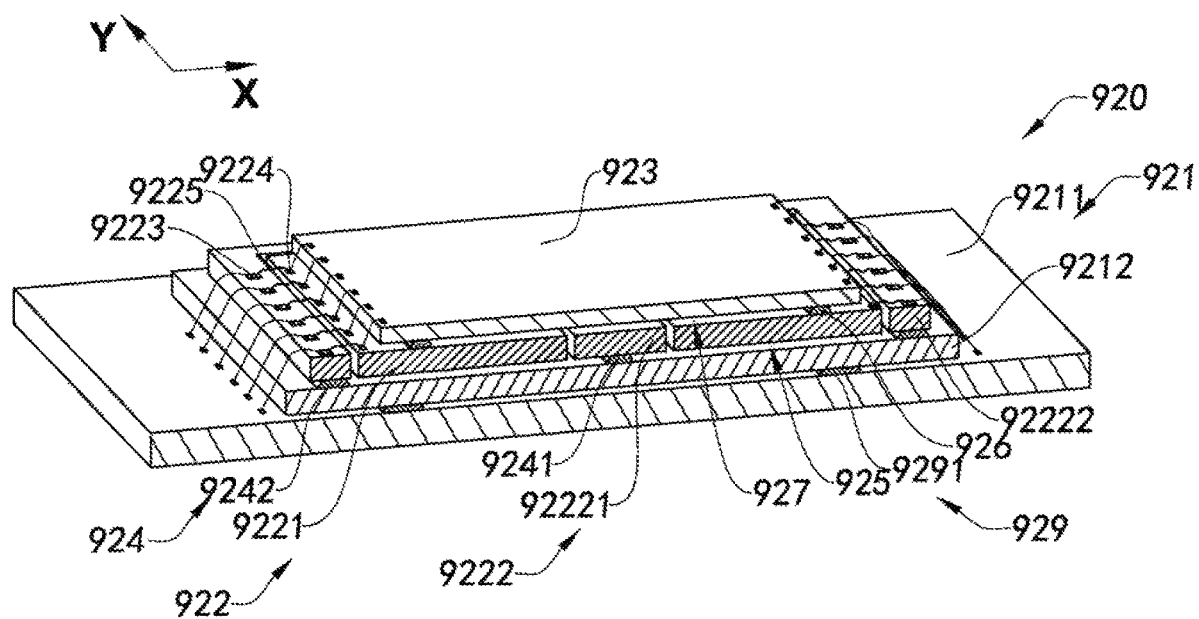
FIG. 16 is a schematic perspective cross-section view of an anti-shake photosensitive assembly of the anti-shake camera module according to the above third preferred embodiment of the invention.

Particularly, as shown in FIG. 16, the driver 922 generally includes a movable portion 9221 and a non-movable portion 9222 partially connected to the movable portion 9221, wherein the non-movable portion 9222 of the driver 922 is fixedly attached to the attachment surface 9210 of the circuit board assembly 921, and the photosensitive element 923 is correspondingly attached to the movable portion 9221 of the driver 922, so as to move the photosensitive element 923 through the movable portion 9221 of the driver 922, thereby realizing the anti-shake function of the anti-shake camera module 91. It should be understood that, when the attachment surface 9210 is used to establish a plane coordinate system XY, the movable portion 9221 of the driver 922 attached to the attachment surface 9210 may shift in a X-axis direction and a Y-axis direction, and rotate in a XY plane, thereby realizing the anti-shake function of translation in the X-axis direction and the Y-axis direction and rotation in the XY plane through the driver 922.

More Particularly, as shown in FIG. 16, the driver 922 further includes at least one group of first connectors 9223, at least one group of second connectors 9224, and at least one group of elastic wires 9225, wherein each group of first connectors 9223 are arranged on the movable portion 9221 of the driver 922, each group of the second connectors 9224 are arranged on the non-movable portion 9222 of the driver 922, and wherein each group of the first connectors 9223 and each group of the second connectors 9224 are conductively connected by each group of the elastic wires 9225. It should be understood that, the elastic wire 9225 of the driver 922 may be made of a conductive material with certain elasticity, such as aluminum wire, thereby utilizing the elastic deformation of the elastic wire 9225 to prevent the movement of the movable portion 9221 of the driver 922 from being affected by the immovability of the driver 922.

It should be understood that, the first and second connectors 9223 and 9224 of the driver 922 may be connection disks respectively, i.e., the first and second connectors 9223 and 9224 of the driver 922 may be in a shape of a disk respectively, so that the two ends of the elastic wire 9225 are respectively conductively connected to the first and second connectors 9223, 9224 of the driver 22. It should be understood that, in other embodiments of the invention, the first and second connectors 9223, 9224 of the driver 922 may also be spherical or other shapes respectively, which are not limited in the invention.

It is worth mentioning that, in order to prevent the normal movement of the movable portion 9221 of the driver 922 from being interfered by the attachment surface 9210 of the circuit board assembly 921, it is necessary to reserve a certain safety distance between the attachment surface 9210 of the circuit board assembly 921 and the movable portion 9221 of the driver 922. Therefore, while the driver 922 is firmly attached to the attachment surface 9210 of the circuit board assembly 921, it is also necessary to ensure that there is a certain safety distance between the attachment surface 9210 of the circuit board assembly 921 and the movable portion 9221 of the driver 922.

Particularly, as shown in FIG. 16, according to the third preferred embodiment of the invention, the anti-shake photosensitive assembly 920 further includes a first supporting element 924, wherein the first supporting element 924 is arranged between the attachment surface 9210 of the circuit board assembly 921 and the non-movable portion 9222 of the driver 922, so that the driver 922 is firmly attached to the attachment surface 9210 of the circuit board assembly 921 through the first supporting element 924, and a first safety gap 925 is formed between the attachment surface 9210 of the circuit board assembly 921 and the movable portion 9221 of the driver 922.

It should be understood that, since the first supporting element 924 has a certain thickness, the first supporting element 924 may support the driver 922, so that a safety distance is reserved between the attachment surface 9210 of the circuit board assembly 921 and the movable portion 9221 of the driver 922. Therefore, for the anti-shake photosensitive assembly 920, the first safety gap 925 may also be formed between the attachment surface 9210 of the circuit board assembly 921 and the movable portion 9221 of the driver 922 through the first supporting element 924, and the size of the first safety gap 925 is equal to the thickness of the first supporting element 924, so as to prevent the normal operation of the driver 922 from being affected by the attachment surface 9210 of the circuit board assembly 921, thereby improving the product yield of the anti-shake camera module 91.

It is worth noting that, as shown in FIG. 16, the non-movable portion 9222 of the driver 922 generally includes an inner non-movable portion 92221 and an outer non-movable portion 92222 located around the inner non-movable portion 92221, wherein the movable portion 9221 of the driver 922 is located between the inner non-movable portion 92221 and the outer non-movable portion 92222.

Therefore, in the third preferred embodiment of the invention, as shown in FIG. 16, the first supporting element 924 includes an inner supporting body 9241 and an outer supporting body 9242 formed by curing the first glue, wherein the inner supporting body 9241 of the first supporting element 924 is located between the inner non-movable portion 92221 of the non-movable portion 9222 of the driver 922 and the attachment surface 9210 of the circuit board assembly 921; the outer supporting body 9242 of the first supporting element 924 is located between the outer non-movable portion 92222 of the non-movable portion 9222 of the driver 922 and the attachment surface 9210 of the circuit board assembly 921; in addition, the outer supporting body 9242 is located around the inner supporting body 9241, so that not only the non-movable portion 9222 of the driver 922 and the attachment surfaces 9210 of the circuit board assembly 921 may be firmly bonded together by the viscosity of the first glue, but also the first supporting element 924 with a certain thickness and strength may be formed by the first glue after curing, so that the first safety gap 925 between the movable portion 9221 of the driver 922 and the attachment surface 9210 of the circuit board assembly 921 may be kept stable, thereby preventing the normal operation of the driver 922 from being affected by the attachment surface 9210 of the circuit board assembly 921.

It should be understood that, in the third preferred embodiment of the invention, each group of the second connectors 9224 are arranged on the outer non-movable portion 92222 of the non-movable portion 9222 of the driver 922, so that each group of the second connectors 9224 are conductively connected to the circuit board assembly 921.

Preferably, the first glue is implemented as particle glue, wherein the largest particles in the particle glue have same diameters and are evenly distributed, so as to ensure that the size of the first safety gap 925 between the driver 922 and the attachment surface 9210 of the circuit board assembly 921 is equal to the diameter of the largest particle in the particle glue, thereby ensuring that the driver 922 may maintain a high flatness. It is worth mentioning that, in some other embodiments of the invention, the first glue used to form the first supporting element 924 may also be thermosetting glue or other types of glue.

More preferably, the size of the first safety gap 925 is equal to 25 um, i.e., the diameter of the largest particle in the particle glue is equal to 25 um.

Figure 17:
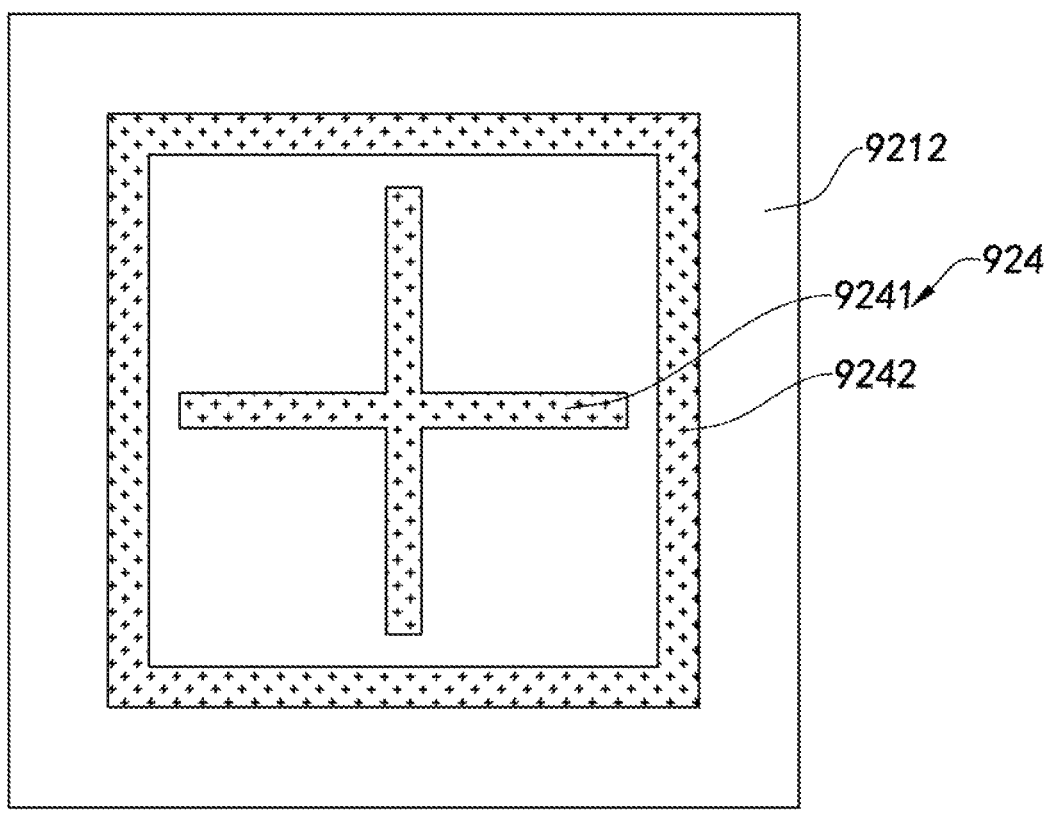
FIG. 17 is a schematic top view of a first supporting element of the anti-shake photosensitive assembly according to the above third preferred embodiment of the invention.

Further, as shown in FIGS. 16-17, the inner supporting body 9241 of the first supporting element 924 has a cross-shaped structure, and the outer supporting body 9242 of the first supporting element 924 has a square-shaped structure, and the inner supporting body 9241 with a cross-shaped structure is combined with the outer supporting body 9242 with a square-shaped structure to form the first supporting element 924 with a grid-shaped structure, so that the first supporting element 924 is evenly arranged between the driver 922 and the attachment surface 9210 of the circuit board assembly 921. This not only ensures that the non-movable portion 9222 of the driver 922 and the circuit board assembly 921 are firmly bonded together through the first supporting element 924, but also ensures that a more stable first safety gap 925 is formed between the movable portion 9221 of the driver 922 and the attachment surface 9210 of the circuit board assembly 921.

It should be understood that, the first supporting element 924 may be designed according to the structure of the non-movable portion 9222 of the driver 922, so that the structure of the first supporting element 924 is similar to the structure of the non-movable portion 9222 of the driver 922, so as to ensure that the non-movable portion 9222 of the driver 922 and the circuit board assembly 921 are firmly bonded together through the first supporting element 924, and the stable first safety gap 925 is formed between the movable portion 9221 of the driver 922 and the attachment surface 9210 of the circuit board assembly 921. In other words, the inner supporting body 9241 of the first supporting element 924 is designed according to the shape of the inner non-movable portion 92221 of the non-movable portion 9222 of the driver 922, so that the shape of the inner supporting body 9241 is similar to the shape of the inner non-movable portion 92221; the outer supporting body 9242 of the first supporting element 924 is designed according to the shape of the outer non-movable portion 92222 of the non-movable portion 9222 of the driver 922, so that the shape of the outer supporting body 9242 is similar to the shape of the outer non-movable portion 92222.

Exemplarily, the outer non-movable portion 92222 of the non-movable portion 9222 of the driver 922 has a square-shaped structure, and the inner non-movable portion 92221 of the non-movable portion 9222 of the driver 922 has a cross-shaped structure, then the outer supporting body 9242 of the first supporting element 924 corresponds to the outer non-movable portion 92222 of the non-movable portion 9222, so that the outer supporting body 9242 has a square structure; while the inner supporting body 9241 of the first supporting element 924 corresponds to the inner non-movable portion 92221 of the non-movable portion 9222, so that the inner supporting body 9241 has a cross-shaped structure, thereby achieving a better attachment effect.

Similarly, in order to prevent the normal movement of the movable portion 9221 of the driver 922 from being interfered by the photosensitive element 923, it is also necessary to reserve a certain safety distance between the photosensitive element 923 and the movable portion 9221 of the driver 922. Therefore, while the photosensitive element 923 is firmly attached to the driver 922, it is also necessary to ensure that there is a certain safety distance between the photosensitive element 923 and the movable portion 9221 of the driver 922.

Figure 18A:
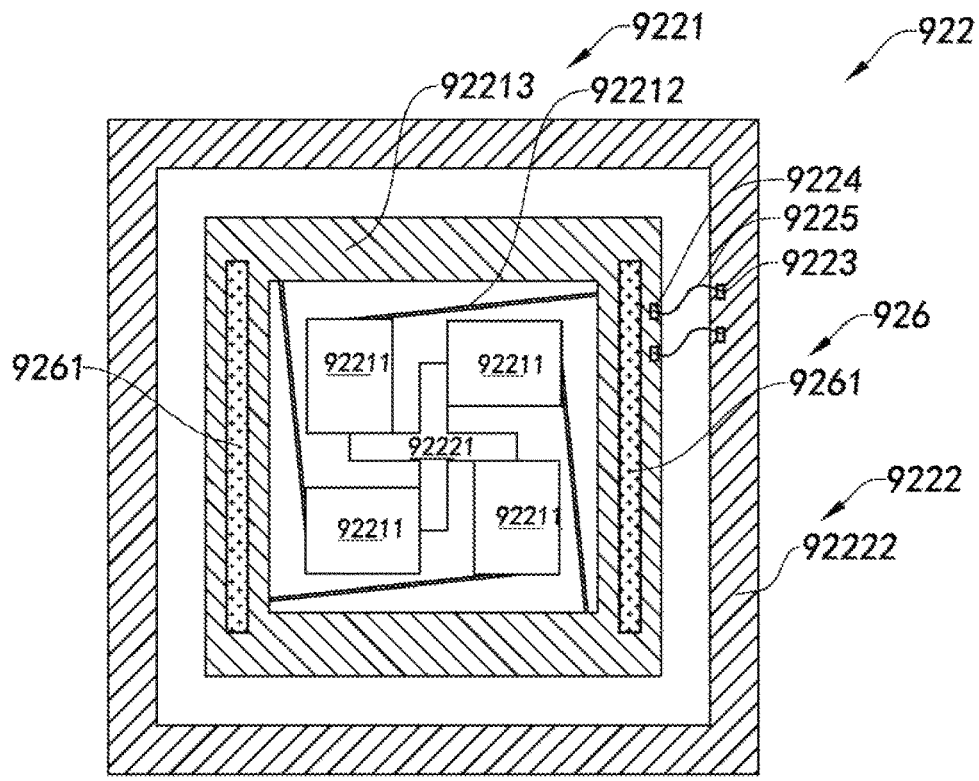
FIG. 18A is a schematic top view of a second supporting element of the anti-shake photosensitive assembly according to the above third preferred embodiment of the invention.

Particularly, as shown in FIGS. 16 and 18A, in the third preferred embodiment of the invention, the anti-shake photosensitive assembly 920 further includes a second supporting element 926, wherein the second supporting element 926 is arranged between a bottom surface 9232 of the photosensitive element 923 and the movable portion 9221 of the driver 922, so that the photosensitive element 923 is firmly attached to the movable portion 9221 of the driver 922 through the second supporting element 926, and a second safety gap 927 is formed between the bottom surface 9232 of the photosensitive element 923 and the movable portion 9221 of the driver 922. It is worth noting that, in the anti-shake camera module 91, the bottom surface 9232 of the photosensitive element 923 and the driver 922 are attached together, and a top surface 9231 of the photosensitive element 923 faces toward the optical lenses 910, so that the top surface 9231 of the photosensitive element 923 may receive light passing through the optical lenses 910, i.e., the photosensitive surface of the photosensitive element 923 is located on the top surface 9231 of the photosensitive element 923.

It should be understood that, since the second supporting element 926 has a certain thickness, the second supporting element 926 may support the photosensitive element 923, so that a safety distance is reserved between the photosensitive element 923 and the movable portion 9221 of the driver 922, therefore for the anti-shake photosensitive assembly 920, the second safety gap 927 is formed between the bottom surface 9232 of the photosensitive element 923 and the movable portion 9221 of the driver 922 through the second supporting element 926, and the size of the second safety gap 927 is equal to the thickness of the second supporting element 926, so as to prevent the normal operation of the driver 922 from being affected by the photosensitive element 923, thereby improving the product yield of the anti-shake camera module 91.

It is worth mentioning that, as shown in FIG. 18A, the movable portion 9221 of the driver 922 usually includes at least one actuator 92211, at least one connecting arm 92212, and a frame 92213, wherein each actuator 92211 of the movable portion 9221 is connected to the inner non-movable portion 92221 of the non-movable portion 9222, and wherein two ends of each connecting arm 92212 are respectively connected to each actuator 92211 and the frame 92213, so that each actuator 92211 may be controlled to move the frame 92213 through each connecting arm 92212, so as to move the photosensitive element 923 attached to the movable portion 9221 of the driver 922, thereby realizing the anti-shake function of the anti-shake camera module 91. It should be understood that, in the third preferred embodiment of the invention, each group of the first connector 9223 are arranged on the frame 92213 of the movable portion 9221 of the driver 922, so that each group of the first connectors 9224 located at the frame 92213 of the movable portion 9221 and each group of the second connectors 9223 located at the outer non-movable portion 92222 of the non-movable portion 9222 are conductively connected through the elastic wires 9225.

However, in order to ensure that the driver 922 may work normally, it is necessary to prevent the photosensitive element 923 attached to the movable portion 9221 of the driver 922 from being directly contacted with the actuator 92211 of the movable portion 9221, and reserve a certain safety distance between the bottom surface 9232 of the photosensitive element 923 and the actuator 92211 of the movable portion 9221.

Therefore, in the third preferred embodiment of the invention, as shown in FIG. 18A, the second supporting element 926 includes at least a pair of second supporting bodies 9261 formed by curing the second glue, wherein each pair of second supporting bodies 9261 are symmetrically arranged between the frame 92213 of the movable portion 9221 of the driver 922 and the bottom surface 9232 of the photosensitive element 923, so that not only the photosensitive element 923 and the driver 922 may be firmly bonded together by the viscosity of the second glue, but also the second supporting element 926 with a certain strength may be formed by the second glue after curing, so that the second safety gap 927 between the movable portion 9221 of the driver 922 and the bottom surface 9232 of the photosensitive element 923 may be kept stable, thereby preventing the normal operation of the driver 922 from being affected by the photosensitive element 923. In other words, the stable second safety gap 927 may be formed between the actuator 92211 of the movable portion 9221 of the driver 922 and the bottom surface 9232 of the photosensitive element 923 through the second supporting body 9261 of the second supporting element 926, thereby preventing the normal operation of the driver 922 from be affected by contacting the photosensitive element 923 with the actuator 92211 of the movable portion 9221 of the driver 922.

Preferably, the second glue is implemented as the particle glue, so as to ensure that the size of the second safety gap 927 between the driver 922 and the bottom surface 9232 of the photosensitive element 923 is equal to the size of the diameter of the largest particle in the particle glue, thereby ensuring that the driver 922 may maintain a high flatness. It is worth mentioning that, in some other embodiments of the invention, the second glue used to form the second supporting element 926 may also be thermosetting glue, or other types of glue.

More preferably, the size of the second safety gap 927 is equal to 25 um, i.e., the diameter of the largest particle in the particle glue is equal to 25 um.

Exemplarily, as shown in FIG. 18A, the second supporting element 926 includes a pair of the second supporting bodies 9261 with a linear shaped structure, wherein one of the second supporting bodies 9261 may also be located at a left side of the frame 92213 of the movable portion 9221 of the driver 922, and the other second supporting body 9261 is located at a right side of the frame 92213 of the movable portion 9221 of the driver 922, so as to form the second supporting element 926 with a II-shaped structure, so that the second supporting element 926 is symmetrically arranged between the driver 922 and the photosensitive element 923. This not only ensures that the photosensitive element 923 and the frame 92213 of the movable portion 9221 of the driver 922 are firmly bonded together, but also ensures that the more stable second safety gap 927 is formed between the actuator 92211 of the movable portion 9221 of the driver 922 and the photosensitive element 923.

It should be understood that, in some other embodiments of the invention, one of the pair of second supporting bodies 9261 with a linear shaped structure of the second supporting element 926 is located at a front side of the frame 92213 of the movable portion 9221 of the driver 922, and the other second supporting body 9261 is located at a rear side of the frame 92213 of the movable portion 9221 of the driver 922, so as to form the second supporting element 926 with a lying II-shaped structure and allow the second supporting element 926 to be symmetrically arranged between the driver 922 and the photosensitive element 923.

Figure 18B:
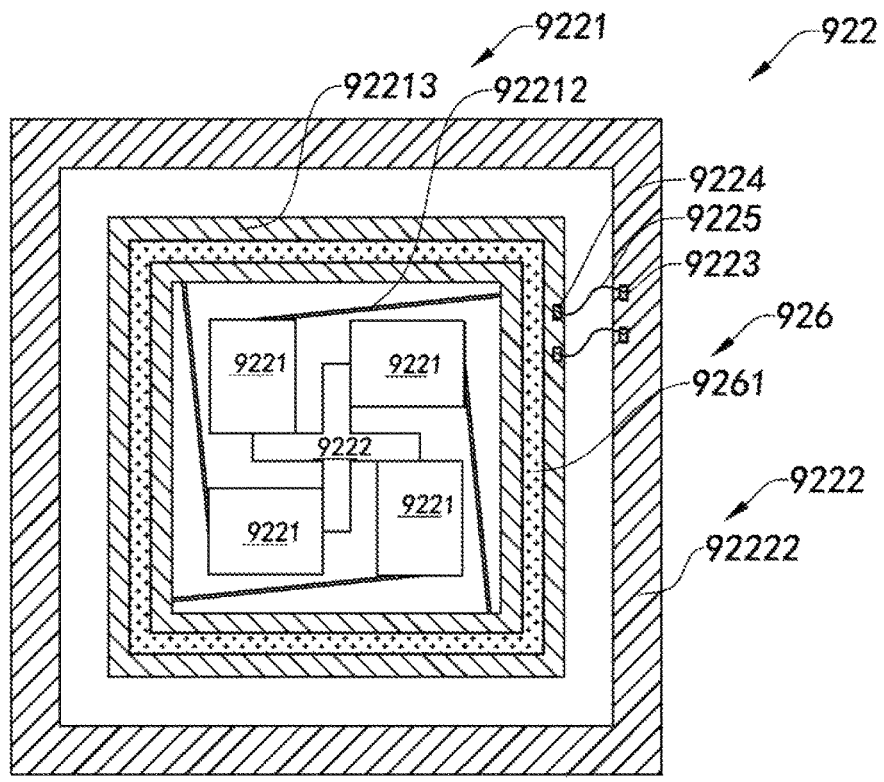
FIG. 18B shows a modified implementation of the second supporting element according to the above third preferred embodiment of the invention.

It is worth mentioning that, FIG. 18B shows a modified implementation of the second supporting element 926 of the anti-shake photosensitive assembly 920, wherein the second supporting element 926 includes a second supporting body 9261 with a linear shaped structure, a pair of the second supporting bodies 9261 are symmetrically arranged at the front and rear sides of the frame 92213 of the movable portion 9221 of the driver 922, and the other pair of the supporting bodies 9261 are symmetrically arranged at the left and right sides of the frame 92213 of the movable portion 9221 of the driver 922, and wherein the two pairs of second supporting bodies 9261 are connected end-to-end in sequence to form the second supporting element 926 with a square-shaped structure, so as to ensures that the frame 92213 of the movable portion 9221 of the driver 922 and the photosensitive element 923 are firmly bonded together through the second supporting element 926, and the more stable second safety gap 927 is formed between the actuator 92211 of the movable portion 9221 of the driver 922 and the photosensitive element 923.

It should be understood that, the second supporting element 926 may also be designed according to the structure of the frame 92213 of the movable portion 9221 of the driver 922, so that the structure of the second supporting element 926 is similar to the structure of the frame 92213 of the movable portion 9221 of the driver 922. In other words, the second supporting body 9261 of the second supporting element 926 may be designed according to the shape of the frame 92213 of the movable portion 9221 of the driver 922, so that the shape of the second supporting body 9261 of the second supporting element 926 is similar to the shape of the frame 92213. Exemplarily, when the frame 92213 of the movable portion 9221 of the driver 922 has a ring-shaped structure, the second supporting body 9261 of the second supporting element 926 corresponds to the frame 92213, so that the second supporting element 926 has a ring-shaped structure, thereby achieving a better attachment effect.

Figure 15:
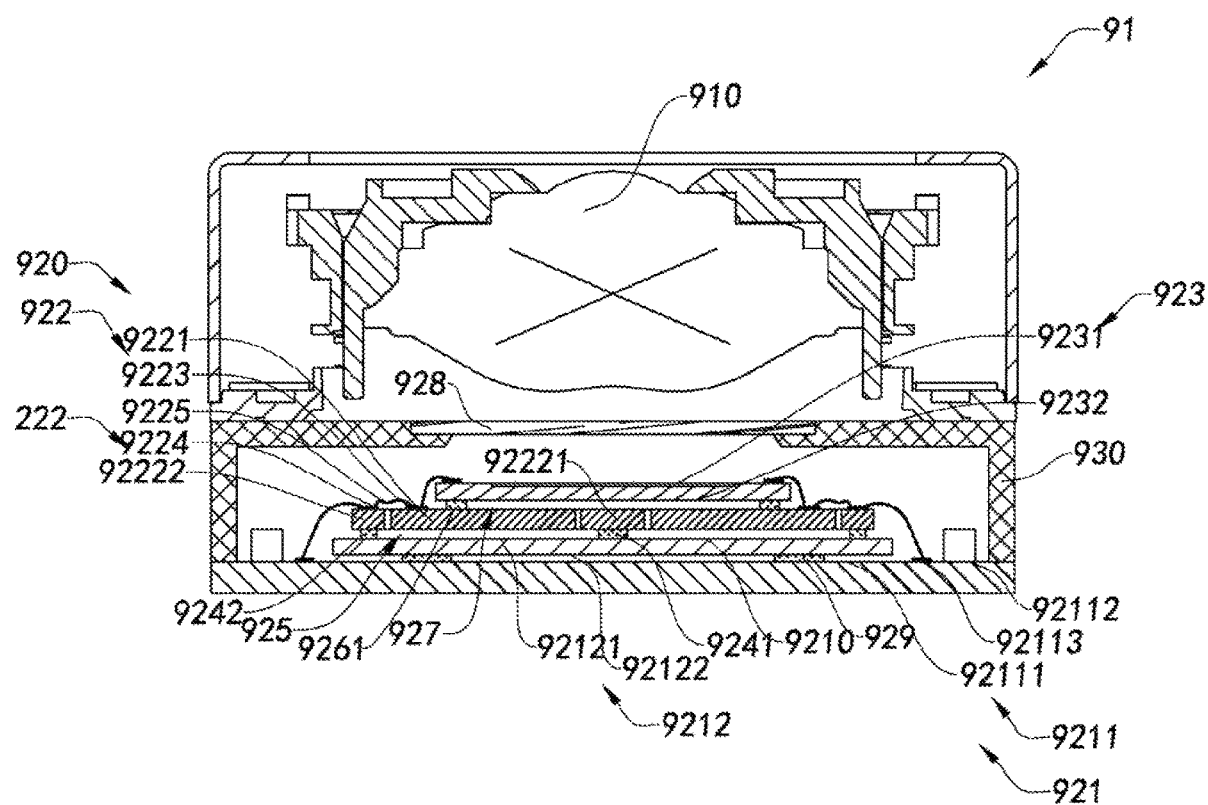
FIG. 15 is a schematic cross-section view of the anti-shake camera module according to the above third preferred embodiment of the invention.

According to the third preferred embodiment of the invention, as shown in FIGS. 15 and 16, the circuit board assembly 921 includes a circuit board 9211 and an attachment substrate 9212 arranged on the circuit board 9211, wherein the attachment substrate 9212 is made of a material with a certain strength and flatness, so as to provide the attachment surface 9210 with high flatness through the attachment substrate 9212, so that the driver 922 is directly attached to the attachment substrate 9212, thereby preventing the normal operation of the driver 922 from being affected by the uneven circuit board.

Preferably, as shown in FIG. 15, the attachment substrate 9212 is implemented to have a flat-plate structure, and the attachment substrate 9212 has a flat upper surface 92121 and a lower surface 92122 parallel to the upper surface 92121, wherein when the lower surface 92122 of the attachment substrate 9212 is mounted on the circuit board 9211, the upper surface 92121 of the attachment substrate 9212 is used as the attachment surface 9210 of the circuit board assembly 921. It should be understood that, in some other embodiments of the invention, the upper surface 92121 of the attachment substrate 9212 is a flat plane to serve as the attachment surface 9210 of the circuit board assembly 921, and the lower surface 92122 of the attachment substrate 9212 is an uneven curved surface; alternatively, the lower surface 92122 of the attachment substrate 9212 may also be arranged with a plurality of legs, so that the attachment substrate 9212 may be fixedly installed on the circuit board 9211 through the legs.

More preferably, the attachment substrate 9212 is made of steel, so that the attachment substrate 9212 is implemented as a steel plate 9212 with higher strength and flatness, wherein when the lower surface 92122 of the steel plate 9212 is mounted on the circuit board 9211, the upper surface 92121 of the steel plate 9212 is used as the attachment surface 9210, so as to provide the driver 922 with the attachment surface 9210 with high flatness.

In other words, after the steel plate 9212 is specially processed and treated, the upper surface 92121 of the steel plate 9212 may have a high flatness, so as to serve as the attachment surface 9210 of the circuit board assembly 921. The steel plate 9212 has high strength and is not easy to deform, so that the steel plate 9212 may stably provide the attachment surface 9210 with high flatness for a long time, thereby preventing the flatness of the attachment surface 9210 from being affected by factors such as external force, temperature change, and long-term use, etc. In addition, since the steel has a relatively large thermal conductivity, the steel plate 9212 has good thermal conductivity and heat dissipation capabilities. Therefore, the steel plate 9212 also helps to improve the heat dissipation performance of the anti-shake camera module 91. It should be understood that, in some other embodiments of the invention, the attachment substrate 9212 may also be made of materials with a certain strength and flatness, such as a polymer material, an alloy, a metal, a ceramics, etc., so as to provide a stable attachment surface 9210 with high flatness through the attachment substrate 9212, thereby avoiding the influence of the circuit board 9211 on the driver 922.

Figure 19A:
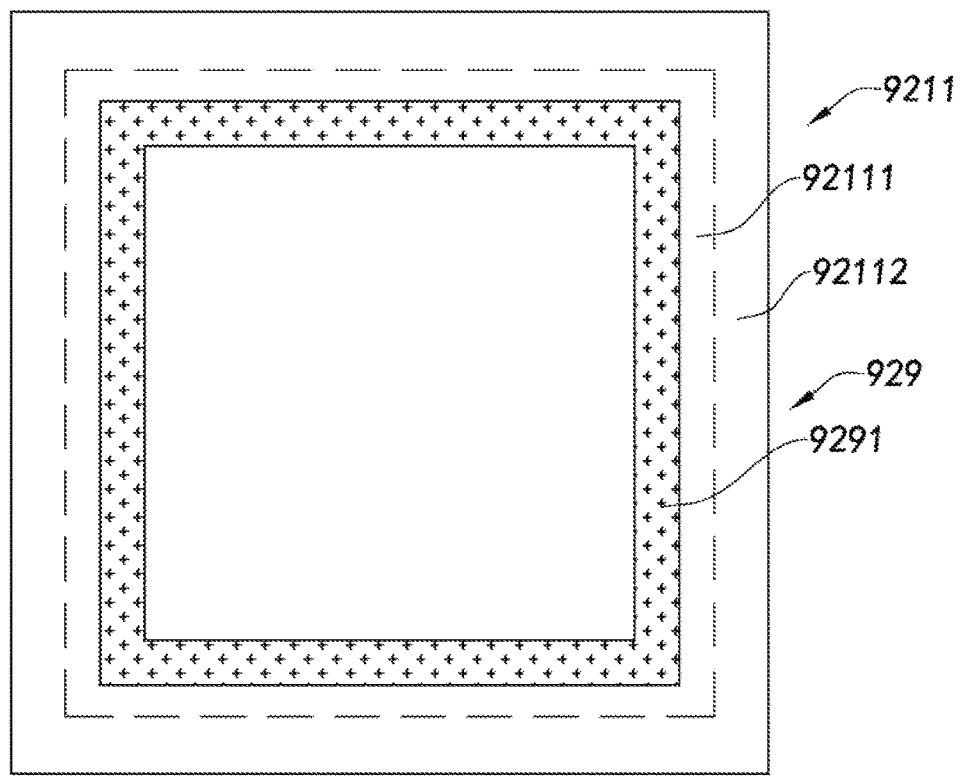
FIG. 19A is a schematic top view of an adhesive element of the anti-shake photosensitive assembly according to the above third preferred embodiment of the invention.

It is worth mentioning that, in the third preferred embodiment of the invention, as shown in FIGS. 16 and 19A, the circuit board 9211 includes a mounting region 92111, an edge region 92112, and at least one group of circuit board connectors 92113, wherein the mounting region 92111 and the edge region 92112 are integrally formed, and the edge region 92112 is located around the mounting region 92111, i.e., the mounting region 92111 is located in the middle of the circuit board 9211, the edge region 92112 is located outside the circuit board 9211, and wherein each group of the circuit board connectors 92113 are respectively arranged on the edge region 92112 of the circuit board 9211, and the attachment substrate 9212 is mounted on the mounting region 92111 of the circuit board 9211, so that each group of the circuit board connectors 92113 are located around the attachment substrate 9212, i.e., each group of the circuit board connectors 92113 are mounted around the driver 922 of the upper surface 92121 of the attachment substrate 9212, so as to help conductively connect the driver 922 and the circuit board 9211.

It should be understood that, in order to conductively connect the photosensitive element 923 and the circuit board 922, each group of the second connectors 9224 of the driver 922 are conductively connected to the circuit board connectors 92113 of the circuit board 9211 by wire bonding through a group of lead wires; accordingly, each group of the first connectors 9223 of the driver 922 may also be connected to the photosensitive element 923 by wire bonding through another group of lead wires, so that the photosensitive element 923 is conductively connected to the circuit board 9211 through the first connector 9223, the second connector 9224 and the elastic wire 9225 of the driver 922. It should be understood that, the types of the lead wire are not further limited in the invention. For example, the lead wire may be implemented as a gold wire, a silver wire, a copper wire, etc., and it is only necessary to ensure that the lead wire may conductively connect the circuit board 9211 and the driver 922, or conductively connect the driver 922 and the photosensitive element 923.

According to the third preferred embodiment of the invention, as shown in FIG. 16, the anti-shake photosensitive assembly 920 of the anti-shake camera module 91 further includes an adhesive element 929, wherein the adhesive element 929 is arranged between the lower surface 92122 of the attachment substrate 9212 and the mounting region 92111 of the circuit board 9211, so that the attachment substrate 9212 and the circuit board 9211 are adhered together by the adhesive element 929. It should be understood that, in some other embodiments of the invention, the attachment substrate 9212 may also be fixedly arranged on the circuit board 9211 by inlaying, welding, etc.

Preferably, as shown in FIGS. 16 and 19A, the adhesive element 929 includes at least one adhesive body 9291 formed by curing a third glue, wherein each adhesive body 9291 is arranged between the lower surface 92122 of the attachment substrate 9212 and the mounting region 92111 of the circuit board 9211, so that the substrate 9212 and the circuit board 9211 are firmly bonded together by the viscosity of the third glue. It should be understood that, the third glue used to form the adhesive element 929 may be particle glue, thermosetting glue, or other types of glue.

More preferably, the third glue is implemented as the particle glue, so that the thickness of the adhesive element 926 formed by curing the third glue is equal to the diameter of the largest particle in the particle glue, so as to ensure that the adhesive element 926 has a uniform thickness, and ensure that distances between the circuit board 9211 and the attachment substrate 9212 at different positions are equal; this helps to accurately assemble the anti-shake camera module 91.

It is worth noting that, the adhesive body 9291 of the adhesive element 929 has a specific structure, wherein the specific structure is any one selected from a group consisting of: a square-shaped structure, a lying II-shaped structure, a cross-shaped structure, a cross combining with X-shaped structure, a grid-shaped structure and a ring-shaped structure.

Exemplarily, as shown in FIG. 19A, the adhesive element 929 includes one adhesive body 9291, wherein the adhesive body 9291 has a square-shaped structure, and the adhesive body 9291 is arranged at a position adjacent to the outer peripheral edge of the mounting region 92111 of the circuit board 9211, so as to form the adhesive element 929 with a square-shaped structure located between the attachment substrate 9212 and the circuit board 9211, and it may not only firmly bond the attachment substrate 9212 and the circuit board 9211 together, but also ensure that the attachment substrate 9212 receives a uniform adhesive force, thereby preventing the attachment substrate 9212 from tilting or warping caused by uneven force.

Figure 19B:
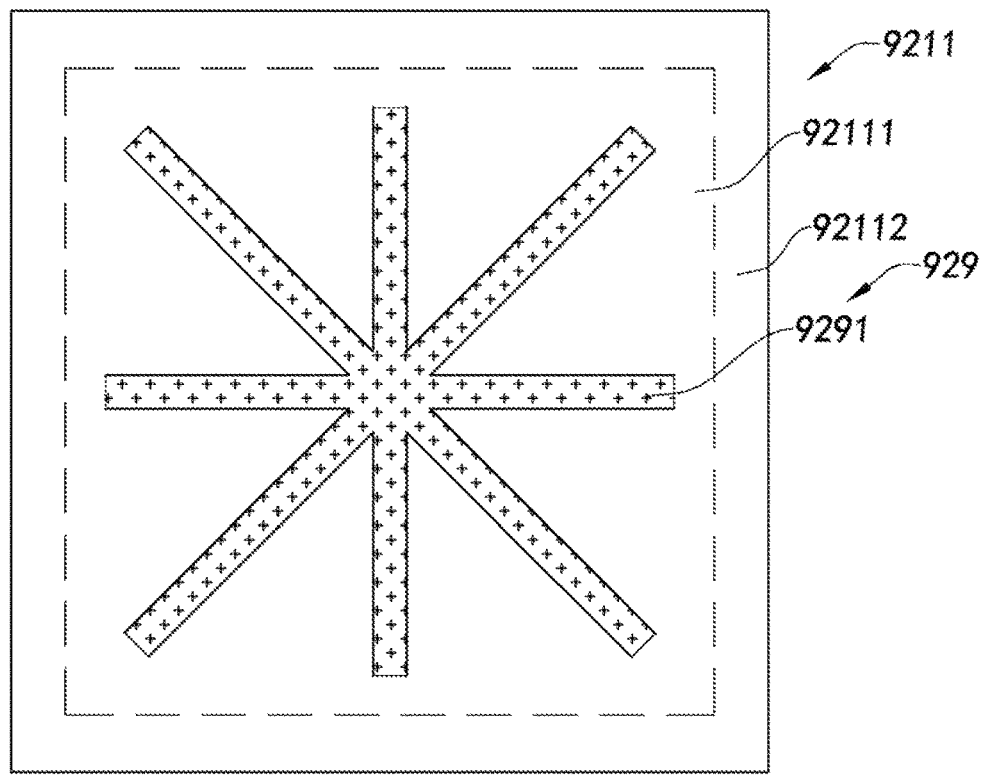
FIG. 19B shows a first modified implementation of the adhesive element according to the above third preferred embodiment of the invention.

It is worth noting that, FIG. 19B shows a first modified implementation of the adhesive element 929 of the anti-shake photosensitive assembly 920, wherein the adhesive body 9291 of the adhesive element 929 has a cross combining with X-shaped structure, so as to increase the contacting area between the adhesive body 9291 and the attachment substrate 9212 or the circuit board 9211, thereby increasing the adhesive force respectively applied to the attachment substrate 9212 and the circuit board 9212 by the adhesive element 929, thereby ensuring that the attachment substrate 9212 and the circuit board 9211 are firmly bonded. It should be understood that, in some embodiments of the invention, the adhesive body 9291 of the adhesive element 929 may also have any symmetrical structure such as a lying II-shaped structure, a cross-shaped structure, a ring-shaped structure, a planar structure, etc., and it will not be repeated in the invention.

Figure 19C:
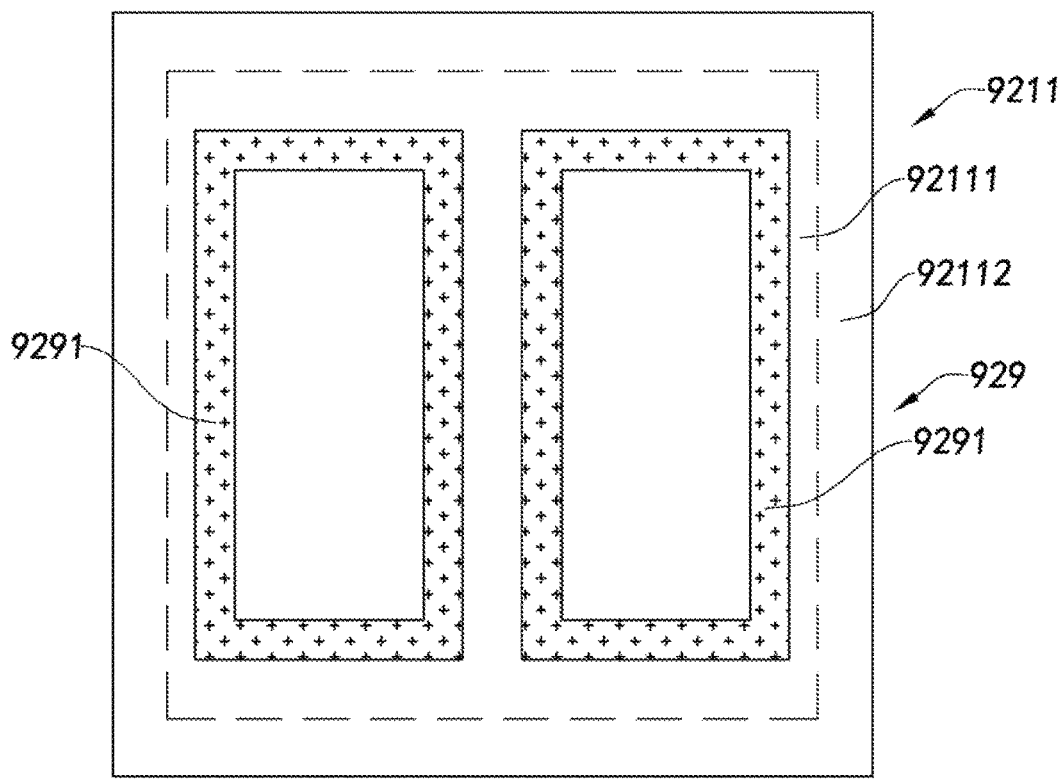
FIG. 19C shows a second modified implementation of the adhesive element according to the above third preferred embodiment of the invention.

FIG. 19C shows a second modified implementation of the adhesive element 929 of the anti-shake photosensitive assembly 920, wherein the adhesive element 929 includes two adhesive bodies 9291 with a square-shaped structure, and wherein the sizes of the two adhesive bodies 9291 are equal, and the two adhesive bodies 9291 are arranged side by side between the circuit board 9211 and the attachment substrate 9212 to form the adhesive element 929 with a double square-shaped structure, so as to increase the bonding force of the adhesive element 929, thereby bonding the attachment substrate 9212 and the circuit board 9211 together more firmly.

Figure 19D:
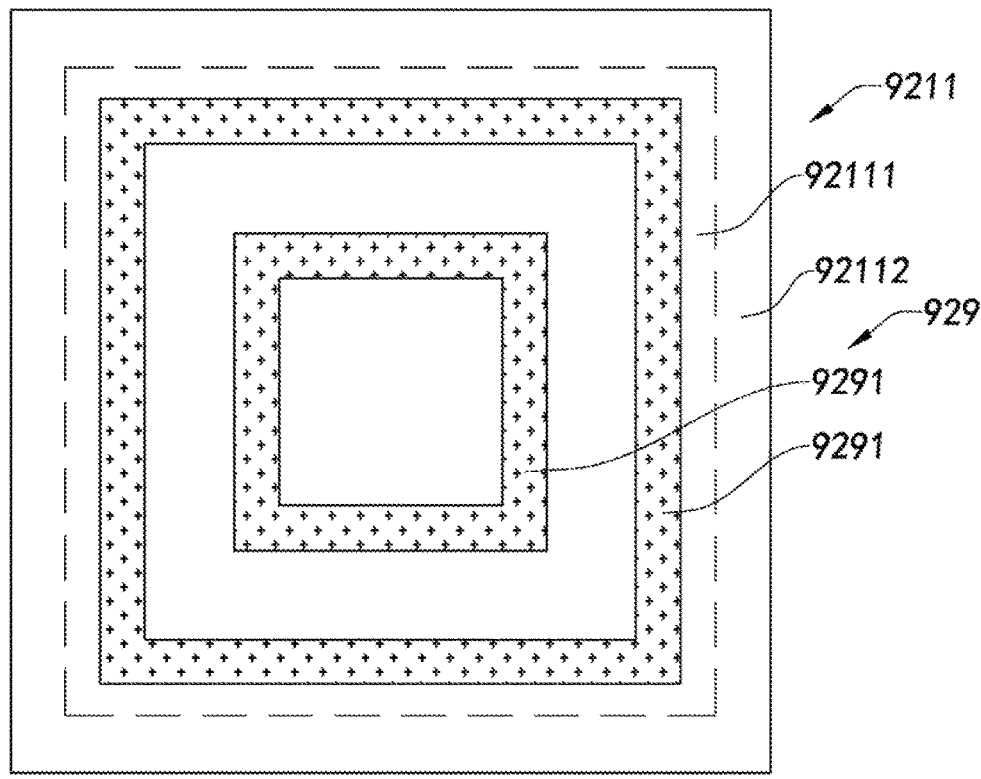
FIG. 19D shows a third modified implementation of the adhesive element according to the above third preferred embodiment of the invention.

FIG. 19D shows a third modified implementation of the adhesive element 929 of the anti-shake photosensitive assembly 920, wherein the adhesive element 929 includes two adhesive bodies 9291 with a square-shaped structure, the sizes of the two adhesive bodies 9291 are one larger and one smaller, and the adhesive body 9291 with a smaller size is located inside the adhesive body 9291 with a larger size, so as to form the adhesive element 929 with a larger square containing a smaller square shaped structure, and it is convenient for bonding the attachment substrate 9212 and the circuit board 9211 more evenly.

Figure 19E:
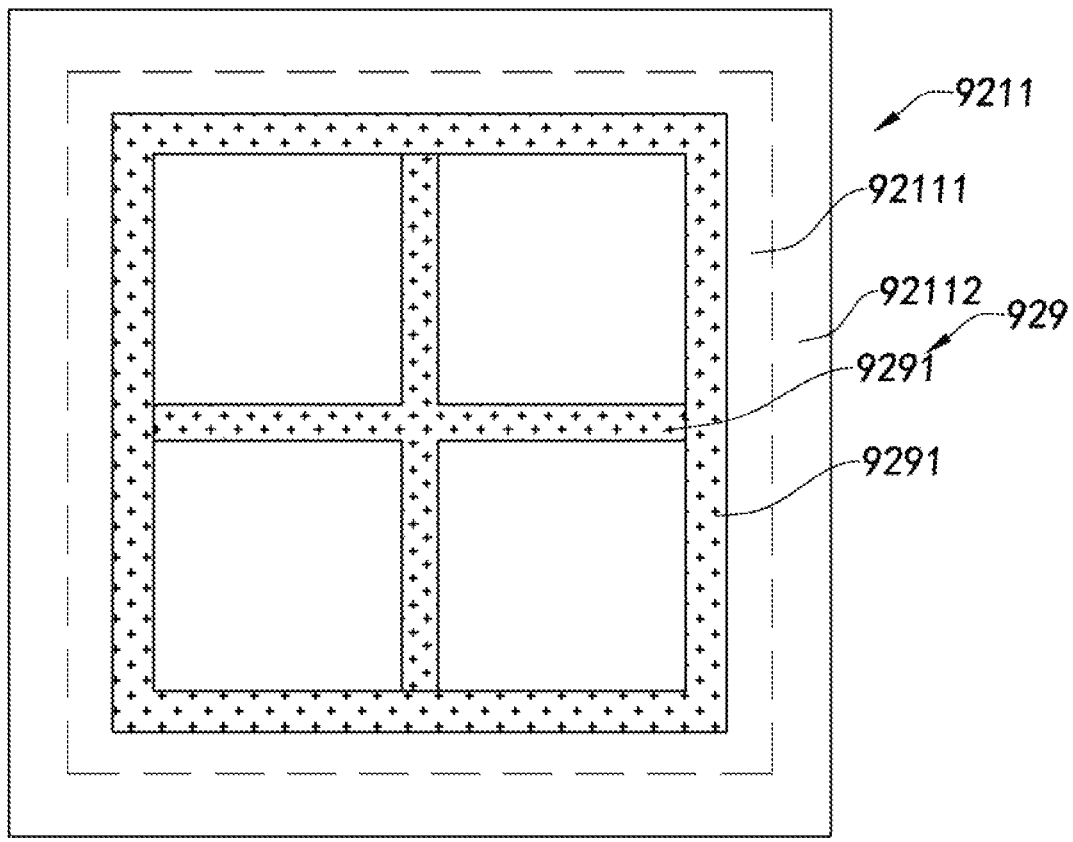
FIG. 19E shows a fourth modified implementation of the adhesive element according to the above third preferred embodiment of the invention.

FIG. 19E shows a fourth modified implementation of the adhesive element 929 of the anti-shake photosensitive assembly 920, wherein the adhesive element 929 includes two adhesive bodies 9291, one of the adhesive bodies 9291 has a cross-shaped structure, the other adhesive body 9291 has a square-shaped structure, and the adhesive body 9291 with a cross-shaped structure is located inside the adhesive body 9291 with a square-shaped structure, so as to form the adhesive element 929 with a grid-shaped structure, it is convenient for bonding the attachment substrate 9212 and the circuit board 9211 more evenly.

Figure 14:
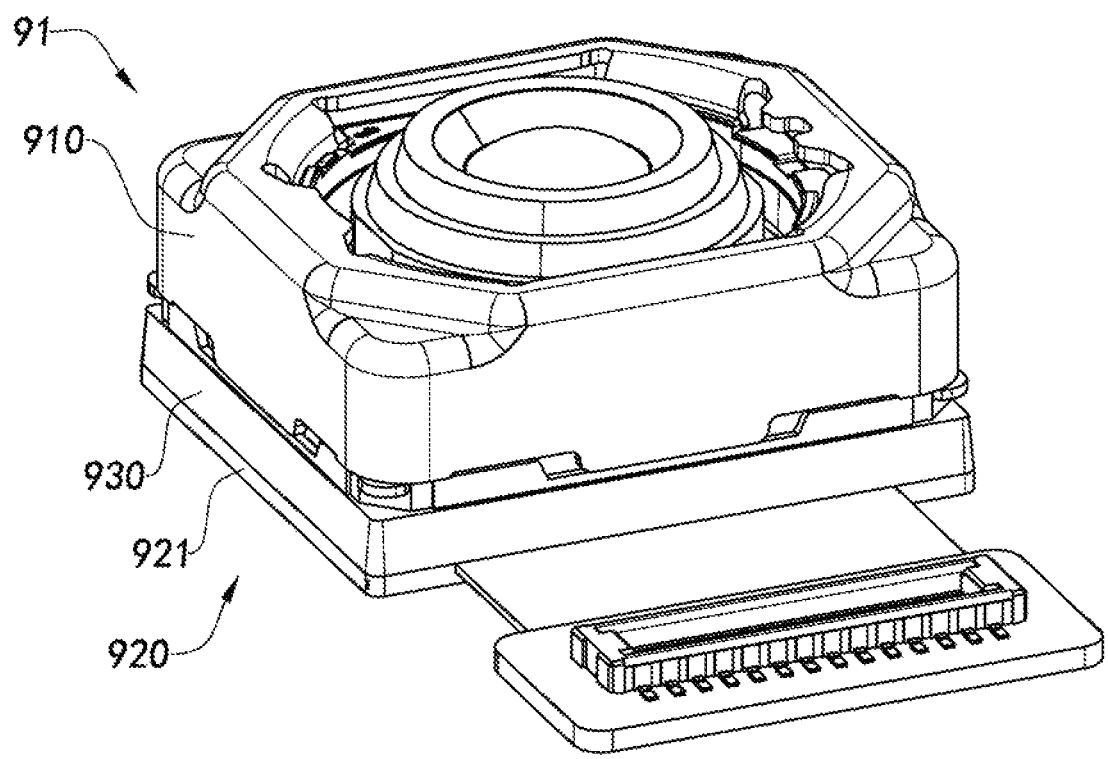
FIG. 14 is a schematic perspective view of an anti-shake camera module according to a third preferred embodiment of the invention.

Referring to FIGS. 14 and 15, the anti-shake camera module 91 further includes a base 930, wherein the base 930 is arranged on the edge region 92112 of the circuit board 9211 of the circuit board assembly 921 of the anti-shake photosensitive assembly 920, and the optical lenses 910 is mounted on the top surface of the base 930, so that the optical lenses 910 is held on the photosensitive path of the photosensitive element 923 of the anti-shake photosensitive assembly 920.

In addition, in the third preferred embodiment of the invention, as shown in FIG. 15, the anti-shake photosensitive assembly 920 further includes a filter element 928, wherein the filter element 928 is assembled on the base 930, so that the filter element 928 is held on the photosensitive path of the photosensitive element 923, and wherein the filter element 928 is located between the optical lenses 910 and the photosensitive element 923, so that the light entering the interior of the anti-shake camera module 91 from the optical lenses 910 may be received by the photosensitive surface of the photosensitive element 923 for photoelectric conversion after being filtered by the filter element 928, thereby improving the imaging quality of the anti-shake camera module 91. For example, the filter element 928 may filter the infrared part of the light entering the interior of the anti-shake camera module 91 from the optical lenses 910. It should be understood that, in different examples of the anti-shake camera module 91, the filter element 928 may be implemented in different types. For example, the filter element 928 may be implemented as an infrared cut-off filter, a full-transmitting filter and other filters or a combination of multiple filters, etc., and it is not limited in the invention. Of course, in some embodiments of the invention, the filter element 928 may also be directly mounted on the upper surface 9231 of the photosensitive element 923, so that the filter element 928 is located on the photosensitive path of the photosensitive element 923.

Referring to FIGS. 20-24, they are schematic diagrams of the manufacturing process of the anti-shake photosensitive assembly 920 and the manufacturing process of the anti-shake camera module 91 according to the invention. Those skilled in the art should understand that, the manufacturing process of the anti-shake photosensitive assembly 920 and the manufacturing process of the anti-shake camera module 91 as shown in FIGS. 20-24 are only examples to illustrate the features and advantages of the invention, and they do not constitute an restrictions on the content and scope of the invention.

Figure 20:
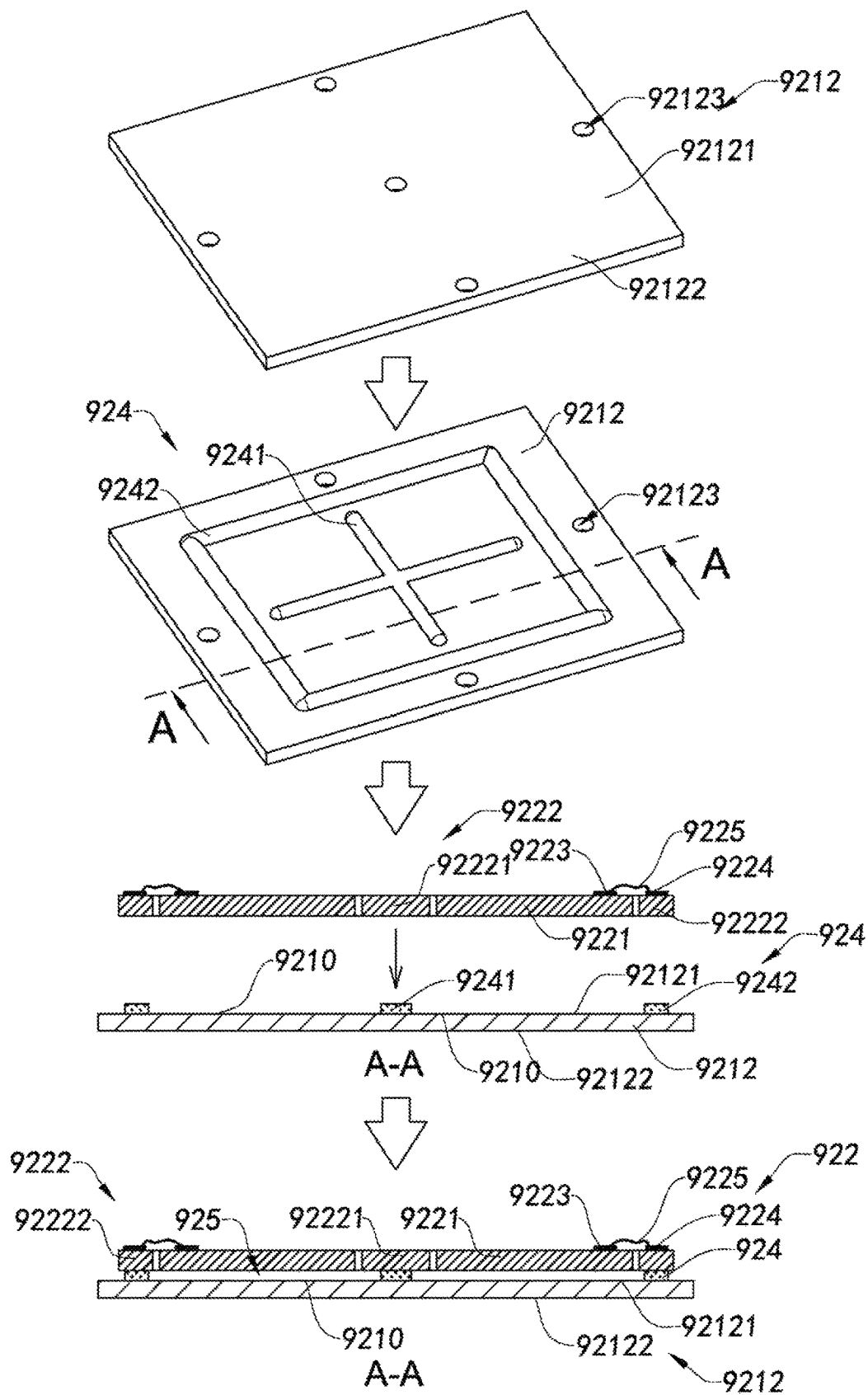
FIG. 20 is a schematic diagram of a first manufacturing step of the anti-shake camera module according to the above third preferred embodiment of the invention.

Particularly, FIG. 20 shows an example process of attaching the driver 922 to the attachment substrate 9212, wherein a first glue is applied on the upper surface 92121 of the attachment substrate 9212, and then the driver 922 is correspondingly arranged on the upper surface 92121 of the attachment substrate 9212, and wherein the first glue applied to the upper surface 92121 of the attachment substrate 9212 corresponds to the non-movable portion 9222 of the driver 922, so that after the first glue is cured, the supporting element 924 is formed between the upper surface 92121 of the attachment substrate 9212 and the non-movable portion 9222 of the driver 922, and the first safety gap 925 is formed between the upper surface 92121 of the attachment substrate 9212 and the movable portion 9221 of the driver 922, thereby preventing the normal operation of the driver 922 from being affected by the attachment substrate 9212.

Exemplarily, as shown in FIG. 20, firstly, the first glue is applied on the upper surface 92121 of the attachment substrate 9212 in a cross-shaped painting glue pattern, so as to form a glue line with a cross-shaped structure; and the first glue is applied to the upper surface 92121 of the attachment substrate 9212 in a square-shaped painting glue pattern, so as to form a glue line with a square-shaped structure; then the driver 922 is arranged correspondingly on the upper surface 92121 of the attachment substrate 9212, wherein the glue line with a cross-shaped structure corresponds to the inner non-movable portion 92221 of the non-movable portion 9222 of the driver 922, so as to form the inner supporting body 9241 between the upper surface 92121 of the attachment substrate 9212 and the inner non-movable portion 92221 of the non-movable portion 9222 of the driver 922 after curing the glue line with a cross-shaped structure, wherein the glue line with a square-shaped structure corresponds to the outer non-movable portion 92222 of the non-movable portion 9222 of the driver 922, so that the outer supporting body 9242 is formed between the upper surface 92121 of the attachment substrate 9212 and the outer non-movable portion 92222 of the non-movable portion 9222 of the driver 922 after curing the glue line with a square-shaped structure, so as to form the first supporting element 924 with a grid-shaped structure by combining inner supporting body 9241 and the outer supporting body 9242, and form the first safety gap 925 between the upper surface 92121 of the attachment substrate 9212 and the movable portion 9221 of the driver 922.

It is worth noting that, in some other embodiments of the invention, firstly, a first glue may be applied to the non-movable portion 9222 of the driver 922, then the driver 922 is correspondingly arranged on the upper surface 92121 of the attachment substrate 9212, so as to form the first supporting element 924 between the upper surface 92121 of the attachment substrate 9212 and the non-movable portion 9222 of the driver 922 after curing the first glue, and form the first safety gap 925 between the upper surface 92121 of the attachment substrate 9212 and the movable portion 9221 of the driver 922.

It is worth mentioning that, since the first glue has a certain fluidity before being cured, the driver 922 is prone to offset or tilt on the upper surface 92121 of the attachment substrate 9212, resulting in a unstable first safety gap 925, it is necessary to apply an external force to stably hold the driver 922 on the attachment substrate 9212.

Therefore, in the third preferred embodiment of the invention, as shown in FIG. 20, the attachment substrate 9212 is further provided with at least one vacuum tank 92123, wherein each vacuum tank 92123 extends from the upper surface 92121 of the attachment substrate 9212 to the lower surface 92122 of the attachment substrate 9212, so as to form a through-hole from up to down on the attachment substrate 9212, and facilitate to suck a vacuum from the lower surface 92122 of the attachment substrate 9212 through the vacuum tank 92123 during the process of attaching the driver 922 to the attachment surface 9210 of the attachment substrate 9212, then form a vacuum area between the attachment substrate 9212 and the driver 922, so that the driver 922 and the attachment substrate 9212 are firmly held together, thereby preventing the driver 922 from shifting or falling off, and ensuring the flatness of the driver 922.

Exemplarily, as shown in FIG. 20, the attachment substrate 9212 is provided with five vacuum tanks 92123, one of the vacuum tanks 92123 is located at the center of the attachment substrate 9212, and the remaining four vacuum tanks 92123 are evenly distributed on the peripheral edge of the attachment substrate 9212, so that when a vacuum is sucked through the vacuum tanks 92123, uniform suction is applied to each position of the driver 922 so as to ensure that the driver 922 has a high flatness. It should be understood that, in some other embodiments of the invention, the attachment substrate 9212 may also be arranged with other numbers of the vacuum tanks 92123, and the vacuum tanks 92123 may also be arranged on the attachment substrate 9212 in any arrangement selecting from a group consisting of: a matrix arrangement, a ring arrangement, and a random arrangement etc., and it is not further limited in the invention.

Figure 21:
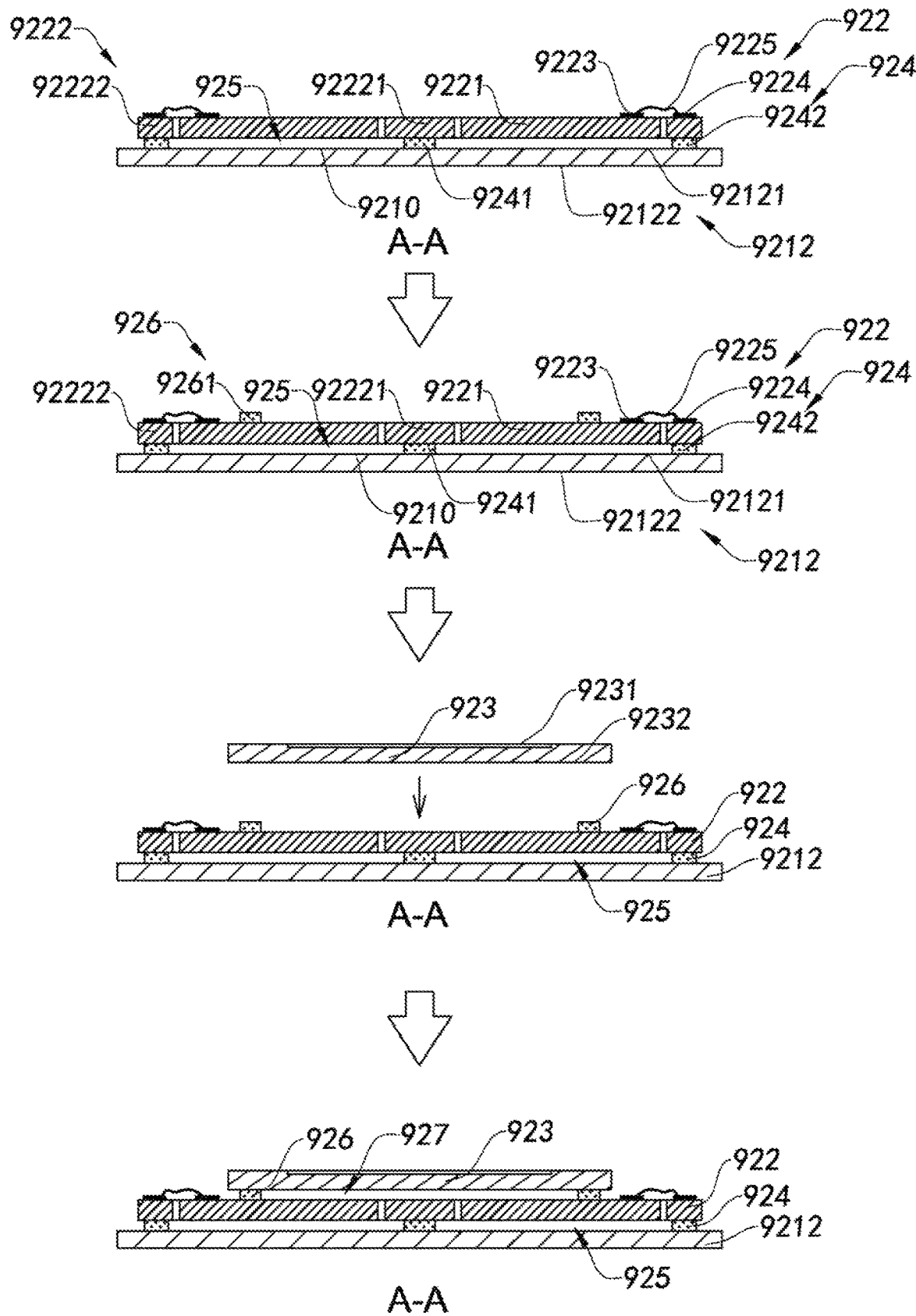
FIG. 21 is a schematic diagram of a second manufacturing step of the anti-shake camera module according to the above third preferred embodiment of the invention.

FIG. 21 shows an example process of attaching the photosensitive element 923 to the driver 922, wherein firstly a second glue is applied to the frame 92213 of the movable portion 9221 of the driver 922, then the photosensitive element 923 is correspondingly arranged on the movable portion 9221 of the driver 922, so as to form the second supporting element 926 between the bottom surface 9232 of the photosensitive element 923 and the frame 92213 of the movable portion 9221 of the driver 922 after curing the second glue, and form the second safety gap 927 between the bottom surface 9232 of the photosensitive element 923 and the actuator 92211 of the movable portion 9221 of the driver 922, thereby preventing the normal operation of the driver 922 from being affected by the photosensitive element 923.

Exemplarily, firstly, the second glue is applied to the left and right sides of the frame 92213 of the movable portion 9221 of the driver 922 in a linear shaped painting glue pattern, so as to form two glue lines with a linear shaped structure; then the photosensitive element 923 is correspondingly arranged on the movable portion 9221 of the driver 922, wherein the two glue lines with a linear shaped structure correspond to the bottom surface 9232 of the photosensitive element 923, so as to form the second supporting body 9261 between the bottom surface 9232 of the photosensitive element 923 and the frames 92213 of the movable portion 9221 of the driver 922 after curing the glue line with a linear shaped structure. Since the two second supporting bodies 9261 are respectively located at the left and right ends of the frame 92213 of the movable portion 9221 of the driver 922, the second supporting element 926 with a II-shaped structure are formed by cooperation of the two second supporting bodies 9261 with a linear shaped structure, and the second safety gap 927 is formed between the bottom surface 9232 of the photosensitive element 923 and the actuator 92211 of the movable portion 9221 of the driver 922.

Of course, in some other embodiments of the invention, firstly, the second glue may also be applied to the bottom surface 9232 of the photosensitive element 923, then the photosensitive element 923 is correspondingly arranged on the movable portion 9221 of the driver 922, so as to form the second supporting element 926 between the bottom surface 9232 of the photosensitive element 923 and the frame 92213 of the movable portion 9221 of the driver 922 after curing the second glue, and the second safety gap 927 is formed between the bottom surface 9232 of the photosensitive element 923 and the actuator 92211 of the movable portion 9221 of the driver 922, thereby preventing the normal operation of the driver 922 from being affected by the photosensitive element 923.

Figure 22:
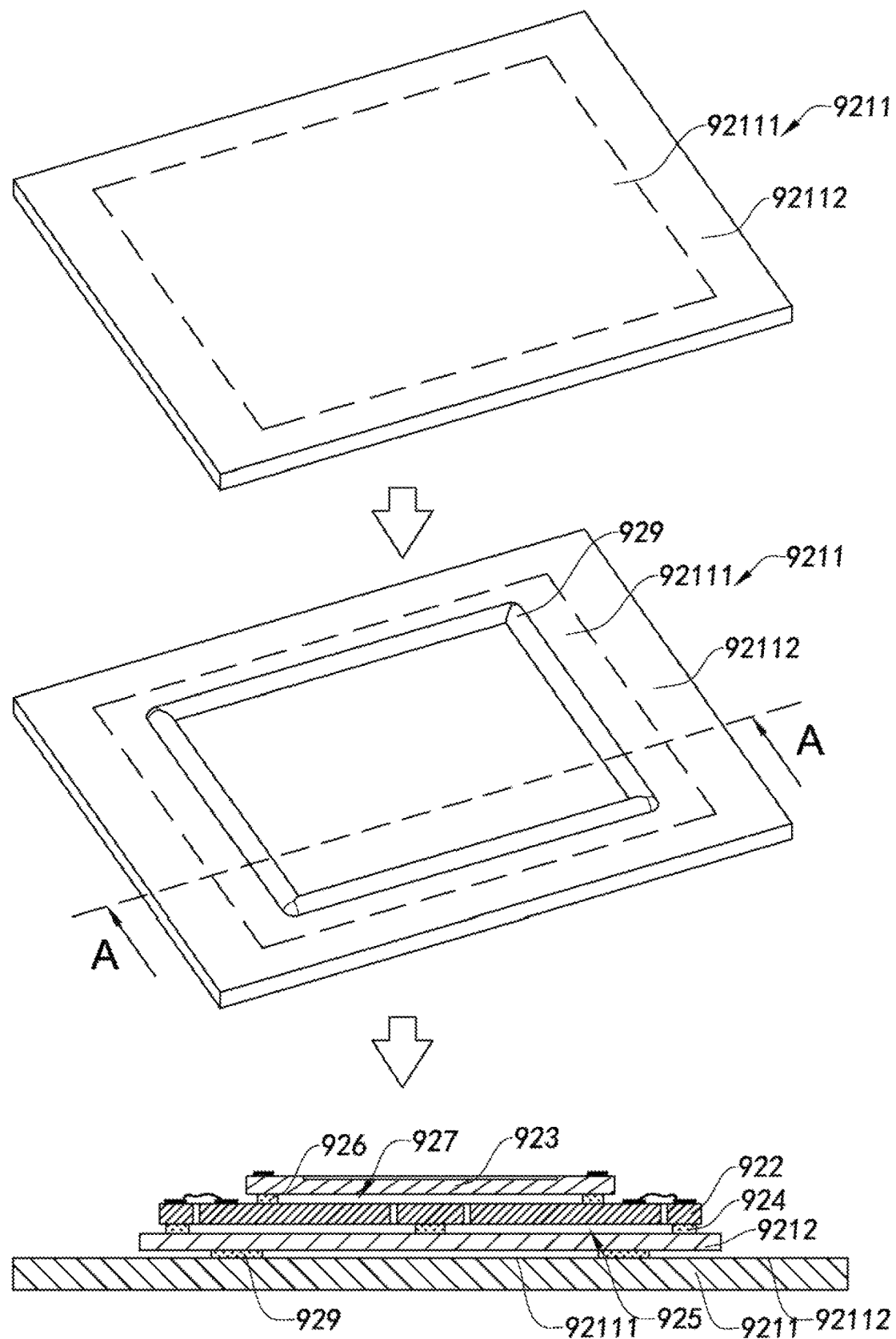
FIG. 22 is a schematic diagram of a third step of manufacturing the anti-shake camera module according to the above third preferred embodiment of the invention.

FIG. 22 shows the process of mounting the attachment substrate 9212 to the circuit board 9211. Firstly, a third glue is applied to the mounting region 92111 of the circuit board 9211, then the attachment substrate 9212 is correspondingly arranged on the mounting region 92111 of the circuit board 9211, so as to form the adhesive element 929 between the lower surface 92122 of the attachment substrate 9212 and the mounting regions 92111 of the circuit board 9211 after curing the third glue, so that the attachment substrate 9212 is firmly mounted to the mounting region 92111 of the circuit board 9211.

Exemplarily, as shown in FIG. 22, firstly, the third glue is applied to the mounting region 92111 of the circuit board 9211 according to a square-shaped glue-drawing pattern to form a square-shaped structure glue line; then the attachment substrate 9212 is correspondingly arranged on the mounting region 92111 of the circuit board 9211, wherein the glue line with a square-shaped structure is located between the lower surface 92122 of the attachment substrate 9212 and the mounting region 92111 of the circuit board 9211, so that the adhesive body 9291 with a square shaped structure is formed after curing the glue line with a square shaped structure. It should be understood that, since only one adhesive body 9291 is exemplarily provided in this example, the adhesive element 929 with a square-shaped structure is formed through the adhesive body 9291 accordingly. However, if two adhesive bodies 9291 are arranged side by side, the adhesive element 929 with a double square-shaped structure may be formed; alternatively, if two adhesive bodies 9291 are arranged, and one adhesive body 9291 is located inside another adhesive body 9291, the adhesive element 929 with a larger square containing a smaller square shaped structure may be formed. Of course, the number, shape and arrangement of the adhesive body 9291 may also exist in other manners, and they will not be repeated herein.

It is worth noting that, in some other embodiments of the invention, firstly, the third glue may be applied to the lower surface 92122 of the attachment substrate 9212, then the attachment substrate 9212 is arranged accordingly on the mounting region 92111 of the circuit board 9211, so as to form the adhesive element 929 between the lower surface 92122 of the attachment substrate 9212 and the mounting region 92111 of the circuit board 9211 after curing the third glue, so that the attachment substrate 9212 is firmly mounted on the mounting region 92111 of the circuit board 9211.

Figure 23:
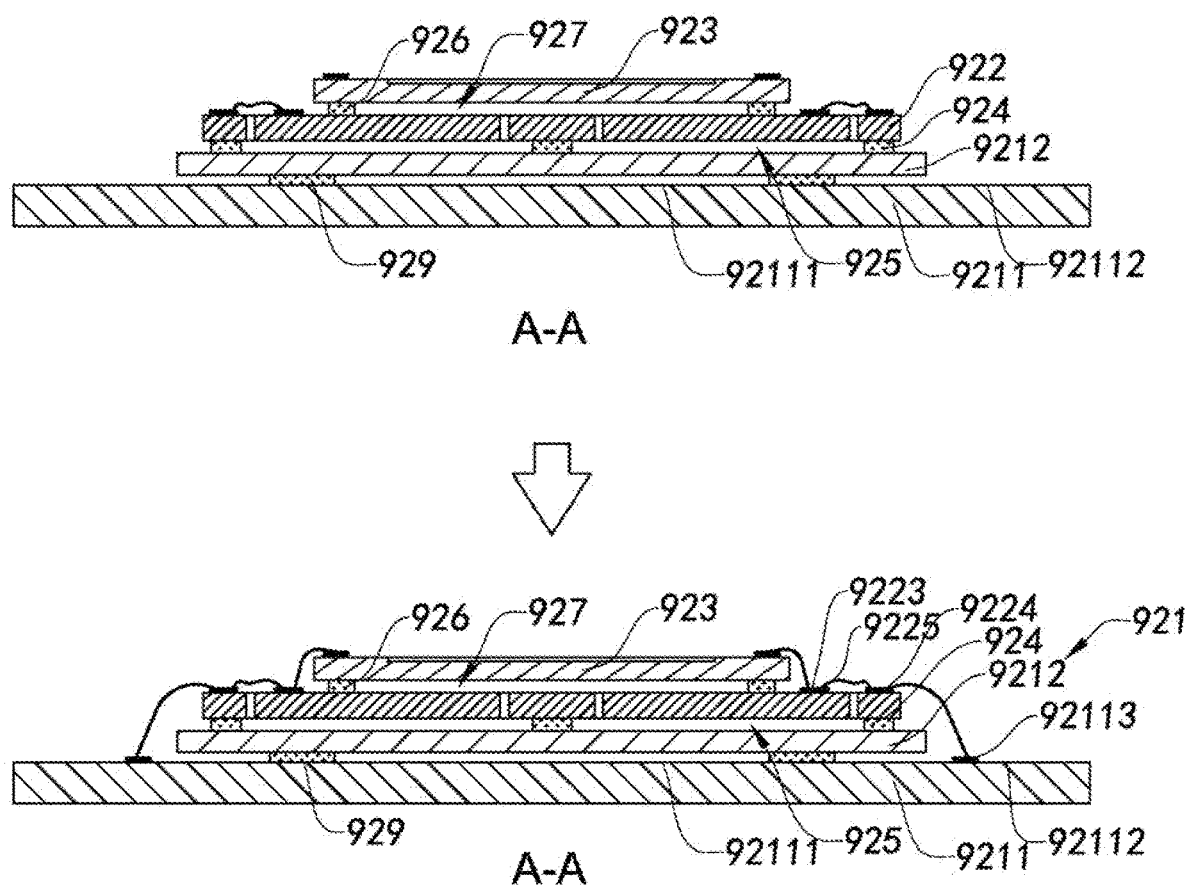
FIG. 23 is a schematic diagram of a fourth step of manufacturing the anti-shake camera module according to the above third preferred embodiment of the invention.

FIG. 23 shows the process of conductively connecting the photosensitive element 923 and the circuit board 9211, wherein the circuit board connector 92113 of the circuit board 9211 and the second connector 9224 of the driver 922 are conductively connected by wire bonding, and the first connector 9223 of the driver 922 and the photosensitive element 923 are also conductively connected by wire bonding, so as to conductively connect the photosensitive element 923 and the circuit board 9211, thereby forming the anti-shake photosensitive assembly 920. It should be understood that, since the first connector 9223 and the second connector 9224 of the driver 922 are conductively connected by the elastic wire 9225 of the driver 922, the photosensitive element 923 and the circuit board 9211 may be conductively connected to form the anti-shake photosensitive assembly 920. In other words, after the attachment substrate 9212 is mounted on the circuit board 9211, the driver 922 and the circuit board 9211, as well as the driver 922 and the circuit board 9211, are conductively connected by wire bonding, so that the photosensitive element 923 and the circuit board 9211 are conductively connected through the driver 922.

It is worth noting that, in some other embodiments of the invention, before the attachment substrate 9212 is mounted on the circuit board 9211, firstly the first connector 9223 of the driver 922 and the photosensitive element 923 may be conductively connected by wire bonding; and then after the attachment substrate 9212 is mounted on the circuit board 9211, the driver 922 and the circuit board 9211 are conductively connected by wire bonding. Of course, in other embodiments of the invention, after the attachment substrate 9212 is mounted on the circuit board 9211, the photosensitive element 923 and the circuit board 9211 may also be directly and conductively connected through elastic lead wires.

It is worth mentioning that, although the order of steps for manufacturing the anti-shake photosensitive element 920 in the third preferred embodiment as shown in FIGS. 20-23 is as follows: firstly attaching the driver 922 to the attachment substrate 9212, and attaching the photosensitive element 923 to the driver 922, then mounting the attachment substrate 9212 on the circuit board 9211, finally conductively connecting the photosensitive element 923 and the driver 922, and conductively connecting the driver 922 and the circuit board 9211, so as to form the anti-shake photosensitive assembly 920. However, those skilled in the art may understand that, the order of the steps of manufacturing the anti-shake photosensitive assembly 920 in the third preferred embodiment as shown in FIGS. 20-23 is only an example to illustrate the features and advantages of the anti-shake photosensitive assembly 920 according to the invention, and does not constitute a limitation on the content and scope of the invention. For example, in other examples of manufacturing the anti-shake photosensitive assembly 920, firstly the attachment substrate 9212 may be mounted on the circuit board 9211, then the driver 922 is attached to the attachment substrate 9212, finally the photosensitive element 923 is attached to the driver 922, so as to form the anti-shake photosensitive assembly 920; alternatively, the photosensitive element 923 may be firstly attached to the driver 922, then the driver 922 is attached to the attachment substrate 9212, finally the attachment substrate 9212 is mounted to the circuit board 9211, so as to form the anti-shake photosensitive assembly 920.

Figure 24:
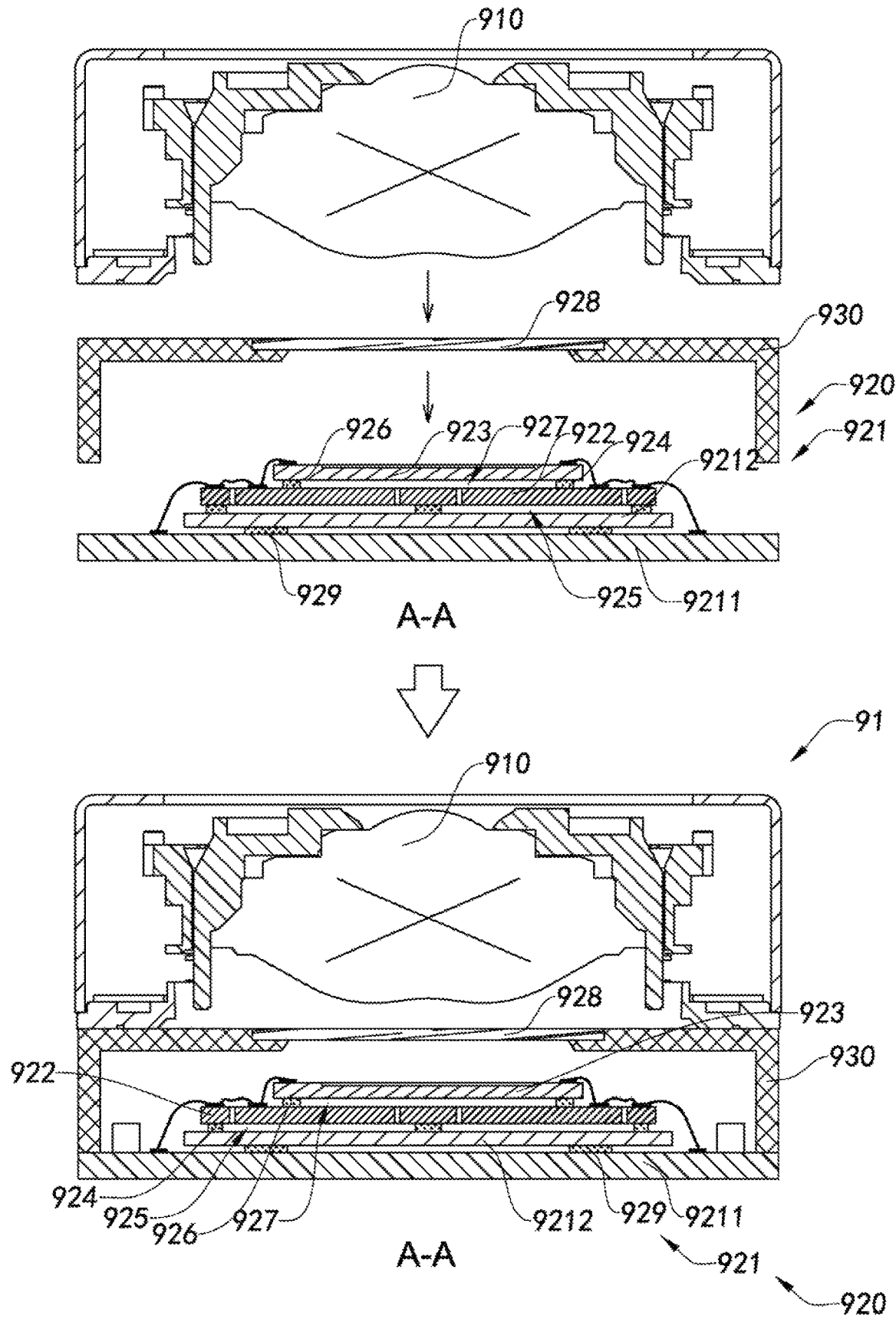
FIG. 24 is a schematic diagram of a fifth manufacturing step of the anti-shake camera module according to the above third preferred embodiment of the invention.

In FIG. 24, the base 930 is assembled on the edge region 92112 of the circuit board 9211, and the filter element 928 and the optical lenses 910 are respectively assembled on the base 930, so that both the filter element 928 and the optical lenses 910 are kept on the photosensitive path of the photosensitive element 923, thereby forming the anti-shake camera module 91.

It is worth noting that, in some other embodiments of the invention, before the attachment substrate 9212 is mounted on the mounting region 92111 of the circuit board 9211, the base 930 may be formed by a molding process, so as to form a molded base embedding the edge region 92112 of the circuit board 9211; then after the attachment substrate 9212 is mounted on the mounting region 92111 of the circuit board 9211, the filter element 928 and the optical lenses 910 are respectively assembled on the base 930. That is to say, the base 930 may be assembled on the circuit board 9211 before attaching the attachment substrate 9212, or may be assembled on the circuit board 9211 after attaching the attachment substrate 9212, and this will not be further limited in the invention.

Figure 25A:
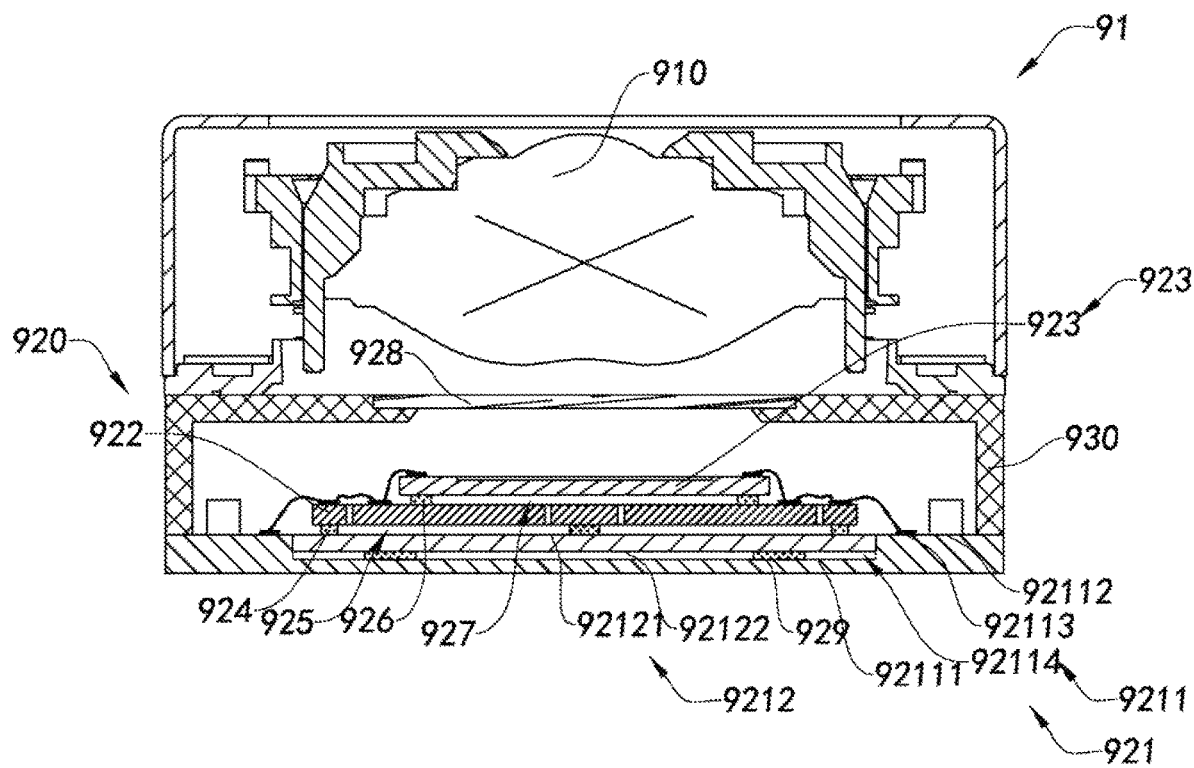
FIG. 25A shows a first modified implementation of the anti-shake camera module according to the above third preferred embodiment of the invention.

FIG. 25A shows a first modified implementation of the anti-shake camera module 91, wherein the circuit board 9211 of the circuit board assembly 921 of the anti-shake photosensitive assembly 920 of the anti-shake camera module 91 has at least one accommodation space 92114, wherein the mounting region 92111 of the circuit board 9211 is formed in each accommodation space 92114 of the circuit board 9211, and wherein the attachment substrate 9212 is mounted on the mounting region 92111 of the circuit board 9211 through the adhesive element 929, and the attachment substrate 9212 is accommodated in the accommodation space 92114 of the circuit board 9211, so as to reduce the height of the anti-shake photosensitive assembly 920, and avoid an increase of the height of the anti-shake camera module 91 due to the addition of the attachment substrate 9212, thereby meeting the miniaturization requirements of electronic device and smart products for the camera module.

Figure 25B:
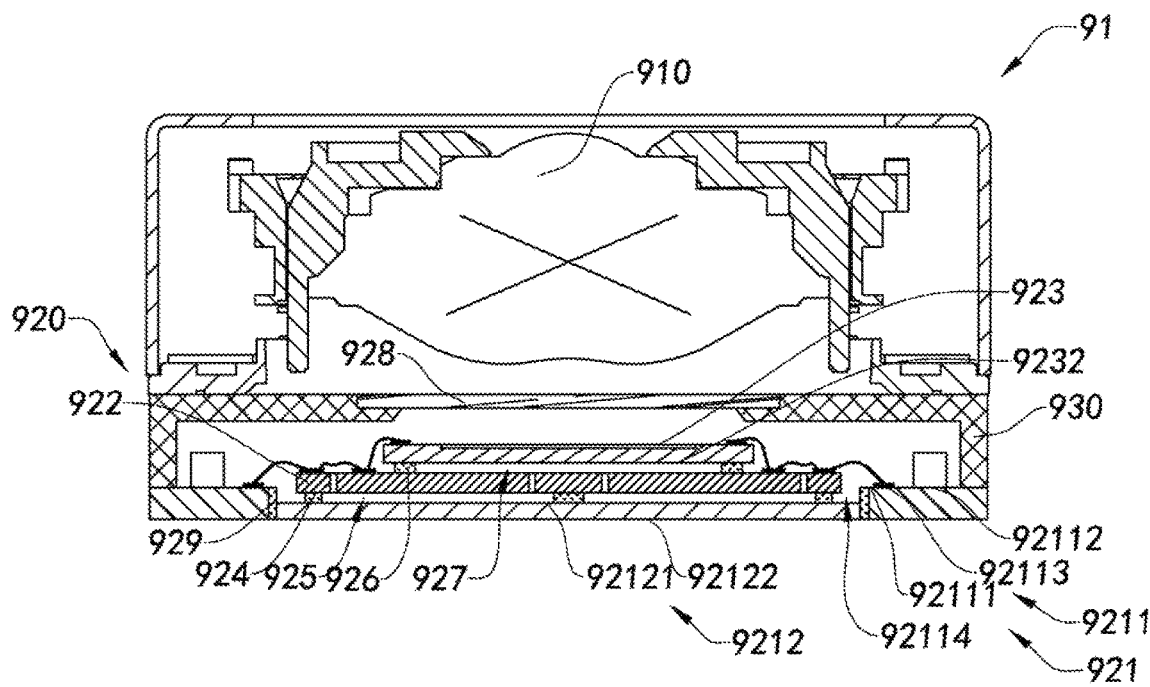
FIG. 25B shows a second modified implementation of the anti-shake camera module according to the above third preferred embodiment of the invention.

It is worth noting that, in the example of the anti-shake camera module 91 as shown in FIG. 25A, the accommodation space 92114 may be a groove, wherein the adhesive element 929 is located between the lower surface 92122 of the attachment substrate 9212 and the mounting region 92111 of the circuit board 9211, so that the attachment substrate 9212 is firmly mounted on the circuit board 9211 through the adhesive element 929. In the second modified implementation of the anti-shake camera module 91 as shown in FIG. 25B, the accommodation space 92114 may also be a through-hole, wherein the adhesive element 929 is located between the outer edge of the attachment substrate 9212 and the side wall of the accommodation space 92114 of the circuit board 9211, so that the attachment substrate 9212 and the circuit board 9211 are bonded together through the adhesive element 929. In other words, the type of the accommodation space 92114 may not be limited, as long as it may accommodate the attachment substrate 9212.

It is worth mentioning that, the size of the accommodation space 92114 may be larger than the size of the outer edge of the attachment substrate 9212, or may be equal to the size of the outer edge of the attachment substrate 9212, so as to ensure that the attachment substrate 9212 may be accommodated in the accommodation space 92114, and in this respect it is not limited in the invention.

Figure 25C:
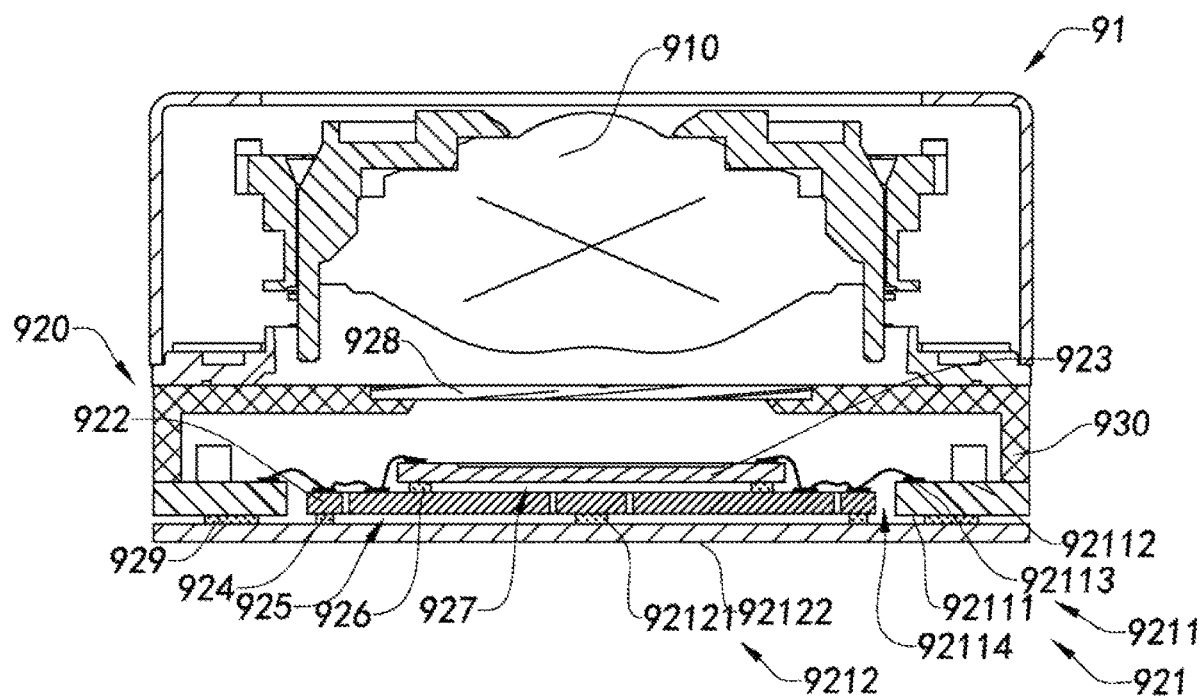
FIG. 25C shows a third modified implementation of the anti-shake camera module according to the above third preferred embodiment of the invention.

FIG. 25C shows a third modified implementation of the anti-shake camera module 91, wherein the accommodation space 92114 is implemented as a through-hole, the attachment substrate 9212 is mounted on the bottom side of the circuit board 9211, and the driver 922 attached to the upper surface 92121 of the attachment substrate 9212 is accommodated in the accommodation space 92114 of the circuit board 9211. It should be understood that, in the example of the anti-shake camera module 91 as shown in FIG. 25C, the size of the accommodation space 92114 is smaller than the size of the outer edge of the attachment substrate 9212, while the size of the outer edge of the driver 922 is not greater than the size of the accommodation space 92114.

Particularly, as shown in FIG. 25C, in the third modified implementation of the anti-shake camera module 91, the adhesive element 929 is located between the upper surface 92121 of the attachment substrate 9212 and the edge regions 92112 of the circuit board 9211, so that the attachment substrate 9212 is firmly mounted on the circuit board 9211 through the adhesive element 929. At the same time, the driver 922 attached to the upper surface 92121 of the attachment substrate 9212 is still accommodated in the accommodation space 92114 of the circuit board 9211, so as to ensure that the photosensitive surface of the photosensitive element 923 attached to the driver the 922 may receive light passing through the optical lenses 910.

Figure 26:
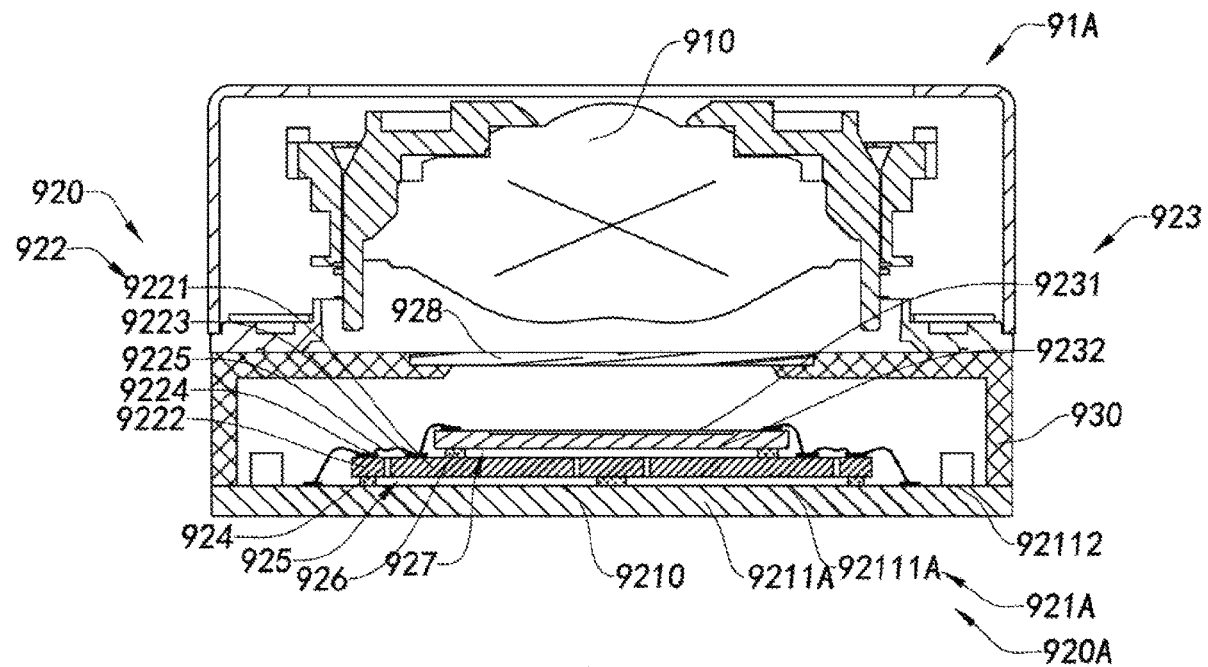
FIG. 26 is a schematic cross-section view of an anti-shake camera module according to a fourth preferred embodiment of the invention.

Referring to FIG. 26 of the drawings, an anti-shake camera module 91A according to the fourth preferred embodiment of the invention is illustrated. Compared with the above third preferred embodiment according to the invention, the difference of the anti-shake camera module 91A according to the fourth preferred embodiment of the invention is: a circuit board assembly 921A of an anti-shake photosensitive assembly 920A of the anti-shake camera module 91A includes a circuit board 9211A, but does not include the attachment substrate 9212, wherein the circuit board 9211A has a flat mounting region 92111A and the edge region 92112, so that a flat attachment surface 9210 is provided through the mounting region 92111A of the circuit board 9211A. In other words, the driver 922 is directly attached to the mounting region 92111A of the circuit board 9211A, instead of indirectly attaching the driver 922 to the circuit board 9211A through the attachment substrate 9212, so that the attachment substrate 9212 and the adhesive element 929 are omitted, thereby further reducing the height of the anti-shake photosensitive assembly 920A, and further reducing the overall height of the anti-shake camera module 91A.

Preferably, the circuit board 9211A is processed by a grinding process, so that the mounting region 92111A of the circuit board 9211A may have a higher flatness, so as to meet the stringent requirements of the flatness of the attachment surface 9210 for the driver 922, thereby effectively preventing the normal operation of the driver 922 from being affected by the circuit board 9211A. For example, the circuit board 9211A is implemented as a ceramic substrate 9211A processed by the grinding process, so as to form the mounting region 92111A with high flatness on the circuit board 9211A, so that the mounting region 92111A of the circuit board 9211A is used as the attachment surface 9210 of the circuit board assembly 921A. In addition, the ceramic substrate 9211A may also prevent the flatness of the attachment surface 9210 from being affected by the deformation of the circuit board 9211A, and prevent the normal operation of the driver 922 from being affected by the attachment surface 9210.

Figure 27:
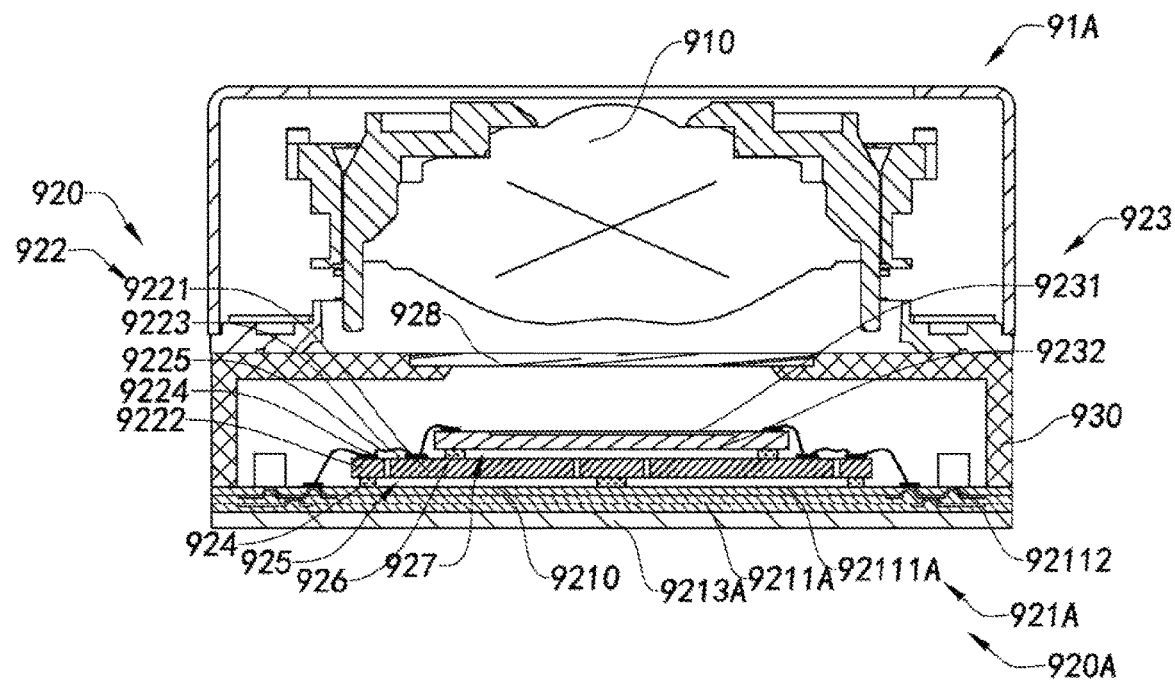
FIG. 27 shows a modified implementation of the anti-shake camera module according to the above fourth preferred embodiment of the invention.

FIG. 27 shows a modified implementation of the anti-shake camera module 91A according to the fourth preferred embodiment of the invention, wherein the circuit board 9211A is implemented as a redistribution layer circuit board (i.e., RDL circuit board) formed by redistribution layer process, so that the mounting region 92111A of the circuit board 9211A provides the mounting surface 9210 of the circuit board assembly 921A with higher flatness, so as to meet the strict requirements on the flatness of the attachment surface 9210 for the driver 922, thereby effectively preventing the normal operation of the driver 922 from being affected by the circuit board 9211A.

Further, as shown in FIG. 27, the circuit board assembly 921A further includes a strengthening element 9213A, wherein the strengthening element 9213 is arranged on the bottom side of the circuit board 9211A, so as to strengthen the strength of the circuit board 9211A, and prevent the circuit board 9211 from being deformed, thereby preventing the flatness of the attachment surface 9210 from being damaged due to deformation of the circuit board 9211A, and ensuring the normal operation of the driver 922.

Preferably, the strengthening element 9213 is implemented as a steel plate, wherein the steel plate is mounted on the bottom side of the circuit board 9211A, so as to strengthen the circuit board 9211A, and at the same time increase the heat dissipation of the circuit board 9211A, thereby enhancing the heat dissipation performance of the anti-shake camera module 91A.

It is worth noting that, in the fourth preferred embodiment of the invention, in addition to the above structure, other structures of the anti-shake camera module 91A are the same as the structure of the anti-shake camera module 91 according to the third preferred embodiment of the invention, and the anti-shake camera module 91A also has various modified implementations the same as or similar to those of the anti-shake camera module 91 of the third preferred embodiment, and they will not be repeated herein.

Figure 28:
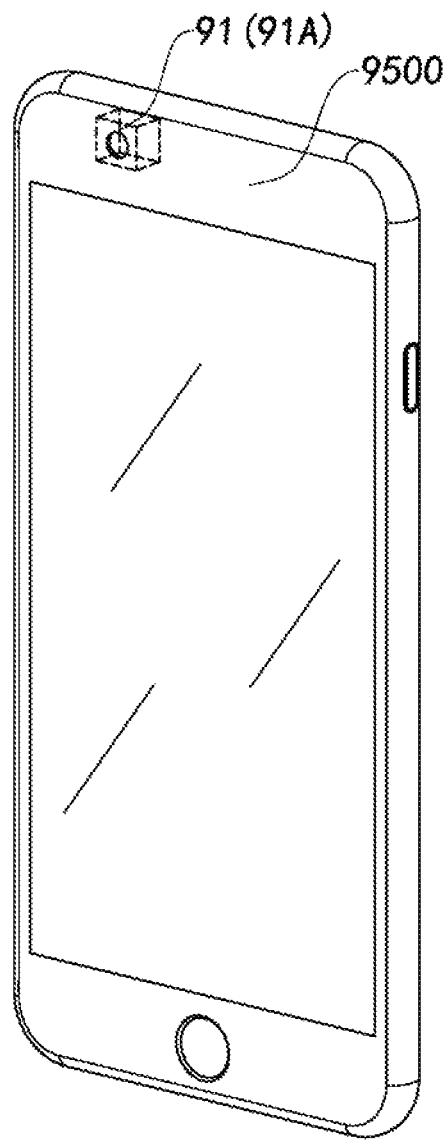
FIG. 28 is a schematic diagram of an electronic device with the anti-shake camera module according to the above third or fourth preferred embodiment of the invention.

Referring to FIG. 28, according to another aspect of the invention, the invention further provides an electronic device, wherein the electronic device includes an electronic device body 9500 and at least one anti-shake camera module 91 or 91A, wherein each of the anti-shake camera modules 91 or 91A is respectively arranged in the electronic device body 9500 for acquiring images. It is worth mentioning that, the type of the electronic device body 9500 is not limited. For example, the electronic device body 9500 may be any electronic device capable of being equipped with the anti-shake camera module, such as a smart phone, a tablet computer, a notebook computer, an e-book, a personal digital assistant, a camera, etc. Those skilled in the art may understand that, although in FIG. 28 the electronic device body 9500 implemented as a smart phone is taken as an example, it does not constitute a limitation to the content and scope of the invention.

According to another aspect of the invention, the invention further provides a method for manufacturing the anti-shake photosensitive assembly 920. Particularly, as shown in FIG. 29, the method for manufacturing the anti-shake photosensitive assembly 920 includes the following steps:

S91: arranging a first supporting element 924 between a non-movable portion 9222 of a driver 922 and an upper surface 92121 of an attachment substrate 9212, so that a first safety gap 925 is formed between the upper surface 92121 of the attachment substrate 9212 and the a movable portion 9221 of the driver 922;

S92: arranging a second supporting element 926 between a bottom surface 9232 of a photosensitive element 923 and a frame 92213 of the movable portion 9221 of the driver 922, so that a second safety gap 927 is formed between the bottom surface 9232 of the photosensitive element 923 and the actuator 92211 of the movable portion 9221 of the driver 922;

S93: mounting the attachment substrate 9212 on a circuit board 9211; and S94: respectively and conductively connecting the driver 922 and the photosensitive element 923 to the circuit board 9211, so as to form the anti-shake photosensitive assembly 920.

Figure 30:
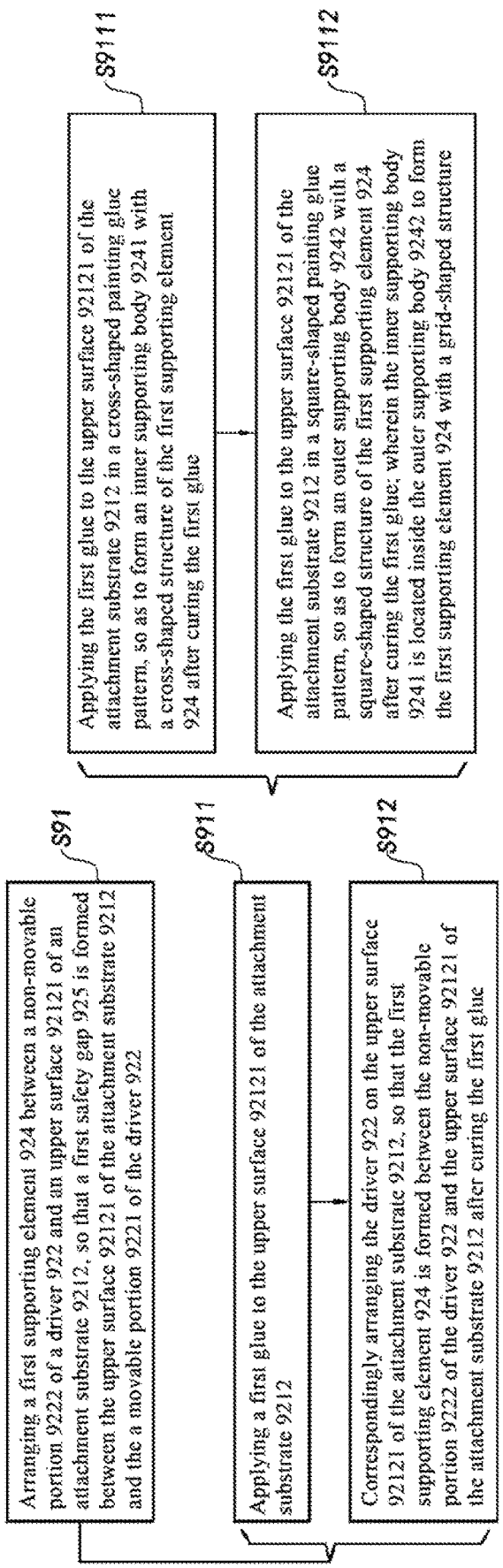
FIG. 30 is a schematic flowchart of attaching a driver in the method for manufacturing the above anti-shake photosensitive assembly according to the invention.

It is worth noting that, as shown in FIG. 30, in the third preferred embodiment of the invention, the step S91 includes the following steps:

S911: applying a first glue to the upper surface 92121 of the attachment substrate 9212; and S912: correspondingly arranging the driver 922 on the upper surface 92121 of the attachment substrate 9212, so that the first supporting element 924 is formed between the non-movable portion 9222 of the driver 922 and the upper surface 92121 of the attachment substrate 9212 after curing the first glue.

Particularly, the step S911 includes the following steps:

S9111: applying the first glue to the upper surface 92121 of the attachment substrate 9212 in a cross-shaped painting glue pattern, so as to form an inner supporting body 9241 with a cross-shaped structure of the first supporting element 924 after curing the first glue; and S9112: applying the first glue to the upper surface 92121 of the attachment substrate 9212 in a square-shaped painting glue pattern, so as to form an outer supporting body 9242 with a square-shaped structure of the first supporting element 924 after curing the first glue; wherein the inner supporting body 9241 is located inside the outer supporting body 9242 to form the first supporting element 924 with a grid-shaped structure.

Figure 31:
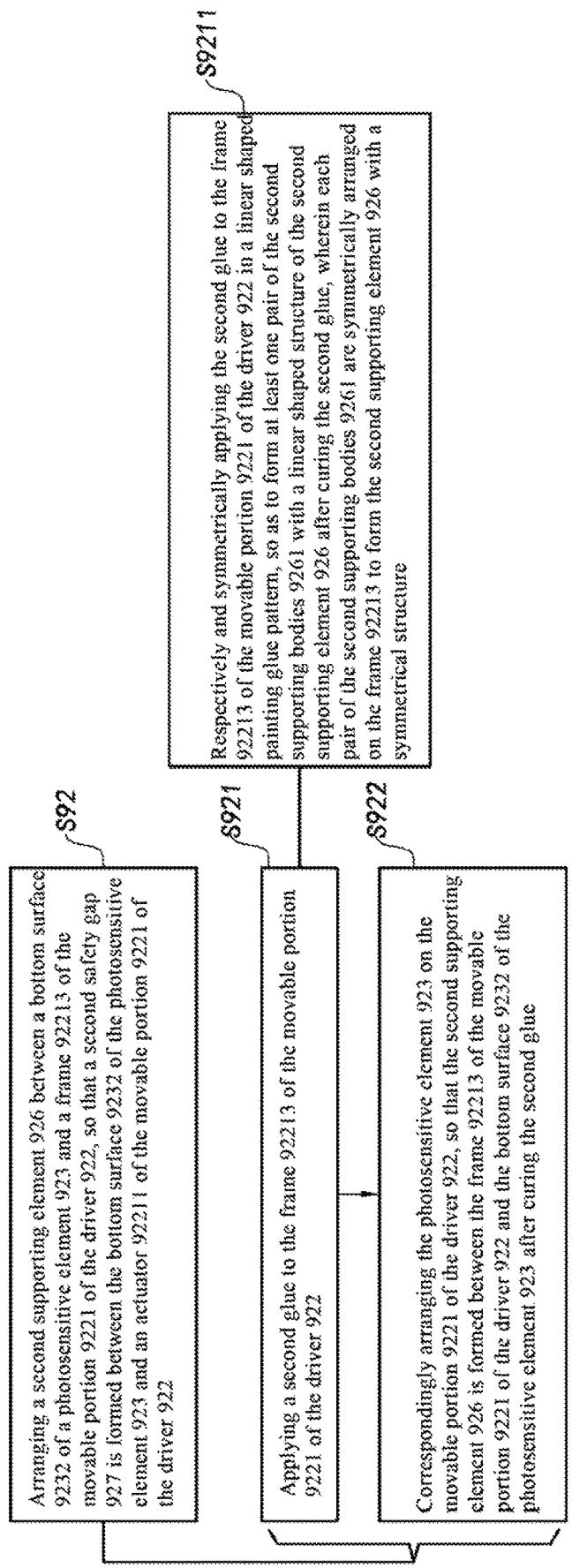
FIG. 31 is a schematic flowchart of attaching a photosensitive element in the method for manufacturing the above anti-shake photosensitive assembly according to the invention.

As shown in FIG. 31, in the third preferred embodiment of the invention, the step S92 includes the following steps:

S921: applying a second glue to the frame 92213 of the movable portion 9221 of the driver 922; and S922: correspondingly arranging the photosensitive element 923 on the movable portion 9221 of the driver 922, so that the second supporting element 926 is formed between the frame 92213 of the movable portion 9221 of the driver 922 and the bottom surface 9232 of the photosensitive element 923 after curing the second glue.

Particularly, the step S921 includes the following step:

S9211: respectively and symmetrically applying the second glue to the frame 92213 of the movable portion 9221 of the driver 922 in a linear shaped painting glue pattern, so as to form at least one pair of the second supporting bodies 9261 with a linear shaped structure of the second supporting element 926 after curing the second glue, wherein each pair of the second supporting bodies 9261 are symmetrically arranged on the frame 92213 to form the second supporting element 926 with a symmetrical structure.

Figure 32:
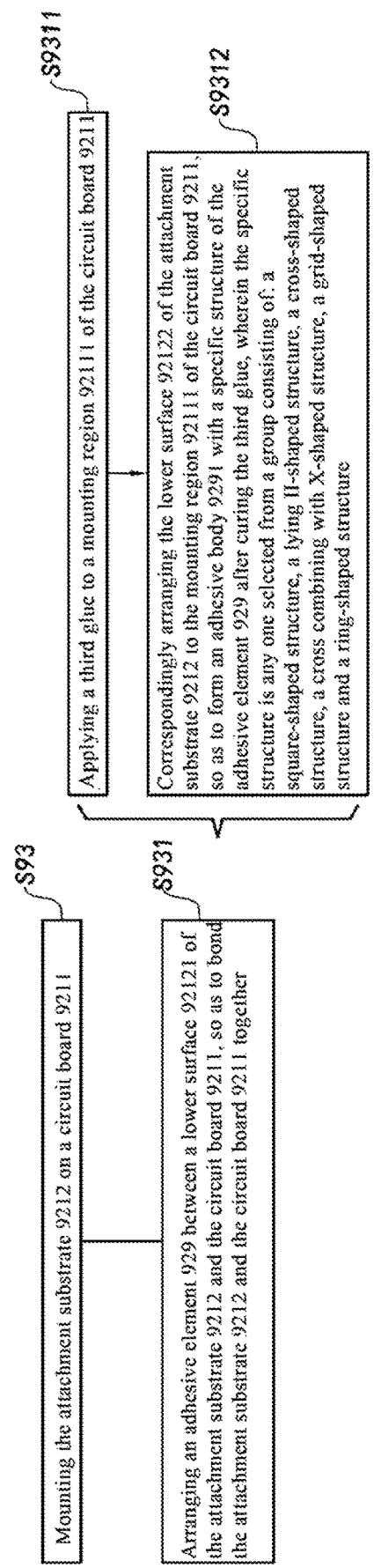
FIG. 32 is a schematic flowchart of mounting an attachment substrate in the method for manufacturing the above anti-shake photosensitive assembly according to the invention.

As shown in FIG. 32, in the third preferred embodiment of the invention, the step S93 includes the following step:

S931: arranging an adhesive element 929 between a lower surface 92121 of the attachment substrate 9212 and the circuit board 9211, so as to bond the attachment substrate 9212 and the circuit board 9211 together.

Particularly, the step S931 includes the following steps:

S9311: applying a third glue to a mounting region 92111 of the circuit board 9211; and S9312: correspondingly arranging the lower surface 92122 of the attachment substrate 9212 to the mounting region 92111 of the circuit board 9211, so as to form an adhesive body 9291 with a specific structure of the adhesive element 929 after curing the third glue, wherein the specific structure is any one selected from a group consisting of: a square-shaped structure, a lying II-shaped structure, a cross-shaped structure, a cross combining with X-shaped structure, a grid-shaped structure and a ring-shaped structure.

It should be understood that, in the step S931 of some modified implementations of the invention, when a third glue is applied to a mounting region 92111 of the circuit board 9211 in a cross combining with X-shaped painting glue pattern, an adhesive body 9291 with a cross combining with X-shaped structure of the adhesive element 929 is formed after curing the third glue. That is to say, when the third glue is applied in a symmetrical painting glue pattern such as a cross-shaped structure, a grid-shape structure, a large square combining with an inside small square shaped structure, or a ring-shaped structure, etc., the adhesive body 9291 with a structure corresponding to the painting glue pattern of the element 929 will be formed after curing the third glue.

Of course, in some other modified implementations of the invention, the third glue may also be applied in any combination of the above painting glue patterns, so that the adhesive element 929 may include more than two adhesive bodies 9291, so as to form any adhesive body 9291 with a symmetrical structure through the mutual combination of the adhesive bodies 9291.

It is worth noting that, in the method for manufacturing the anti-shake photosensitive assembly 920, the order of the step S91, the step S92, and the step S93 is only an example. In some other embodiments of the invention, the execution order may be: the step S92, the step S91, and the step S93 successively; or the step S93, the step S91, and the step S92 successively; the execution order of the step S91, the step S92, and the step S93 is not further limited in the invention.

Figure 33:
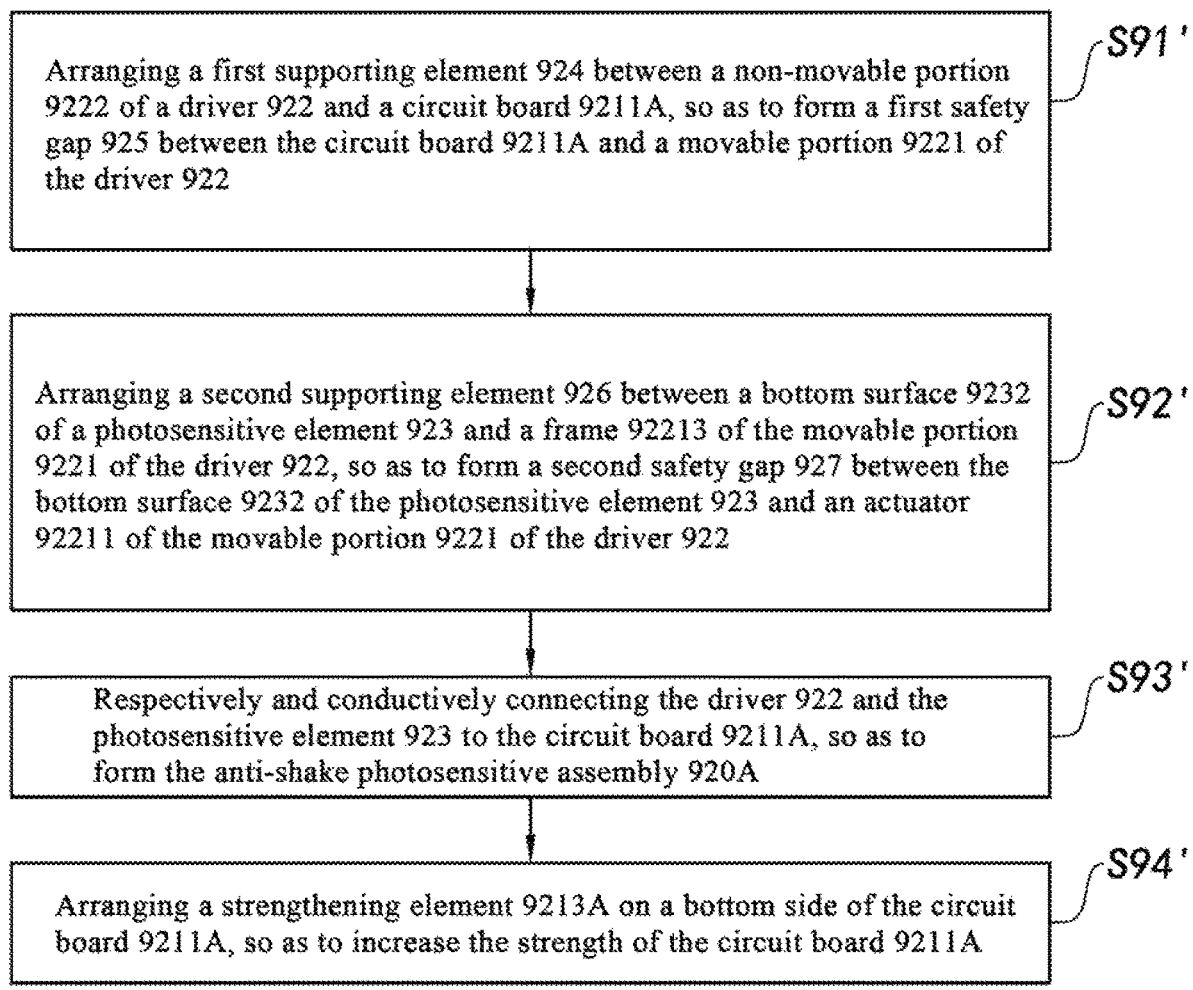
FIG. 33 is a schematic flowchart of a method for manufacturing an anti-shake photosensitive assembly of the anti-shake camera module according to the above fourth preferred embodiment of the invention.

According to another aspect of the invention, the invention further provides a method for manufacturing the anti-shake photosensitive assembly 920A. Particularly, as shown in FIG. 33, the method for manufacturing the anti-shake photosensitive assembly 920A includes the following steps:

S91': arranging a first supporting element 924 between a non-movable portion 9222 of a driver 922 and a circuit board 9211A, so as to form a first safety gap 925 between the circuit board 9211A and a movable portion 9221 of the driver 922;

S92': arranging a second supporting element 926 between a bottom surface 9232 of a photosensitive element 923 and a frame 92213 of the movable portion 9221 of the driver 922, so as to form a second safety gap 927 between the bottom surface 9232 of the photosensitive element 923 and the actuator 92211 of the movable portion 9221 of the driver 922; and S93': respectively and conductively connecting the driver 922 and the photosensitive element 923 to the circuit board 9211A, so as to form the anti-shake photosensitive assembly 920A.

Further, the method for manufacturing the anti-shake photosensitive assembly 920A further includes the following step:

S94': arranging a strengthening element 9213A on the bottom side of the circuit board 9211A, so as to increase the strength of the circuit board 9211A.

It is worth noting that, in the method for manufacturing the anti-shake photosensitive assembly 920A, the step S91' and the step S92' are respectively similar to the step S91 and the step S92 in the method for manufacturing the anti-shake photosensitive assembly 920, and the first glue and the second glue are respectively used for bonding to implement the corresponding attachment step.

According to another aspect of the invention, the invention further provides a method for manufacturing an anti-shake camera module 91 or 91A, including the following steps:

manufacturing the anti-shake photosensitive assembly 920 or 920A according to the above method for manufacturing the anti-shake photosensitive assembly 920 or 920A; and correspondingly arranging an optical lenses 910 on the photosensitive path of the photosensitive element 923 of the anti-shake photosensitive assembly 920 or 920A, so as to form the anti-shake camera module 91 or 91A.

Those skilled in the art should understand that, the above description and the embodiments of the invention shown in the drawings are only examples and do not limit the invention. The purpose of the invention has been completely and effectively achieved. The functions and structural principles of the invention have been shown and illustrated in the embodiments. The implementations of the invention may have any deformation or modification without departing from the above principles.

The invention claimed is:

1. An anti-shake photosensitive assembly comprising:
   a circuit board assembly, wherein the circuit board assembly provides at least one attachment surface;
   at least one first supporting element;
   at least one second supporting element;
   at least one driver, wherein each driver is correspondingly attached to one attachment surface of the circuit board assembly; and
   at least one photosensitive element, wherein each photosensitive element is correspondingly arranged on one driver, and the driver is located between the photosensitive element and the attachment surface of the circuit board assembly, so that the corresponding photosensitive element is moved by the driver,
   wherein each driver includes a movable portion and a non-movable portion connected to the movable portion, and the movable portion of each driver includes at least one actuator, at least one connecting arm and a frame, one end of each connecting arm being connected to one actuator and another end of each connecting arm being connected to the frame, wherein each driver is conductively connected to the circuit board assembly, wherein each first supporting element is arranged between the non-movable portion of one driver and one attachment surface of the circuit board assembly, thereby attaching each driver to one attachment surface of the circuit board assembly, and forming a first safety gap between the movable portion of each driver and one attachment surface of the circuit board assembly, wherein each photosensitive element is correspondingly arranged on the movable portion of one driver, and each photosensitive element is conductively connected to the circuit board assembly, wherein each second supporting element is arranged between a bottom surface of one photosensitive element and the movable portion of one driver, and a second safety gap is formed between the bottom surface of one photosensitive element and the movable portion of one driver, wherein each second supporting element includes at least a pair of second supporting bodies, and wherein each pair of the second supporting bodies are symmetrically arranged between the bottom surface of one photosensitive element and the frame of the movable portion of one driver, so that the bottom surface of each photosensitive element is correspondingly attached to the frame of the movable portion of one driver, and the second safety gap is formed between the bottom surface of each photosensitive element and the actuator of the movable portion of one driver.

2. The anti-shake photosensitive assembly according to claim 1, wherein the circuit board assembly includes a circuit board and an attachment substrate, and a lower surface of the attachment substrate is mounted on the circuit board so that an upper surface of the attachment substrate is used as the attachment surface of the circuit board assembly.

3. The anti-shake photosensitive assembly according to claim 2, wherein the attachment substrate is a steel plate, or the attachment substrate is made of a material selected from a group consisting of: a ceramic, an alloy, a metal, and a polymer material.

4. The anti-shake photosensitive assembly according to claim 2, wherein the attachment substrate has at least one vacuum tank, and each vacuum tank extends from the upper surface of the attachment substrate to the lower surface of the attachment substrate, so as to form a through-hole on the attachment substrate.

5. The anti-shake photosensitive assembly according to claim 2, wherein the circuit board has an accommodation space, and the attachment substrate mounted on the circuit board is accommodated in the accommodation space.

6. The anti-shake photosensitive assembly according to claim 2, wherein the circuit board has a through-hole accommodation space, the attachment substrate is mounted on a bottom side of the circuit board, and the driver attached to the attachment substrate is accommodated in the through-hole accommodation space.

7. The anti-shake photosensitive assembly according to claim 1, wherein the circuit board assembly includes a circuit board processed by a grinding process, the circuit board includes a mounting region and an edge region located around the mounting region, and the mounting region of the circuit board is used as the attachment surface of the circuit board assembly.

8. The anti-shake photosensitive assembly according to claim 1, wherein the circuit board assembly includes a circuit board made by a redistribution layer process, the circuit board includes a mounting region and an edge region located around the mounting region, and the mounting region of the circuit board is used as the attachment surface of the circuit board assembly.

9. The anti-shake photosensitive assembly according to claim 8, wherein the circuit board assembly further includes a strengthening element, and the strengthening element is arranged on a bottom side of the circuit board to strengthen the circuit board.

10. The anti-shake photosensitive assembly according to claim 1, wherein the attachment surface of the circuit board assembly has a flatness that is within 15 µm.

11. The anti-shake photosensitive assembly according to claim 1, wherein the photosensitive element is attached to the driver by particle glue bonding, and the driver is attached to the attachment surface of the circuit board assembly by particle glue bonding.

12. The anti-shake photosensitive assembly according to claim 2, wherein the driver is a micro-electro-mechanical system.

13. The anti-shake photosensitive assembly according to claim 12, wherein the non-movable portion of the driver is fixedly attached to the attachment surface of the circuit board assembly, and the photosensitive element is correspondingly attached to the movable portion of the driver.

14. The anti-shake photosensitive assembly according to claim 13, wherein
the driver further includes at least one group of first connectors, at least one group of second connectors, and at least one group of elastic wires,
each group of the first connectors is arranged on the movable portion of the driver,
each group of the second connectors is arranged on the non-movable portion of the driver,
each group of the first connectors and each corresponding group of the second connectors are conductively connected by one group of the elastic wires,
the circuit board is conductively connected to each group of the second connectors of the driver, and
the photosensitive element is conductively connected to each group of the first connectors of the driver.

15. The anti-shake photosensitive assembly according to claim 1, further comprising an adhesive element, wherein
the circuit board assembly includes a circuit board and an attachment substrate, the attachment substrate is mounted on the circuit board so that an upper surface of the attachment substrate is used as the attachment surface of the circuit board assembly, and each photosensitive element is conductively connected to one driver, and each driver is conductively connected to the circuit board, and
the adhesive element is arranged between a lower surface of the attachment substrate and the circuit board, so that the lower surface of the attachment substrate and the circuit board are bonded together.

16. An electronic device comprising:
an electronic device body; and
an anti-shake camera module, wherein the anti-shake camera module is assembled to the electronic device body, thereby assembling into the electronic device, wherein
the anti-shake camera module includes:
at least one optical lens; and the anti-shake photosensitive assembly according to claim 1, and each optical lens is correspondingly arranged on a photosensitive path of one photosensitive element of the anti-shake photosensitive assembly, thereby assembling into the anti-shake camera module.

\* \* \* \* \*